(12) United States Patent
Hlibiciuc et al.

(10) Patent No.: US 8,867,530 B2
(45) Date of Patent: Oct. 21, 2014

(54) SIGNALING GATEWAY FOR ROUTING SIGNALING MESSAGES

(75) Inventors: Alexandru Hlibiciuc, Aachen (DE); Robert Schnell, Aachen (DE); Boris Sumic, Zagreb (HR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 533 days.

(21) Appl. No.: 12/988,731

(22) PCT Filed: Nov. 17, 2008

(86) PCT No.: PCT/EP2008/009723
§ 371 (c)(1),
(2), (4) Date: Dec. 13, 2010

(87) PCT Pub. No.: WO2009/129836
PCT Pub. Date: Oct. 29, 2009

(65) Prior Publication Data
US 2011/0110221 A1    May 12, 2011

Related U.S. Application Data

(60) Provisional application No. 61/047,035, filed on Apr. 22, 2008.

(51) Int. Cl.
*H04L 12/66* (2006.01)
*H04Q 3/00* (2006.01)
*H04L 29/06* (2006.01)
*H04M 7/00* (2006.01)

(52) U.S. Cl.
CPC ............ *H04Q 3/0025* (2013.01); *H04L 65/104* (2013.01); *H04L 65/608* (2013.01); *H04M 7/0093* (2013.01)
USPC ........................................................ 370/352

(58) Field of Classification Search
USPC .......................... 370/216–220; 379/112, 219
See application file for complete search history.

(56) References Cited

U.S. PATENT DOCUMENTS 6,683,881 B1 *   1/2004   Mijares et al. ................. 370/401
7,039,025 B1 *   5/2006   Menon et al. .................. 370/328

(Continued)

FOREIGN PATENT DOCUMENTS

| GB | 2369000 A | 8/2000 |
| JP | 2001230800 A | 8/2001 |
| JP | 2002084363 A | 3/2002 |
| WO | 2004/089002 A1 | 10/2004 |

OTHER PUBLICATIONS

Morneault, K. et al. "Signaling System 7 (SS7) Message Transfer Part 3 (MTP3)—User Adaptation Layer (M3UA)." IEFT Network Working Group, Request for Comments: 4666, Obsoletes: 3332, Category: Standards Track, Sep. 2006.

(Continued)

*Primary Examiner* — Ayaz Sheikh
*Assistant Examiner* — Blanche Wong
(74) *Attorney, Agent, or Firm* — Coats & Bennett, PLLC

(57) ABSTRACT

A method of operating a signaling gateway for routing signaling messages between a SS7 network and an IP-based network is provided. The signaling gateway has a signaling point code allocated as a network address. Further, a signaling gateway for routing signaling messages between a SS7 network and an IP-based network is provided. The signaling gateway comprises an interface towards the SS7 network and an interface towards the IP-based network. The signaling gateway comprises a processing unit which may implement a SS7 protocol stack and an IP protocol stack. The processing unit may be configured to translate a message delivered to an upper protocol layer of the SS7 protocol stack to a corresponding message conforming to a user adaptation protocol of the IP protocol stack.

32 Claims, 31 Drawing Sheets

(56) References Cited

U.S. PATENT DOCUMENTS

| | | |
|---|---|---|
| 7,113,581 B2 * | 9/2006 | Benedyk et al. ............. 379/219 |
| 7,313,129 B1 * | 12/2007 | Bova et al. .................... 370/352 |
| 2002/0027983 A1 | 3/2002 | Suzuki |
| 2005/0063371 A1 | 3/2005 | Nealon |
| 2006/0013200 A1 | 1/2006 | Bettis et al. |
| 2006/0268687 A1 * | 11/2006 | Umansky et al. ............. 370/219 |

OTHER PUBLICATIONS

Loughney, J. et al., "Signalling Connection Control Part User Adaptation Layer (SUA)", Network Working Group, Oct. 2004, pp. 1-123, IETF RFC 3868, Nokia.

* cited by examiner

SIGTRAN SG

SIGTRAN ASP

SIGNALING GATEWAY FOR ROUTING SIGNALING MESSAGES

FIELD OF THE INVENTION

The present invention relates to a method of operating a signaling gateway for routing signaling messages between a signaling system No. 7 (SS7) network and an internet protocol (IP) based network. The invention further relates to a signaling gateway for routing signaling messages between the SS7 network and the IP-based network.

BACKGROUND OF THE INVENTION

In modern communication networks signaling messages, which are for example used to set up and tear down telephone calls, are often transported in a separate network, e.g. a signaling system No. 7 (SS7) network. For using internet protocol (IP)-based services, such as Voice-over-IP telephony, signaling messages have to be transported in the IP network. In the SS7 network signaling messages are transported using the message transfer part (MTP) 1-3 protocols, a user of which is the signaling connection control part (SCCP) protocol, which are implemented as a protocol stack comprising further protocol layers in SS7 network nodes. For enabling the transport of for example MTP3 or SCCP messages in an IP-based network, the internet engineering taskforce (IETF) has defined SIGTRAN protocols which provide the services of e.g. MTP3 or SCCP in the IP network. A signaling gateway connecting the SS7 network and the IP-based network terminates certain SS7 signaling transport layers, while upper layer protocols are moved from the node hosting the SS7 signaling transport layers, i.e. the signaling gateway, to nodes residing in the IP-based network. FIG. 1 shows a protocol stack model adopted in SIGTRAN architectures for transporting messages between the SS7 network (node I) and the IP-based network (node J). An interworking function (IWF) of the signaling gateway (SG) maps the primitives between layer k and layer k+1 to a user adaptation protocol handled by a dedicated user adaptation layer (xxUA). The xxUA layer resides on top of a stream control transmission protocol (SCTP) layer, which is a transport protocol operating analogously to TCP or UDP.

End nodes in the IP network implement a distributed architecture hosting upper protocol layers and an application layer, which in conventional systems resides on top of legacy or SS7 signaling transport protocols. Coordination between (application) layers of different nodes realizing a distributed Application Server is considered Application Server internal matter, the SIGTRAN working group (WG) does not specify Application Server internal protocols. The SIGTRAN WG defines concepts and procedures that enable distributed architectures from a signaling transport perspective. SIGTRAN signaling transport layers or xxUA layers are capable of identifying nodes serving the same Application Server, their traffic mode types and other characteristics and act accordingly to support nodes serving the same Application Server.

Legacy (or SS7) network layers such as MTP3, have a discriminating function which for each incoming message checks destination address of the message, e.g. a destination point code (DPC), against own addresses, and if the destination address coincides with an own address the message is delivered to a user protocol layer attached to a corresponding Service Access Point (SAP). Otherwise, if destination address does not coincide with an own address, the layer either discards the message or invokes a message routing function, which routes the message to the next hop, if possible. That is, messages destined to an address different from an own address are relayed using the same MTP3 protocol layer to the next hop. Instead of node addresses, message discriminating and routing functions can use other message parameters identifying a node in a network.

SIGTRAN SGs inherit this property, a legacy layer in a SIGTRAN SG has to recognize a destination address as an own address in order to deliver an incoming message to a User layer interworking with a User Adaptation layer. For example in a signaling gateway implementing a SCCP user adaptation (SUA) layer (SUA SG), the MTP3 layer has to recognize a DPC of an incoming message as being an own signaling point code (SPC) in order to deliver the message to the SCCP layer. The SUA SG interworks the SCCP layer further with the SUA layer, which delivers the message to an application server process (ASP) serving the corresponding range of application traffic.

In the MTP3 user adaptation (M3UA) architecture, the M3UA protocol is a transport protocol for MTP3 messages, whereas the original intention was to make it reflecting MTP3 primitives. Accordingly, the MTP3-M3UA complex can re-use the MTP3 routing function, which resides on top of the M3UA layer and enables a multiple signaling gateway scenario. The MTP3 routing function routes an incoming message to the next M3UA node. This approach does not significantly change MTP3 network architectures. However, the SIGNTRAN working group did not map some of the MTP3 messages to corresponding M3UA messages. Accordingly, M3UA networks cannot realize true relay networks as MTP3 does. SIGTRAN architectures and protocols are in detail described in RFC 4666 and RFC 3868.

In order to deliver a message to a legacy or SS7 layer from an underlying legacy layer, for instance from MTP3 to SCCP, the underlying legacy layer (e.g. MTP3) has to recognize a destination address included in a message as an own address. Recognizing an address as an own address in several different signaling gateways is not possible, and accordingly such a message may not be routed via different signaling gateways. This limitation on an interworking of the legacy layers thus prevents a multiple signaling gateway scenario. Multiple nodes may be used to implement one single signaling gateway, which may then look as one node from the perspective of a legacy node communicating via the signaling gateway. Yet such a signaling gateway has all implementation drawbacks characteristic of a distributed layer (e.g. MTP 3).

The use of multiple signaling gateways for routing signaling traffic between an SS7 signaling endpoint (SEP) and an application server process (ASP) of the IP-based network is prevented in the case where a legacy layer, e.g. SCCP, is terminated in the signaling gateway without moving some of its procedures and functions to an IP network node (e.g. the ASP). In order for a message to be delivered to the SCCP layer in the SG, the message needs to directly address the SG, whereby a routing of the message via another SG is prevented. Accordingly, the message can only be transported via the addressed signaling gateway. To ensure reliability of signaling transport, fault resilient architectures have to be implemented for the SGs, and the corresponding layer has to be distributed in a distributed SG architecture. As a result, SG architectures are complicated and development costs for SGs are increased, as well as operational expenditure for operators.

When it is attempted to move functions and procedures from SGs to IP nodes, an additional coordination between IP nodes is required or the moved procedures need to have the property of being independent and capable of a simultaneous and parallel execution from different IP nodes. Such an implementation can often not be realized and is frequently too costly.

Accordingly, it is desirable to route signaling messages via different signaling gateways while executing functions and procedures relating to the routed messages at the signaling gateway. In particular, it would be desirable to route signaling messages via different signaling gateways while still being capable of processing these messages at an upper layer, e.g. SCCP, in the signaling gateway. Accordingly, there is a need to overcome or at least mitigate the above-mentioned drawbacks. In particular, there is a need to provide an improved method of operating a signaling gateway and an improved signaling gateway which do not suffer from these drawbacks.

SUMMARY OF THE INVENTION

This need is met by the method and the signaling gateway according to the independent claims. The dependent claims describe preferred embodiments of the invention.

According to a first aspect of the invention, a method of operating a signaling gateway for routing signaling messages between an SS7 network and an IP-based network is provided. The signaling gateway has a first signaling point code allocated as a network address. The method comprises receiving a message from a network node of the SS7 network comprising a destination point code as a destination address. At a lower protocol layer of the signaling gateway the destination point code is compared to a second signaling point code associated with a network node of the IP-based network. If said destination point code matches the second signaling point code, the message is delivered to an upper protocol layer. The message is then translated into a corresponding message conforming to a user adaptation protocol of an upper user adaptation protocol layer of an IP protocol stack of the signaling gateway. The resulting translated message is then transmitted towards the network node of the IP-based network associated with the second signaling point code. Implementing such a method on a signaling gateway is advantageous, as the message addressed to an IP network node may still be processed by an upper protocol layer of the signaling gateway. Accordingly, the message may be routed via different signaling gateways to the destination network node in the IP-based network, while still being processed at an upper protocol layer, e.g. using an interworking function.

According to an embodiment of the invention, the lower protocol layer is a message transfer part 3 (MTP3) layer, the upper protocol layer is a signaling connection control part (SCCP) layer, and the upper user adaptation protocol layer of the IP protocol stack is a signaling connection control part user adaptation (SUA) layer. The SCCP layer and the MTP3 layer may for example be part of an SS7 protocol stack which may comprise further layers, such as MTP1 or MTP2. Similarly, the IP protocol stack may comprise further layers, such as a stream control transmission protocol (SCTP) layer and an internet protocol (IP) layer.

According to another embodiment the method further comprises the performing of a network management procedure for the second signaling point code. The network management procedure comprises at least a sending of a network management message to an adjacent network node in the SS7 network. The message indicates an availability or unavailability of the network node associated with the second signaling point code in case the network node associated with the second signaling point code becomes available or unavailable, respectively, from the signaling gateway. As an example, the availability of an SUA layer at the network node associated with the second signaling point code, e.g. an application server (AS) comprising an application server process (ASP), is linked to the availability of the second signaling point code (SPC) at the lower protocol layer (e.g. MTP3). The second SPC may also be called a hosted signaling point code (hSPC). By linking the availability of the SUA layer at the ASP and the availability of the hSPC, the lower protocol layer can perform network management procedures for the hSPC towards remote SS7 network nodes. The lower protocol layer may be an MTP3 layer, which may send a transfer prohibited (TFP) message towards an adjacent network node in the SS7 network to indicate the unavailability of the network node associated with the second signaling point code from the signaling gateway. Further, the MTP3 layer may send a transfer allowed (TFA) message towards the adjacent network node in the SS7 network to indicate the availability of the network node associated with the second signaling point code from the signaling gateway. Even though the second signaling point code, e.g. hSPC, designates the IP network node, the MTP3 layer local to the SG can perform network management procedures for it.

Further, in response to receiving a subsystem test message for a subsystem associated with the second signaling point code to test if the subsystem is available, the upper protocol layer may send a subsystem allowed message to the adjacent network node of the SS7 network in case the network node associated with the second signaling point code is available. In case the network node associated with the second signaling point code (SPC) is unavailable, the lower protocol layer may send a transfer prohibited (TFP) message to the adjacent network node of the SS7 network. The lower protocol layer sending a TFP message instead of the upper protocol layer sending a subsystem prohibited (SSP) message has the advantage that the subsystem may still be reached via another signaling gateway, through which the network node associated with the second SPC may still be available.

According to another embodiment, the lower protocol layer stores a state indicator associated with the second signaling point code. The state indicator indicates an availability or an unavailability of the network node associated with the second signaling point code from the signaling gateway. The method may further comprise, in response to the upper user adaptation protocol layer receiving an indication on a change of an availability state of the network node associated with the second SPC, indicating the change of the availability state to the upper protocol layer. The upper protocol layer may then provide a request to the lower protocol layer to change the state of the state indicator in accordance with the indicated change of the availability state. The lower protocol layer may then change the state indicator in accordance with the request provided by the upper protocol layer. Such a coupling of the state indicator to the availability state of e.g. an SUA ASP has the advantage that the lower protocol layer can perform network management procedures for the second SPC.

According to another embodiment, the signaling gateway further comprises an MTP3 user adaptation (M3UA) layer which stores a state indicator associated with the second SPC. The state indicator indicates an availability of the network node associated with the second SPC from the signaling gateway. The method may further comprise, in response to the M3UA layer receiving a request from an upper protocol layer to change the state of the state indicator, sending a message indicating a new state of the state indicator to a network node of the IP-based network comprising an MTP3 user adaptation layer. The type of the message sent is determined by the type of the network node of the IP-based network towards which the message is sent. Just as an example, the message may be sent to an ASP, to a signaling gateway process (SGP), or to an IP server process (IPSP). As an example, a destination available (DAVA) message may be sent to an ASP or an ASP up (ASPUP) message may be sent to an IPSP. Messages indicating an availability state of a network node are known to a person skilled in the art and are for example disclosed in RFC 4666 for the M3UA protocol.

According to another embodiment, the status of a SS7 network node may be indicated to a network node of the IP-based network, e.g. an ASP. As an example, the method may further comprise performing a network management procedure for the second signaling point code. In response to receiving a subsystem prohibited (SSP) message from a network node of the SS7 network addressed to the second SPC, a subsystem status test (SST) message may be sent to the network node of the SS7 network with the second SPC as a source address, and a message indicating the unavailability of the SS7 subsystem may be sent to the network node associated with the second signaling point code. As the second SPC is included as a source address, an answer to the SST message may not be routed via the same signaling gateway sending the SST message, and accordingly, signaling gateways may communicate with each other in order to communicate the status of the tested subsystem.

In another embodiment, the performing of a network management procedure for the second signaling point code may comprise, in response to receiving a destination state audit (DAUD) message from the network node associated with the second SPC comprising an address of an effected subsystem to be audited, sending a subsystem status test (SST) message to a SS7 network node comprising the second SPC as a source address and the affected subsystem address. As an example, an ASP may directly audit the state of a SS7 network node. Signaling gateways may simply route the audit message and an associated response message, and may not store the state of the SS7 node being audited.

According to the embodiment, the method may further comprise an inhibiting of the sending of a further subsystem status test (SST) message with the same affected subsystem address for a predetermined amount of time after sending said subsystem status test message. SST messages for the same affected subsystem may thus be cashed at the signaling gateway, as the subsystem has already been audited, and the response may for example be broadcast to all concerned IP-based network nodes. This has the advantage of reducing unnecessary traffic.

The status of a subsystem in the SS7 network may be indicated by a SCCP subsystem status message. In response to receiving a subsystem prohibited (SSP) or subsystem allowed (SSA) message from the SS7 network node with a destination address corresponding to the second signaling point code, the method may further comprise a delivering of said message to said upper protocol layer and translating the received message into a corresponding destination unavailable (DUNA) or destination available (DAVA) message, respectively. The translated message may then be sent to the network node associated with the second signaling point code. Just as an example an application server process (ASP) may audit a SS7 network node by sending a DAUD message, which is not directly answered but relayed via the signaling gateway. Similarly, an answer from the SS7 network node is relayed via a signaling gateway, which can be different from the SG which relays the DAUD message. This is advantageous, as the signaling gateways are not required to store the state of SS7 destinations.

The network node associated with the second signaling point code may comprise plural processes, e.g. DSPs, wherein the translated message, e.g. a DUNA or DAVA message, is sent to each of said processed. All ASPs of an application server (AS) may for example be provided with a translated message.

The destination state audit message may be sent by the network node associated with the signaling point code as part of an auditing of an affected subsystem. The auditing may for example be initiated by the network node associated with the second signaling point code receiving a destination unavailable message indicating that the affected subsystem is unavailable. Accordingly, a signaling gateway translating and relaying the destination unavailable message may thus be relieved from performing a subsystem test procedure. The network node associated with the second signaling point code may store an availability state for a SS7 network node accessible via the signaling gateway. The availability state can then be adjusted according to received destination unavailable messages and destination available messages comprising the network address of the SS7 network node as affected point code.

The network node associated with the second SPC may also inform peer network nodes in the IP-based network about the availability of SS7 destinations via the signaling gateway.

According to another embodiment of the invention, the method further comprises performing a signaling connection control part SCCP traffic limitation procedure for messages received by the signaling gateway from the network node associated with the second SPC in accordance with a local congestion level of the signaling gateway. As an example, the signaling gateway may measure an own congestion level (OCL) and limit incoming traffic in accordance with said level. On the other hand, an outgoing traffic limitation for an SUA destination may not be performed. In another configuration, the signaling gateway may activate a limitation for outgoing traffic towards one SUA destination, whereas it does not limit traffic towards another SUA destination.

According to yet another embodiment, the method may further comprise storing a congestion level (CL) indicating a congestion status of the network node associated with the second SPC, and in response to receiving a message comprising congestion information from the network node associated with the second SPC, updating the stored congestion level (CL) in accordance with the received congestion information. As an example, an ASP of an application server may send a signaling congestion (SCON) SUA message to the signaling gateway, in accordance with which the signaling gateway updates the stored congestion level. In another configuration, the stored congestion level may only be updated if a congestion level comprised in the received message is larger than the stored congestion level. A predetermined amount of time after updating the stored congestion level, the stored congestion level may be decreased by a predetermined value. Accordingly, the congestion level may slowly decrease until it becomes 0 (no congestion), unless it is updated by receiving a message comprising a higher CL.

The method may further comprise storing at least one traffic restriction-related parameter, such as a restriction level (RL), as at restriction sublevel (RSL) a transport-related restriction level (RLm) or a transport-related restriction sublevel (RSLm) for the network node associated with the second SPC. The stored transport-related restriction level or sublevel may then be updated in response to receiving an indication of a stream control transport protocol (SCTP) association congestion towards the network node associated with the second SPC or in response to receiving a signaling congestion message with a subsystem number (SSN) of 0 or 1. As an example, an SCON message sent by an AS may be treated like an indication of a SCTP association congestion, according to which RLm and RSLm may be updated.

In case the stored congestion level of the network node associated with the second signaling point code exceeds a predetermined threshold value, and in response to receiving a message originated at a remote network node and addressed to said second signaling point code, a congestion indicating message indicating the stored congestion level may be sent to a network address comprised as a source address in the received message. The message being sent may comprise the second signaling point code as an affected address associated with the congestion level. The type of congestion indicating message may be determined based on the type of the remote network node towards which the congestion indicating message is sent. Just as an example, a transfer-controlled (TFC), a SCCP subsystem congested (SSC), or a signaling congestion (SCON) message may be sent to a MTP3, an SCCP or an SUA network node, respectively.

A stored congestion or restriction level associated with the network node associated with the second SPC may be indicated to the upper protocol layer.

According to yet another embodiment, the method further comprises measuring a local congestion level of the signaling gateway and storing the measured congestion level as an own congestion level (OCL). In case the own congestion level is above a predetermined threshold value, a message indicating the own congestion level may be sent in response to receiving a message originated at a remote network node. The message is sent to a network address comprised as a source address in the received message. The message being sent may comprise the destination address of the received message as an affected address associated with the own congestion level. It may thus be indicated to the remote network node that the second (hosted) SPC is congested if the signaling gateway itself is congested. In response to receiving a message addressed to the second signaling point code, a maximum value of the stored congestion level and the stored own congestion level may be calculated, and a message indicating the maximum value as a congestion level indication may be sent to a network node which originated the received message. As the larger of the local congestion level and the e.g. AS congestion level may be included in the message sent, a more precise indication of an actual congestion can be communicated to remote network nodes.

According to another aspect of the invention, a signaling gateway for routing signaling messages between a SSC network and an IP-based network is provided. The signaling gateway has a first signaling point code allocated as a network address. It comprises an interface for receiving a message from a network node of the SS7 network, a processing unit implementing an SS7 protocol stack comprising a lower protocol layer and an upper protocol layer and an IP protocol stack comprising an upper user adaptation protocol layer. The processing unit is configured to compare a destination point code (DPC) comprised in the received message to a second signaling point code (SPC) associated with a network node of the IP-based network and, if the destination point code matches the signaling point code, to deliver the message from the lower protocol layer to the upper protocol layer. The processing unit is further configured to translate the message into a corresponding message conforming to the user adaptation protocol. The signaling gateway further comprises an interface for sending the translated message to the network node of the IP-based network associated with the second signaling point code.

A signaling gateway with such a configuration is advantageous, as it may process messages with upper protocol layer functions even if the destination address of a message is different from the first signaling point code of the signaling gateway. Such a signaling gateway may enable a multiple SG scenario, where messages are routed via plural SGs, whereas they are still being processed at the upper protocol layers implemented in the SGs. Such a scenario allows for a more flexible, open and simplified architecture of interworking IP with legacy, e.g. SS7, networks, and may enable a system scalability which is not limited by a communication required between signaling gateways. Further, redundant signaling gateways may be provided which may secure the robustness of the signaling interworking between a legacy and a SIGTRAN network. The processing unit runs a SS7 protocol stack implementation and an IP protocol stack implementation. Thus, an interworking between layers of the different protocol stacks may be accomplished.

According to an embodiment, the signaling gateway may further comprise a network management unit for performing one of the above-mentioned network management procedures with respect to the second signaling point code. As an example, the network management unit may be configured to route a message querying the state of a SS7 network node received from the network node associated with the second SPC to the SS7 network node, and to route a message indicating the state of a remote SS7 network node comprising the second SPC as a destination address towards the network node associated with the second SPC.

According to another embodiment, the lower protocol layer may be configured to store a state indicator indicating a availability state of the network node associated with the second SPC, and to change the state indicator in accordance with a request from the upper protocol layer. As an example, the SS7 protocol stack may comprise an extended service access point (SAP) between the lower protocol layer and the upper protocol layer for the second SPC, using which the upper protocol layer is able to change the availability state or a congestion status or both of the second signaling point code. Such a configuration is beneficial as it may enable a coupling of the availability of e.g. an SUA layer at an application server process with the availability state of the second (or hosted) SPC stored at e.g. an MTP3 layer of the signaling gateway. The availability of the hosted SPC may then be indicated to remote SS7 network nodes using MTP3 or SCCP procedures.

According to another embodiment, the signaling gateway further comprises a congestion management unit configured to perform one of the above-mentioned congestion-related methods. Thus, an enhanced congestion control for the network node associated with the second signaling point code is provided which may improve network protection against network and node congestions.

According to another aspect of the invention, a system for routing messages between a SS7 network and an IP-based network is provided. The system comprises at least two signaling gateways in one of the above-mentioned configurations, with each signaling gateway having a different first signaling point code allocated as a network address. Each signaling gateway is configured to route messages comprising the second signaling point code as a destination address to the same network node in the IP-based network associated with the second signaling point code. By such a system, the routing of the signaling messages via different signaling gateways is achieved, while traffic may still be delivered to an upper, e.g. SCCP, user protocol layer of the signaling gateway. Such a system further provides signaling gateway redundancy.

According to another aspect of the invention, a method of routing signaling messages between an SS7 network and an IP-based network communicating via at least two of the above-mentioned signaling gateways is provided. The method comprises routing a signaling message to a network node of the IP-based network via one of the two signaling gateways and, in case the route via the one signaling gateway becomes unavailable or congested, routing the signaling message to the same network node via the other of the at least two signaling gateways. Accordingly, in case one of the gateways fails or loses connectivity, messages can still be routed and processed by the other signaling gateway, even using the upper protocol layer or the upper user adaptation protocol layer.

According to a further aspect of the invention, an electronically readable data carrier with stored electronically readable control information is provided. The control information is configured such that when using the data carrier in a computer system, the control information performs one of the above-mentioned methods. The control information may also be comprised in a computer program product, which may be implemented in form of a data carrier.

Those skilled in the art will appreciate that the above-mentioned features of the different embodiments and aspects of the invention may be combined. As an example, a signaling gateway may be configured to perform one of the above-mentioned methods, whereas a method may comprise further steps as described with respect to the signaling gateway. Thus, the features of the above embodiments and aspects may be combined to form new embodiments.

The foregoing and other features and advantages of the invention will become further apparent from the following detailed description read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Embodiments of the present invention are illustrated by the accompanying figures, wherein.

DETAILED DESCRIPTION OF THE INVENTION

Figure 1:
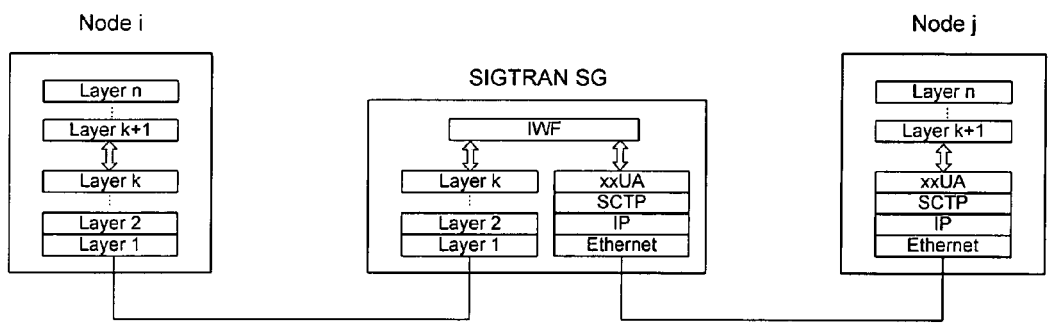
FIG. 1 is a schematic drawing illustrating the layer structure of network nodes in an IP-based network and in a legacy network connected by a SIGTRAN signaling gateway terminating certain layers.
Figure 2:
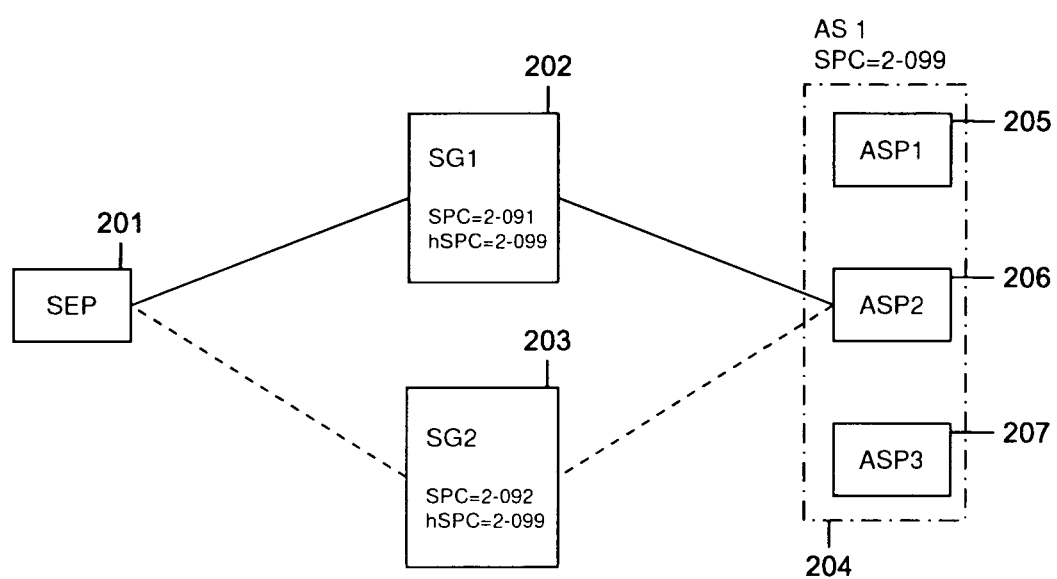
FIG. 2 is a schematic block diagram illustrating a network configuration according to an embodiment of the invention.

FIG. 2 schematically illustrates the communication of a signaling endpoint (SEP) 201 via a signaling gateway with an application server process (ASP) 201 of the application server (AS) 204. A signaling point code (SPC) is allocated to application server 204. Both signaling gateways, signaling gateway (SG) 202 and 203, are configured to process traffic for the network node associated with said signaling point code, i.e. application server 204. The SPC associated with AS 204 is "hosted" at SG 202 and SG 203, and thus called a "hosted SPC (hSPC)". Signaling gateways 202 and 203 both route traffic addressed to the hSPC and perform network management and congestion management procedures for the hSPC. Accordingly, an e.g. SCCP message addressed by SEP 201 to the hSPC may be routed either via SG 202 or SG 203. If an association between a SG and AS 204 fails, traffic may be routed via the other SG. A method of enabling a processing of e.g. SCCP messages addressed to the hSPC at the signaling gateway will be illustrated by means of FIG. 3.

Figure 3:
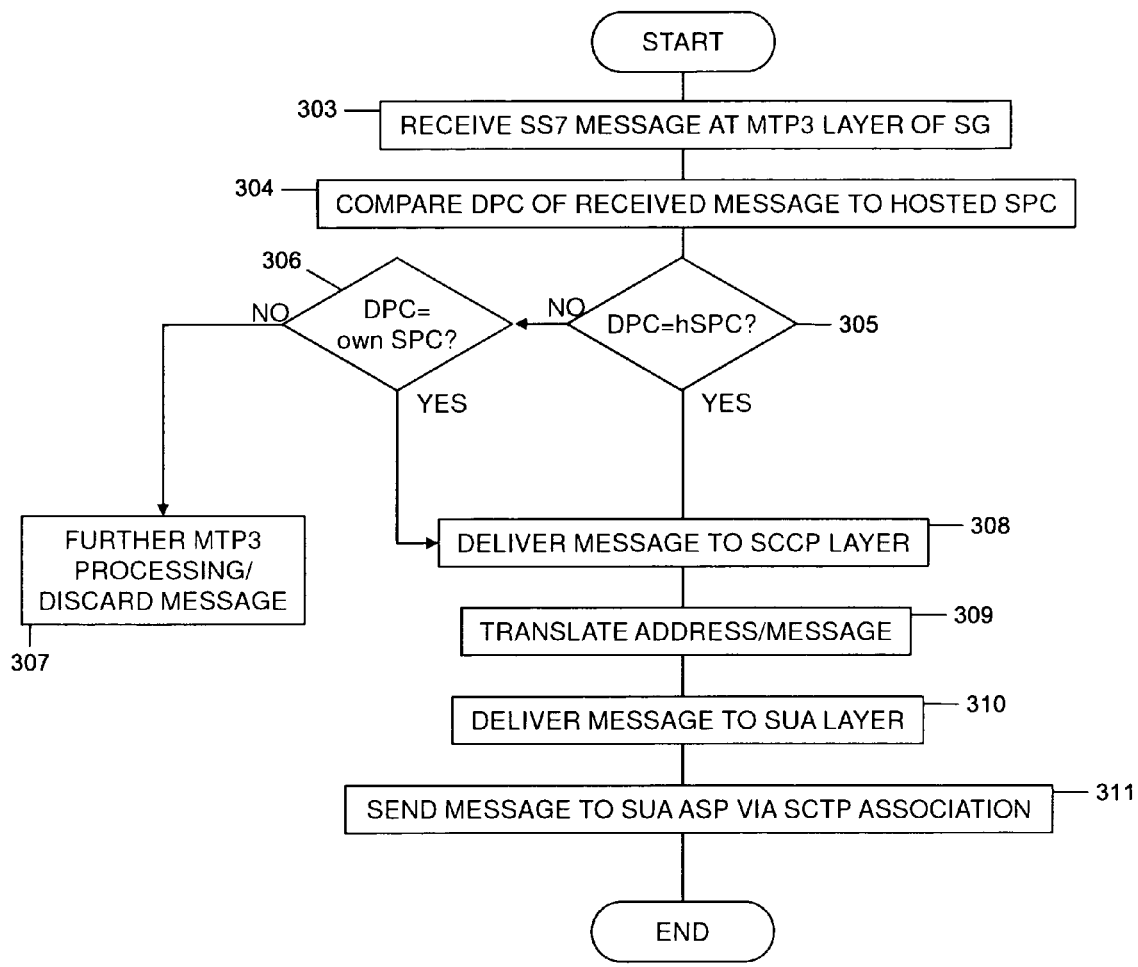
FIG. 3 is a flow diagram illustrating a method according to an embodiment of the invention.

FIG. 3 shows a flow diagram of an embodiment according to the invention. The method is performed at a signaling gateway comprising an SS7 protocol stack with a MTP3 and a SCCP layer, and an IP protocol stack with a SCTP and a SUA layer. The signaling gateway may of course comprise further underlying layers providing support for the transport of messages. In step 303, a SS7 message is received at the MTP3 layer of the signaling gateway. The destination point code (DPC) comprised in the message is compared to the hosted SPC of the signaling gateway in step 304. If in decision 305 the DPC does not match the hSPC, the method proceeds with decision 306, where the DPC is compared to the own SPC of the signaling gateway. If they do not match, the message may be further processed at the MTP3 layer, e.g. for SS7 routing, or the message may be discarded in step 307.

If a match is found in one of decisions 305 or 306, the message is delivered to the SCCP layer of the SG in step 308. The message is then transcribed or translated in step 309, e.g. by an interworking function of the SG. This may comprise the determining of new address parameters for routing the message in the IP-based network. In step 310 the message is delivered to the SUA layer, and further sent to an IP-based network node via an SCTP association in step 311. The IP-based network node is for example a SUA application server process (ASP). It should be clear that the method may comprise further steps commonly performed when relaying messages between a SS7 and a SIGTRAN network, e.g. steps known from RFC 4666 or RFC 3868.

Accordingly, the method enables a processing of a message destined to the hSPC at the SCCP and the SUA layer of the signaling gateway. A relaying of the message via different signaling gateways and a performing of network management procedures for the hSPC is thus enabled.

Figure 4:
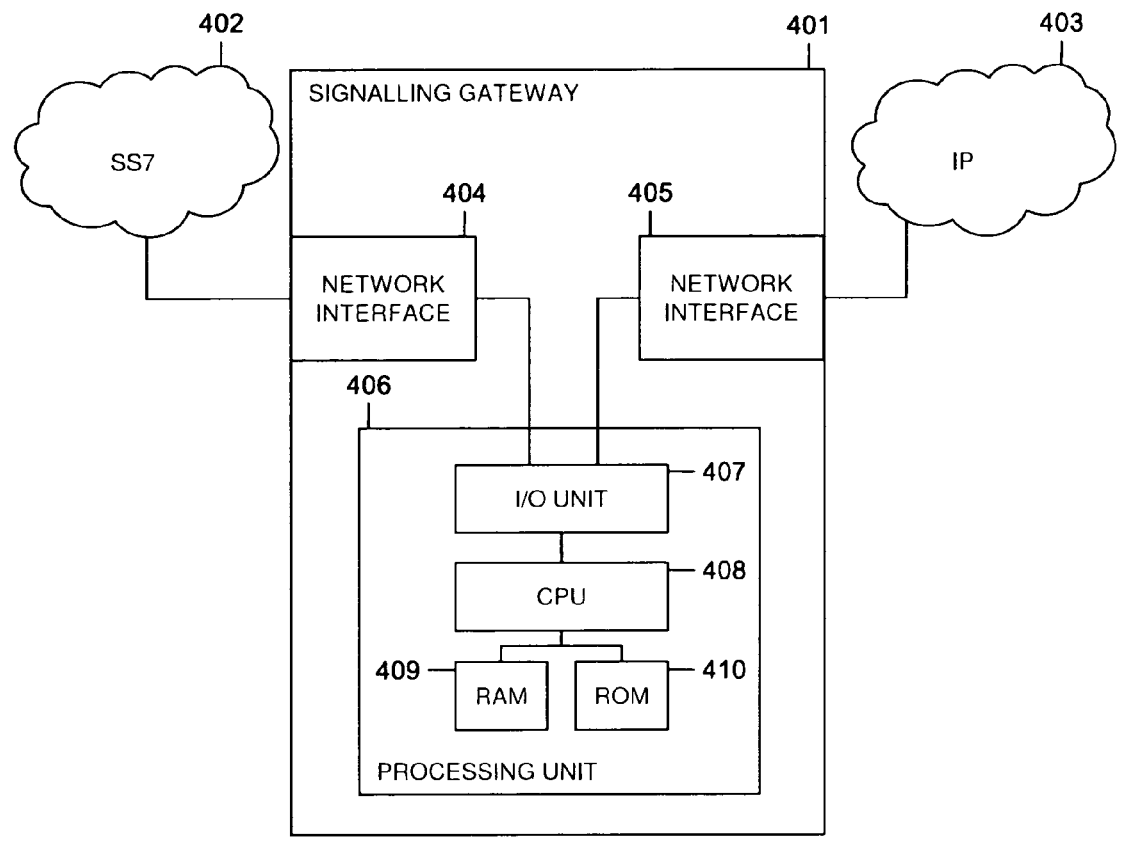
FIG. 4 is a schematic block diagram illustrating components of a signaling gateway according to an embodiment of the invention.

FIG. 4 schematically shows a signaling gateway 401 according to an embodiment of the invention for relaying messages between an SS7 network 402 and an IP-based network 403. SG 401 comprises a network interface 404 towards network 202 and a network interface 405 towards network 403. SG 401 further comprises processing unit 406, which includes input/output unit 407, central processing unit 408, random access memory 409 and read-only-memory 410. Software running on CPU 408 may implement several functional units of the signaling gateway 401. Software running on CPU 408 may be configured so as to perform the method according to an embodiment of the present invention. Processing unit 406 may further comprise other types of memory, such as volatile and non-volatile memories, e.g. flash memory, a hard drive, and the like. Such a memory may for example be used to store the status of remote network nodes in the IP-based network 403, or a local or remote congestion status. It should be clear that signaling gateway 401 may comprise further processing units 406, which may in turn comprise multiple processors 408, so as to implement multiple signaling gateway processes. Interface 404 may be configured to establish a large number of SS7 links, whereas network interface 405 may be configured to establish a large number of M3UA or SUA associations.

Figure 5:
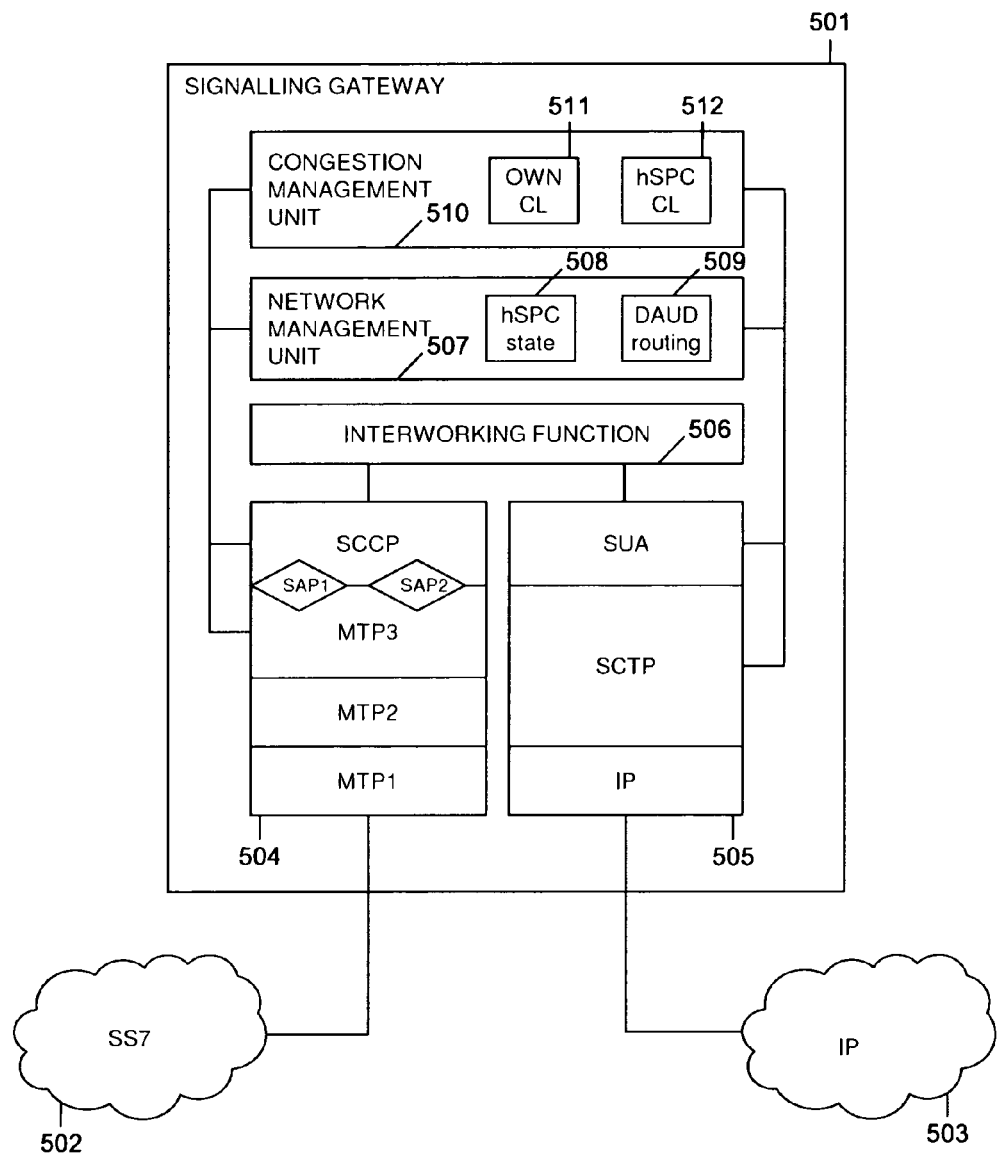
FIG. 5 is a schematic block diagram illustrating a layer structure and functional units of a signaling gateway according to an embodiment of the invention.

FIG. 5 shows a signaling gateway 501 with functional units according to an embodiment of the present invention. The signaling gateway 501 routes signaling traffic between a SS7 network 502 and an IP network 503. SG 501 comprises a SS7 protocol stack 504 with a message transfer part 1 (MTP1) layer, a MTP2 and a MTP3 layer. Protocol stack 504 further comprises a signaling connection and control part (SCCP) layer, with two service access points (SAP) SAP1 and SAP2 being provided between the MTP3 and the SCCP layer. SAP1 is an SAP for the own SPC of SG 501, whereas SAP2 is an SAP for the hosted SPC of signaling gateway 501. SAP1 and SAP2 can be considered one extended services access point. A new primitive may for example be implemented at the upper boundary of the MTP3 layer, as will be described in greater detail later. The MTP3 layer is configured to deliver messages addressed to both the own SPC and the hosted SPC of the signaling gateway 501 to the SCCP layer. SG 501 further comprises an IP protocol stack 505 with an IP layer, a stream control transmission protocol (SCTP) layer and a SCCP user adaptation (SUA) layer. It should be clear that the protocol stacks may comprise further layers, such as an Ethernet layer for the IP protocol stack, and further application layers. An interworking between the SCCP and the SUA layer is achieved by the interworking unit or interworking function 506. Such an interworking may comprise the translation or transcription of messages between formats conforming to the SUA or the SCCP layer, as well as the mapping of address-related information. A routing key may for example be used to determine the appropriate destination in the IP-based network 503 for a message received from SS7 network 502. The SUA layer may send a translated message to an application server associated with the hosted signaling point code on a SCTP associated towards an application server process (ASP) active and serving the application server.

SG 501 further comprises network management unit 507. Unit 507 comprises a unit 509 for routing of network management messages between the SS7 and the IP network, such as destination state audit (DAUD), subsystem prohibited (SSP) or subsystem allowed (SSA) messages. It further comprises unit 508 storing the state of the hosted SPC. The state may be changed in accordance with messages received from the network node of the IP-based network 503 associated with the hosted SPC. Network management unit 507 may implement one of the above-described network management or traffic management methods. It may perform traffic management and stage maintenance procedure both for the own SPC and the hosted SPC. Functions of network management unit 507 may be implemented within layers of the protocol stack. The stage of the hosted SPC may for example be stored in the MTP3 layer, which may also perform network management procedures towards the SS7 network for the hosted SPC.

SG 501 further comprises congestions management unit 510. Congestion management unit 510 may comprise a unit 511 for storing an own, local congestion level of the SG 510, and a unit 512 for storing a congestion level of the hosted SPC. The congestion level of the hosted SPC is updated in response to receiving congestion management messages from the IP network node associated with the hosted SPC. For performing congestion management, unit 510 may implement any of the above-described congestion management procedures. It may further implement congestion management procedures as known in SS7 and SIGTRAN standards. It may for example perform congestion control functions relating to a restriction level (RL), a restriction sublevel (RSL), a transport-related restriction level (RLm) or a transport-related restriction sublevel (RSLm). Unit 510 may further comprise a timer for decreasing the congestion level for the hosted SPC a predetermined amount of time after the last update of the congestion level was performed. Functions of the congestion management unit 510 may also be implemented in layers of the SS7 or IP protocol stack. Congestion management unit 510 may furthermore be configured to compare the own congestion level and the congestion level of the hosted SPC and to submit the larger of them as a congestion level indication to a network node from which a message was received.

The units and layers shown in FIG. 5 may be implemented as software code portions running on one or more microprocessors of the signaling gateway. Parts of the MTP1 layer may also be implemented as hardware. It should be clear to a person skilled in the art that signaling gateway 501 may comprise further components common to signaling gateways. As such components are known to the skilled person, they will not be described in greater detail here.

In the following, further embodiments of a signaling gateway, a system and a method according to the invention will be described.

The concept of a hosted address, e.g. hosted SPC, enables multiple SGs scenarios. In the present embodiment, an address, say Addr, is hosted in a (legacy) protocol layer (of an SG), if a the underlying (SS7/egacy) protocol layer provides a local SAP for Addr so that upper layers can bind to this SAP b the underlying (SS7/legacy) protocol layer treats Addr as an identity of a remote node in all its functions except for discriminating function where the underlying layer treats Addr as an own address and delivers incoming traffic messages to an upper layer via a local SAP c the underlying SS7 protocol layer performs NW management procedures towards peer nodes for Addr, indicating availability and congestion status of Addr to remote peers d Upper layer bound to a SAP of Addr can request the underlying layer to change availability and congestion status of Addr and perform corresponding NW management procedure to indicate a requested status of Addr to remote peers Addr may have a finer granularity than addressing of nodes in legacy networks. This might be legacy layer specific.

The concept of a hosted address makes legacy nodes believe that the SG node is an intermediate node, such as an STP, on a path towards another legacy node. Therefore, multiple SGs scenarios become possible.

From a SIGTRAN SG perspective, a hosted address resides in a set of IP nodes implementing at least one distributed application server accessible via a SIGTRAN protocol.

Some SCCP functions, especially SEP specific functions such as subsystem test and remote SCCP test, are moved from SUA SG to SUA ASP nodes. This is possible when MTP3 and SCCP layers in SUA SG implement the hosted address concept for point codes. In this case, hosted point codes and applications owning hosted point codes reside in multiple SUA ASPs.

In contrast with adopted SIGTRAN architectures, in the present embodiment SGs do not keep states of certain entities residing in a legacy network, since SIGTRAN ASPs have to do so anyways. For example SIGTRAN SGs will not keep states of remote subsystems communicating with subsystems at a hosted address. Instead, SGs implement a mechanism of identifying similar or identical requests coming from ASPs and querying states of remote entities in a legacy NW, e.g. similar or identical DAUD messages. SGs cash requests for duration of an inhibiting timer. SGs translate requests of a SIGTRAN protocol to corresponding messages of a legacy protocol (e.g. SCCP) and send them to target legacy nodes and start corresponding inhibiting timers. If any other ASP sends a similar request to a same SG, and the corresponding inhibiting timer is running, then the SG silently discards the request. When the cashed request is answered with a legacy message from a legacy target to an SG, the SG broadcasts the answer to all concerned SIGTRAN ASPs via a corresponding SIGTRAN message, and if the SG can identify the corresponding cashed request, the SG stops the corresponding inhibiting timer and removes the cashed request.

SGs have to keep the states of peer ASPs and ASes following SIGTRAN standards. However, interworking of corresponding network and traffic management procedures has to be adapted to hosted address (SPC) concept. For this purpose, a new primitive is introduced between MTP3 and SCCP layers, which triggers external MTP3 or M3UA messages reflecting the status of hosted SPCs.

This mechanism is somewhat similar to a set of degenerated leaky buckets, where each bucket can contain one entity only. When a new request comes from an ASP and the corresponding bucket is empty, the request is translated to a legacy message. If an answer comes, the bucket is emptied. The bucket is emptied after a timeout.

The concept of hosted address changes the relation between layers in the SIGTRAN SG and enables use of multiple SIGTRAN SGs providing connectivity to a same application server.

Figure 6A:
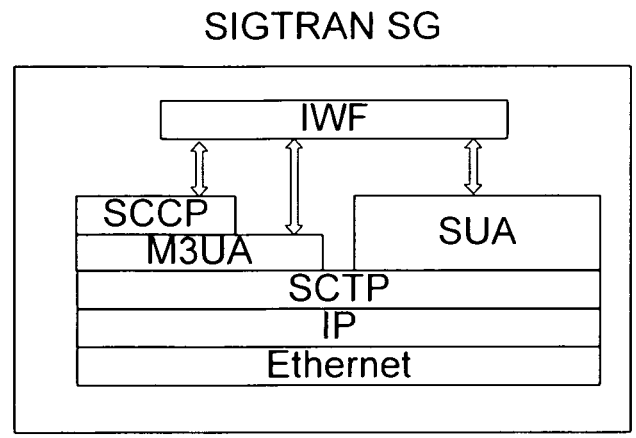
FIG. 6A is a schematic diagram illustrating an IP layer structure of a SIGTRAN signaling gateway according to an embodiment of the invention.
Figure 6B:
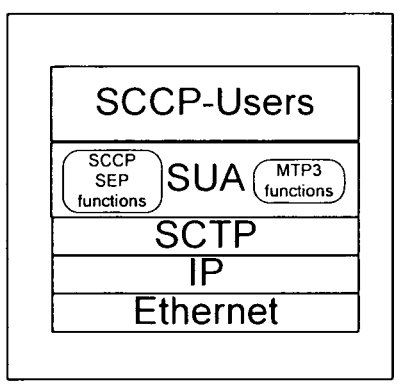
FIG. 6B is a schematic drawing illustrating the layer structure of a SIGTRAN ASP according to an embodiment of the invention.

In the following the use of hosted address concept for SUA SGs is explained and explanations are given on necessary changes in signaling network management procedures implemented in SGs and ASPs. The hosted address concept benefits from a move of SEP functions of SCCP, M3UA and MTP3 layers from SUA SGs to SUA ASPs, as shown in FIGS. 6A and 6B. This is detailed in subsequent descriptions of network management procedures performed by SGs and ASPs. For instance the SUA layer at ASPs needs a routing function to select a SG as next hop on the path an outgoing message takes; this one is very similar to the MTP3 routing function and has to include procedures similar to "forced re-routing" and "controlled re-routing" of MTP3.

Although SGs hide the structure of distributed application servers, they shall not hide availability states of different application servers from external NE, for example availability of signaling points codes where applications reside in IP network. On the contrary, the SGs shall inform legacy NEs about application servers' availability states.

According to an embodiment, every SG performs (independently from other SGs) network management procedures to indicate status change (availability, unavailability and congestions) of signaling points and SS7 subsystems towards signaling processes serving ASes and towards legacy network elements. So that, when connectivity is lost or deteriorated in one or more SGs, signaling peers can switch signaling traffic over to other SGs. An alternative based on communication between SGs, where SGs coordinate SPC and SSN status states between them, so that in case of connectivity change on one SG, the SG can reroute traffic to the other SG is less robust.

The scope of NW management procedures in multiple SIGTRAN SGs scenarios is the same as in single SG scenario and consists of Maintaining on ASPs of following information about remote SCCP peers
remote SPC status (inaccessible, accessible, congested)
remote SCCP status (unavailable, available, congested)
remote Subsystem status (prohibited, allowed)
from SGs provide remote SCCP signaling peers with indications about
local SCCP status (available, congested)
local Subsystems status (prohibited, allowed)
from each SG provide remote MTP and M3UA peers with indications about status of hosted SPCs residing in SUA ASPs (inaccessible, accessible)

Components of SIGTRAN network shall support SNM procedures that keep up-to-date and consistent the management status of SNM managed entities at all components and at legacy NEs which originate/terminate signaling relations.

Figure 7A:
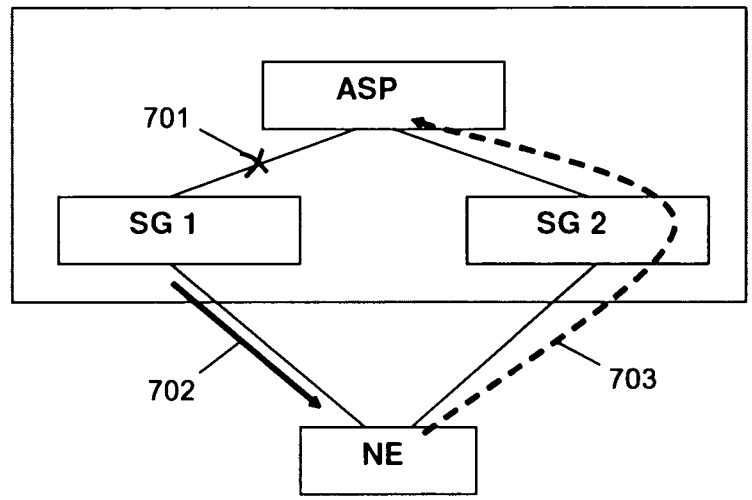
FIG. 7a is a schematic block diagram illustrating the sending of messages upon an association failure.
Figure 7B:
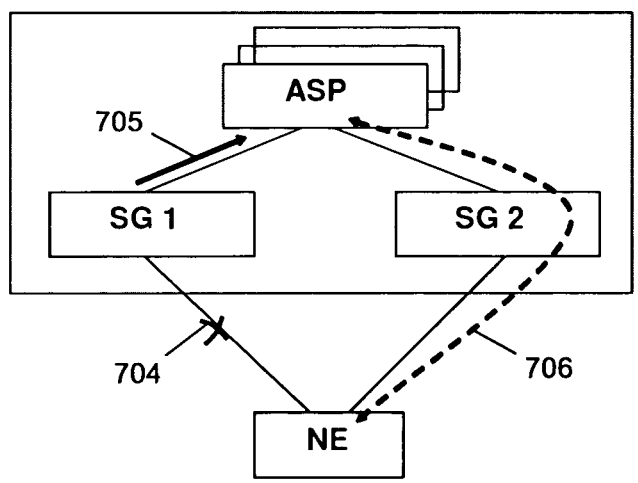
FIG. 7b is a schematic block diagram illustrating the sending of messages upon an SS7 link failure.

FIGS. 7A and 7B present two high level interaction diagrams for the cases where status change is detected in an SG of a multiple SG scenario for status of 1) ASes
2) external NEs The diagrams in FIGS. 7A and 7B show the wanted behavior of SGs in multiple SG scenario. However, re-routing is not always possible and depends on NW setup. For instance, in case SSNs become prohibited, re-routing is not possible, unless a secondary routing option is provisioned in GTT tables. An exemplary case where it is possible to achieve re-routing is when an SPC becomes inaccessible over one route, but it is still accessible over another route. This example suggests the concept of hosted SPC in a scenario of multiple SUA SGs as STPs.

In FIG. 7A, when SG1 detects a change of connectivity (704) towards SUA or M3UA ASPs, SG1 shall notify concerned remote NEs accordingly (702, using SUA, M3UA, SCCP, or MTP3 messages) if SS7 NW management procedures and messages allow this. It is expected that notified remote peers can re-route traffic to other SGs (703). In case SG sends an SSP message remote SCCP peers are not able to reroute traffic to other SGs. Nevertheless sending of SSP may be needed to indicate unavailability of application servers connected in associated mode of signaling to the SG; this is a case of single SG scenario.

In blade cluster architectures implementing an application server with a front end SG placed in a signaling proxy node, change of SG connectivity with application servers is equivalent to a change of a SUA AS state at a signaling proxy acting as a SUA SG, when the AS resides in blades implementing an application server, e.g. an MSC-Server.

In FIG. 7B, when SG1 detects a change of connectivity (704) towards an external NE, SG1 notifies concerned SIGTRAN ASPs accordingly (705, using SUA or M3UA messages). ASPs re-route concerned traffic via other SGs (706), when the affected destination is available via other SGs (SUA or M3UA SG). A change of connectivity of an SG to an external network element (NE) may for example be a change of status of a remote subsystem of a remote SCCP instance, or of a signaling point code residing in legacy network.

Network (NW) management procedures for the case of multiple M3UA SGs are defined in M3UA standard.

Signaling Network Management (SNM) at SUA SGs

The NW management solution described here aims at interworking of SNM procedures at SIGTRAN SGs. It assumes that independent signaling transport stacks at SGs. That is, there is no dedicated protocol running between SGs which synchronizes states of managed objects defined at a same protocol layer.

In order to interwork SCCP NW management in SGs and ASPs, the following managed objects may be provisioned:

Each SG has provisioned all signaling relations which span across the SG. Signaling relations can be defined via their endpoints such as signaling point codes which reside in SUA and SCCP networks and can communicate with each other.
ASPs have provisioned their peers residing in SS7 networks, that is, SS7 SPCs.
In addition to signaling points codes SGs and ASPs will have provisioned remote subsystems identified by their SPCs and SSNs.

The status of managed objects (SSN, SPC, remote SCCP) residing in SS7 network shall be kept up-to-date on concerned entities, e.g. ASPs.

The status of signaling points and subsystems that reside in SUA network is determined by the state of the SUA ASes serving the corresponding SPC. Table 1 shows this dependence from SG perspective, under the assumption that the RK served by ASes includes all possible source addresses and RK granularity of subsystem number (SSN) is not used.

TABLE 1

| SUA managed entity & status | States of serving SUA ASes |
|---|---|
| SPC Accessible | the AS that serves the SPC is in state Active (or Pending) |
| SSN + SPC Allowed | The AS that serves the SSN + SPC destination is in state Active (or Pending) |
| SPC Inaccessible | the AS that can serve the SPC is in state Inactive or Down, or there is no such AS |
| SSN + SPC Prohibited | the AS that serves the SSN + SPC destination is in state Inactive or Down, or there is no such AS (This state may be used to trigger SSPs for SSNs at SDPCs) |
| Remote "SCCP" (SPC) Unavailable | the AS that serves the SPC where "remote SCCP/ SUA" is located is in state Inactive or Down, or there is no such AS |
| Remote SCCP (SPC) Available | the AS that serves the SPC where "remote SCCP/SUA" is located is in state Active. |
| Remote SCCP (SPC) Congested | the AS in state Active and the AS is marked congested. The congestion level of the SPC can be taken as the maximal congestion level across all ASPs that can serve the AS. |

Please note that management procedures at SG related to status of signaling points and subsystems that reside in SUA network shall depend on the type of that SPC; hosted and own addresses of applications (e.g. SPCs) may have different procedures. SCCP network management procedures are performed on behalf of a signaling point, that is, management messages are sent with certain OPC in the routing label; this signaling point (OPC) receives the answers to initiated management procedures, such as ""subsystem test", if needed. SIGTRAN SGs will use an SPC which belongs to the SCCP/SUA signaling relation on which the management message is exchanged. With introduction of the Hosted SPC concept, SGs can use either a hosted SPC or an own SPC of SG as OPC in interworked NW management procedures.

Thus, in the following two cases of SNM procedures performed at SGs are distinguished:

SNM procedures for Own SPCs of an SG, performed on behalf of Own SPCs of the SG (like defined in SIGTRAN standard)
SNM procedures for hosted addresses such as SPCs defined in SGs and served in IP nodes such as SIGTRAN ASPs. In this case SGs perform SNM procedures on behalf of hosted SPCs.

NW Management for Own SPCs of SGs (Standard SG)

In order to support
- External SCCP SEPs using MTP associated mode of signaling and connected directly to one SUA SGs
- local SCCP Users at SUA SG, and
- SCCP relay point (SRD) functions at SUA SG SUA SG may keep on supporting standard SCCP management procedures and run them on behalf of an Own SPC of the SG. SUA ASPs which share an SPC with the SG shall coordinate with the SG states of the corresponding managed objects.

Interworking of SNM procedures at SG with ASPs shall follow SUA standard in this case. In particular, SGs broadcast SCCP management information to signaling peers in SCCP network according to Table 1 and corresponding standard SCCP procedures. SGs inform SUA ASPs by broadcasting signaling network management (SNM) messages and translating from MTP layer to SSNM messages. ASPs may perform periodic audit of unavailable remote entities such as remote SCCP, SPCs, and SSNs.

NW Management for Hosted SPCs

SNM procedures performed on signaling relations containing Hosted addresses (SPCs) are of two types
- SNM for Remote SCCP Peers,
  here the procedures manage status of SPCs, SSNs, and SUA layer residing in SUA network,
- SNM for SUA Peers
  the procedures manage status of entities at remote SCCP Peers, such as SPCs, SSNs, and remote SCCPs residing in SS7 network.

Due to the new concept of Hosted SPCs, and scenarios with multiple SUA SGs as STPs, the above mentioned bullets have different requirements on NW management procedures as compared to the "NW Management for Own SPCs of SGs" sketched above. These procedures at SGs deviate from standard procedures defined in SCCP and SUA.

SNM for Remote SCCP Peers

In an application server and associated SGs, there are several configurations of running SCCP NW management procedures towards remote SCCP peers that address the application server via hosted SPCs and use MTP quasi-associated mode, or M3UA transport. Three of those are considered here:
- Configuration 1, SNM at SG using Own SPC
- Configuration 2, SNM at SG using Hosted SPCs
- Configuration 3, SNM driven by ASPs Configuration 1, SNM at SG Using Own SPC In order to minimize the impact on SCCP layer in SGs, it could be suggested that status management of remote SCCP entities such as Remote SCCP, or SCCP subsystems is always performed at SGs on behalf of an Own SPCs. That is, here the SMN interworking described above shall be used for remote NEs that address IP nodes and application servers using SPCs defined as hosted in the SG.

Then, the SCCP subsystem status test procedure is initiated by SGs using own SPC of SGs, rather than hosted SPC defined in SGs and served by ASPs. It guaranties that responses to SSTs are received on the SG that has initiated SST; it also removes possible interference of SSN test procedures run by different SGs.

The drawback of this configuration is that it requires provisioning of own SPCs of SGs in remote SCCP SEPs at MTP3/M3UA level as remote signaling endpoints, and at SCCP level as remote SCCP SEPs, in addition to the hosted SPCs served by applications servers in IP network. Thus, this configuration adds unnecessary SCCP SEPs and new signaling relations to the overall NW picture, and has configuration overhead on legacy NEs communicating with IP application servers.

If an external NE communicates with applications at SGs and applications served by ASPs, then preferably ASPs shall serve a hosted SPC, which is different from the own SPC of the SG.

Configuration 2, SNM at SGs Using Hosted SPCs

In this configuration SGs keep up-to-date the status of all remote SCCPs and SSNs by themselves, as in case of configuration 1. Thus, SGs are responsible for performing SNM procedures, and at status changes and/or at audit from ASPs SGs inform ASPs about status of remote entities, such as remote SPCs, remote SCCPs, and remote SSNs.

In contrast with configuration 1, configuration 2 suggests that SGs perform SNM procedures on behalf of Hosted SPCs. Therefore, configuration 2 does not introduce new signaling relations in SCCP network configuration as configuration 1 does. However, SNM messages will not necessarily reach both SGs, and in general SNM messages will enter ASPs serving hosted SPC via one SG. For instance the SG which initiated a testing SNM procedure may not receive an answer to its SST, although the remote peer answers it. Therefore, in order to coordinate SNM states between the SGs, SGs shall support dedicated SNM behavior. The SCCP signaling relation between SGs can be seen as an additional improvement of configuration 2. It provides for additional coordination of SNM states in SGs.

Figure 8:
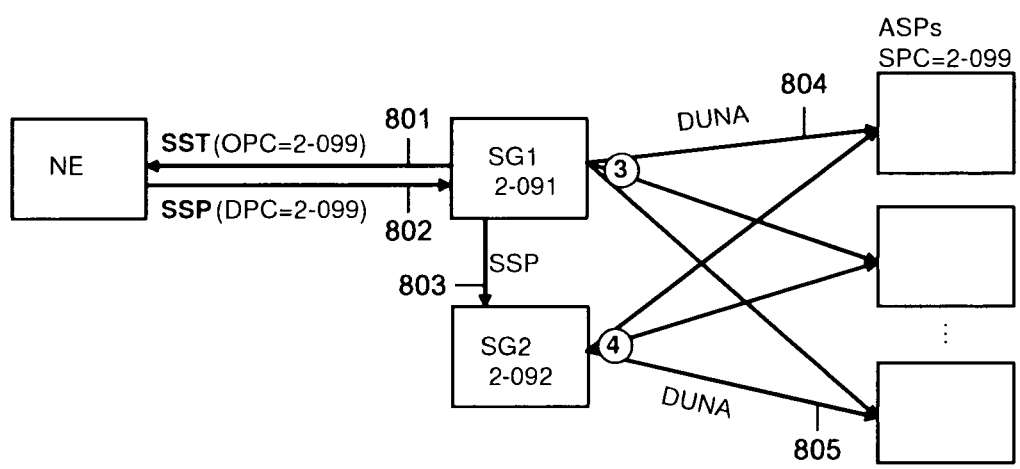
FIG. 8 is a schematic diagram illustrating a subsystem status test procedure according to an embodiment of the present invention.

FIG. 8 shows the main principle of configuration 2. Simplified message flow and corresponding events are as follows.

(0) SG1 detects that a remote SSN at NE is prohibited, due to an SSP received from an SCCP peer (SSP is not shown here), (1) SG1 performs SSN prohibited procedure: it marks the SSN as prohibited, starts subsystem status test (SST) procedure, which results in an SST 801 sent to the NE on behalf of Hosted SPC 2-099, and notifies its peers about the prohibited SSN using (local) broadcast (notifications are not shown in the figure), (2) NE answers with an SSP (SSA) 802 to the Hosted SPC 2-099, that is, either to SG1 or SG2, (3) SG1 or SG2 notifies its SCCP/SUA peers about the SSN status using (local) broadcast which results in SSP (SSA) 803 and DUNA (DAVA) 804 sent to SCCP and SUA peers including its mated SG, (4) Other SGs receive SSN status and start SSN prohibited/allowed procedure, if not yet started. In result the SSN status is updated and broadcast to the peers (e.g. via SSP, DUNA) 805. If the SSN is prohibited, SGs continues with SST procedure.

Configuration 3, SNM Driven by ASPs Serving Hosted SPCs

In this configuration the SGs do not perform SNM procedures on behalf of hosted SPCs by themselves as configuration 2 does. Instead, SGs relay SNM messages between remote NEs and ASPs. Thus, the SGs do not analyze/consider SNM indications/messages when they are indicated to hosted SPCs, but broadcast those to concerned ASPs. Therefore, SGs do not keep remote SSN states and remote SCCP states in SCCP layer. This way the burden of keeping the status of remote SSNs and remote SCCP entities for signaling relations with hosted SPCs is moved to ASPs, where hosted SPCs reside. Consequently, in this case, SGs do not need to synchronize any SNM related states, nor do ASPs have to deal with contradictory management information received from different SGs.

In order to reduce the number of SST messages sent to remote SCCP peers based on DAUDs received from the multiple ASPs, configuration 3 suggests to inhibit sending of SSTs from SGs for a while after an SST is sent. Additionally, to reduce the amount of SSTs sent from SGs, it is suggested that all ASPs audit remote SCCPs and SSNs via one SG only. If the SPC where the audited entities reside is not available via this SG, the ASPs start to audit them via the first SG where the SPC is available.

Figure 9:
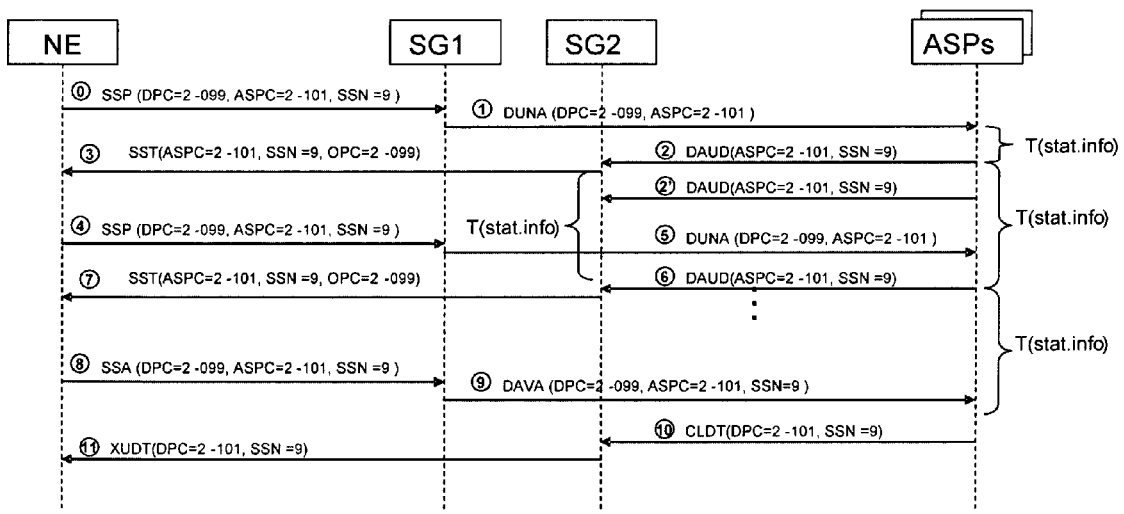
FIG. 9 is a flow diagram illustrating the auditing of a SS7 network node by an application server process according to an embodiment of the present invention.

FIG. 9 shows the main principle of configuration 3.

The message flow and corresponding events designated by reference symbols 1-11, shown encircled in the figure, are as follows.

0) The SG1 receives an SSP from an SCCP peer indicating that the remote SSN 9 at the SPC 2-101 is prohibited.

1) Since the SSP message is destined to the SUA hosted SPC 2-099, SG1 broadcast the SSP as a DUNA to all SUA ASPs serving the SUA hosted SPC (SHSPC) 2-099. The SG does not mark the SSN as prohibited, and does not start an SST procedure.

2) Each ASP that receives the DUNA message performs SSN prohibited procedure: it marks the SSN as prohibited, starts periodic audit of the SSN (the same as SST procedure of SCCP using timer T(stat.info)). Periodic audit of SSN 9 results in a DAUD sent to one dedicated SG, say SG2, where the SPC 2-101 is accessible.

3) SG2 relays the DAUD as an SST message to the SPC 2-101, records the SST and starts a timer T(stat.info) associated with the affected SPC 2-101 and affected SSN 9. For the duration of the timer the SG2 does not relay DAUD messages to the affected SPC for that SSN. DAUD contains the RC that identifies the AS served by the ASP. Based on the RC the SG2 sends SST on behalf of the SUA hosted SPC 2-099, to indicate the concerned SPC. That is, the OPC in the SST is 2-099.

2') Another ASP audits the same SSN. SG2 does not relay DAUD when T(stat.info) is running for that SSN.

4) The NE answers the SST with an SSP sent to SG1.

5) SG1 relays the SSP as DUNA to ASPs like in 1).

6) At T(stat.info) expiration at the ASP, it sends next DAUD as in step 2) and restarts T(stat.info).

7) Since T(stat.info) at SG1 has expired and the record corresponding to the old SST has been deleted, the SG2 repeats the same step as 3) above. This sequence of events and messages continues until the NE answers with an SSA.

8) NE receives an SST for an allowed SSN 9, it answers with an SSA to the originator of the SST, that is, to SPC 2-099.

9) SG1 receives the SSA. If there is any SST record associated with the affected SSN 9, the associated T(stat.info) is stopped and the record is deleted. The SSA is relayed as DAVA to all ASPs serving the SUA hosted SPC 2-099.

10) The ASPs receive DAVA, stop the ongoing audit ("test in progress" of SCCP standard), perform local broadcast of remote SSN status to their applications. Applications start sending traffic.

11) SGs relay traffic to SCCP SEPs.

Note that the T(stat.info) timer at the SG has a different function than in the ASPs, the function that inhibits sending of SST messages.

SNM for SUA Peers

Destinations and/or subsystems provisioned in an SG as residing in SUA network can change their status according to Table 1 above. When the AS status changes, the SG notifies concerned remote destinations (SCCP/SUA SEPs) about SPC and SSN status changes.

SPC Status Change

When a status change happens for an SPC residing from SG viewpoint in SUA network, the SG informs its peers that routing of signaling for the affected SPC is possible/not possible through the SG.

The following cases of external peers shall be distinguished, where the SG shall broadcast the status of the SUA SPC at SPC status change.

SCCP SEPs connected via multiple SGs (multiple SUA SGs as STPs scenario), in that case MTP peers use MTP quasi-associated mode of signaling.

Change of hosted SPC status will be broadcast to all adjacent signaling points by MTP3 level procedures sending transfer allowed (TFA)/transfer prohibited (TFP) messages as described below.

SCCP SEPs connected via one SG (standard scenario, single SUA SG), for instance due to MTP peers using MTP associated mode of signaling.

Change of SUA destination SPC status will be broadcast to all adjacent signaling points by SCCP level procedures sending SSA/SSP messages.

SCCP SEPs connected to multiple SGs via M3UA links.

This scenario is similar to the first one; change of a hosted SPC status will be broadcast to all adjacent signaling points by M3UA level procedures possibly sending DUNA/DAVA messages as described below.

Strictly speaking broadcast of a hosted SPC Status Change from an SG to its peers cannot follow SUA standard. It requires a novel way of interworking between MTP/M3UA and SCCP layers at SGs.

For example, the SUA layer in the SG can notify the SCCP layer, which on its turn will indicate to MTP3/M3UA layers that the SPC hosted in SCCP is available/unavailable. For this purpose, a new primitive MTP-PCSTATE request can be implemented at MTP3/M3UA upper boundary. Thus, when a user attaches to MTP3/M3UA service, it will indicate the possibility to host SPCs, and be able to request status changes of hosted SPCs to MTP3/M3UA layer via the MTP-PCSTATE request later on. MTP3/M3UA layer keeps the states of hosted SPC, while MTP3/M3UA user is responsible for keeping MTP3/M3UA layer up-to-date of status of hosted SPCs based on MTP-PCSTATE indications (requests) from SUA layer.

MTP-PCSTATE request primitive will provide the following parameters to M3UA/MTP3

Affected SPC hosted at user level

NI or NA

SPC status: accessible, inaccessible

Congestions of hosted SPCs can be indicated to MTP3/M3UA layer.

A SSN status change can be dealt with at an SCCP/SUA level, as described subsequently.

SSN Status Change

Table 1 above shows the status of SSN at SUA destinations and its dependency on SUA ASes. The SG may have the SSNs locally provisioned in order to indicate SSNs status to its peers. This is needed in order to follow the White and Blue Books of SCCP, and be able at SG to answer SSTs from SCCP peers.

Change of SSN status will be made visible to SCCP SEPs via modified SCCP subsystem status management procedures as follows.

SSN SUA Destination Allowed

When an SSN corresponding to a provisioned SUA hosted SPC becomes allowed, in accordance to the SUA AS state, the SG sends subsystem allowed (SSA) messages to all SCCP of the same network indicator (NI). SSA message includes the affected SPC and SSN.

SSN SUA Destination Prohibited

When an SSN corresponding to a provisioned SUA Hosted SPC becomes prohibited, in accordance to the SUA AS state, then the SUA Hosted SPC is inaccessible. Therefore, the SG does not send SSP messages to SCCP SEPs. Instead the SG acts as in case of "SPC Status Change" described above.

The SG considers this SSN prohibited, until the time the corresponding AS state becomes ACTIVE.

Response Method

The SG shall not use "response method" to send SSP message in response to a message sent to a prohibited subsystem at SNA hosted DPC (SHDPC), in contrast with standard SCCP.

The SG will only send SSA messages in response to a SST, if the status of the SSN is allowed at the affected SUA Hosted SPC. The SG may ignore SST messages with affected SSNs that reside at inaccessible SUA Hosted SPCs, although according to SUA RFC the SG should be sending an SSP in that case. Normally, SGs shall not receive SST messages for prohibited SSNs at inaccessible SUA Hosted SPCs.

If the Affected SSN is not locally provisioned, the SST should be ignored.

MTP3 Procedures

When MTP3 receives an MTP-PCSTATE request for an SPC hosted at user level, as in an STP when a (remote) destination status changes, the MTP3 employs one of the following procedures depending on the indication transfer-prohibited transfer-allowed.

In result TFP, or TFA messages are broadcast to adjacent signaling points. The MTP3 layer keeps the states of user-hosted SPCs and uses the response method to keep adjacent signaling points up-to-date of status of user-hosted SPCs.

Figure 10A:
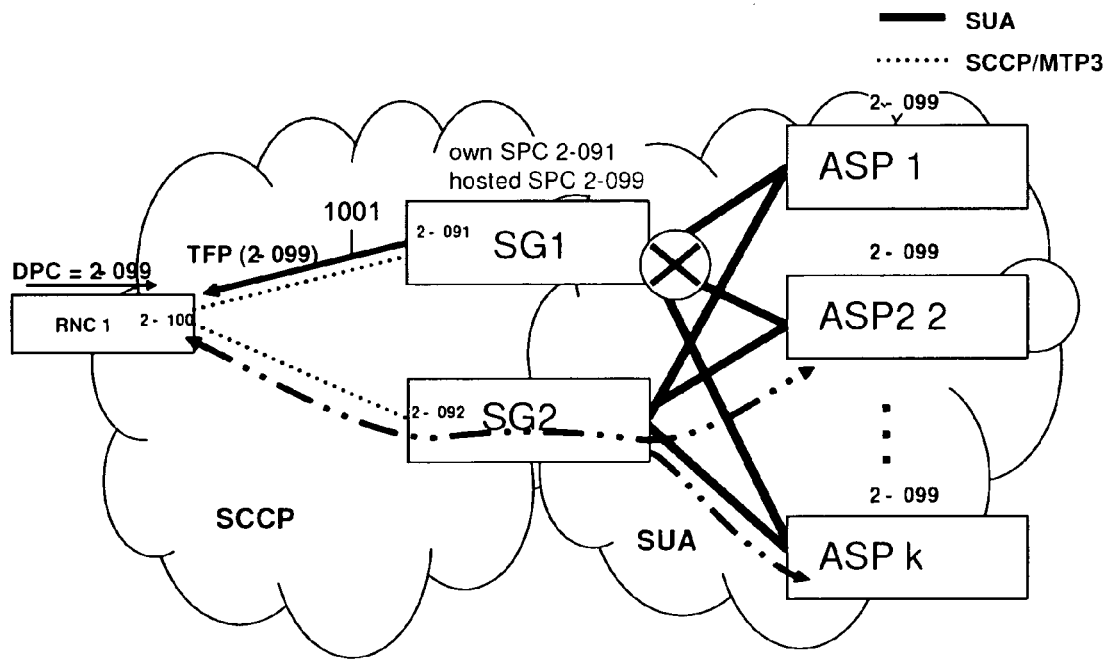
FIG. 10A is a schematic diagram illustrating the sending of messages in case an application server process becomes unavailable from a signaling gateway according to an embodiment of the invention.
Figure 10B:
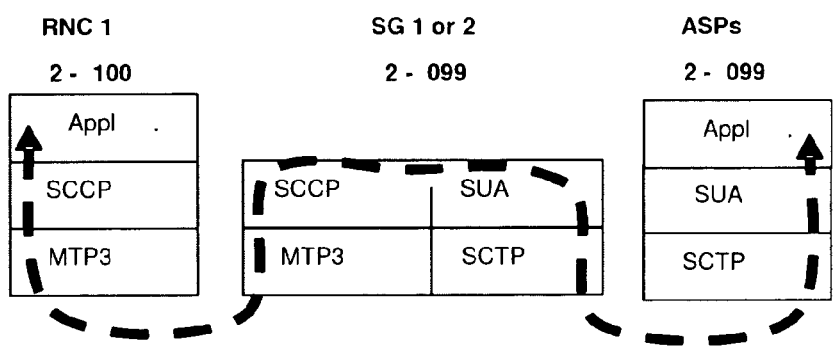
FIG. 10B shows schematically the layer structure of network elements of FIG. 10A.

FIGS. 10A and 10B illustrate sending of TFP message from SGs to adjacent nodes.

In FIG. 10A the signaling gateway SG1 comprises an own SPC 2-091 at an MTP level. SG1 and SG2 host SPC 2-099 associated with an application server comprising processes ASP1-ASPk. If SG1 loses connectivity to the application server, SG1 sends a TFP message 1001 with the hosted SPC as an effected point code to the SS7 network node RNC1, which operates in a quasi associated mode. If the SG1 would send a SSP message, the RNC1 would have a problem to reach the respective subsystem via the other signaling gateway SG2. Accordingly, a TFP message is sent instead of a SSP message. RNC1 now re-routes traffic via SG2 towards the application server processors ASP1-ASPk.

FIG. 10B shows protocols implemented at the respective network nodes. RNC1 implements an application layer APPL, a SCCP and a MTP3 layer. It should be clear that the network nodes may implement further layers, such as a MTP2 and MTP1 layer at RNC1 or at SG1 and SG2. The dashed line indicates the delivering of a message from an application on RNC1 to an application on a RSP via signaling gateway 1 or 2, and vice versa.

M3UA Procedures

When M3UA receives a MTP-PCSTATE request from a user, it shall indicate to all remote M3UA peers of a same network appearance (NA) that a hosted SPC is accessible or inaccessible as requested by the primitive. This can be done by sending DUNA, DAVA, ASP active (ASPA), and ASP inactive (ASPIA) messages to adjacent M3UA peers in the same network. Use of particular message type is determined by the type of the remote M3UA peer.

The M3UA layer keeps the states of Hosted SPCs and uses the "Response Method" to keep adjacent M3UA peers (signaling points) up-to-date with respect to status of user-hosted SPCs. Depending on the type of the remote peers the (SUA) SG node may use DUNA, or ERR with an "Unexpected Message" code.

Figure 11:
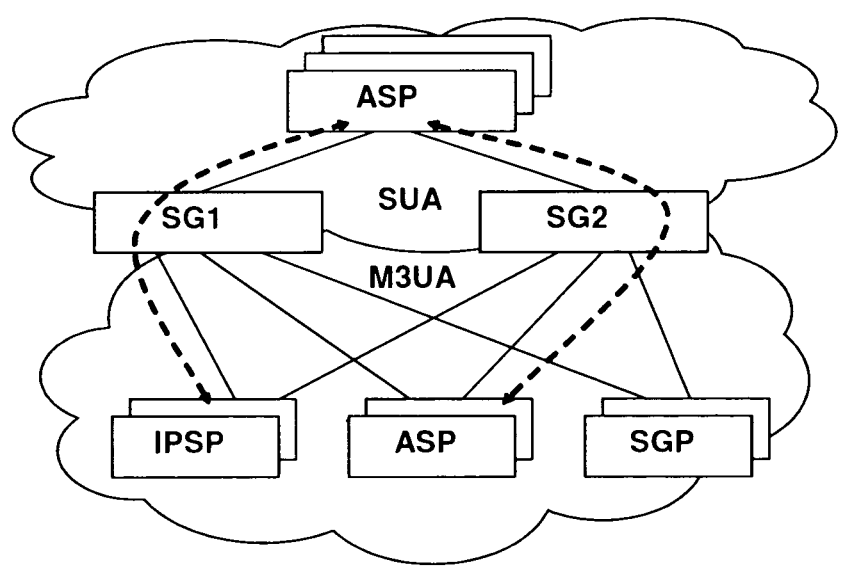
FIG. 11 is a schematic diagram illustrating the sending of messages to remote M3UA network nodes.

FIG. 11 shows possible NW scenario and types of remote M3UA Signaling Processes.

Table 2 summarizes possible indications, and corresponding M3UA messages depending on the type of the remote peer.

When (SUA) SG acts as an SGP, it has to send a DUNA, or DAVA message, and populate the message with affected point code parameter, and if needed with NA and RC based on MTP-PCSTATE request received. Sending of DUNA and DAVA corresponds to M3UA transfer prohibited/allowed procedures.

When (SUA) SG acts as an ASP or IPSP, it has to send an ASPAC, or ASPIA, if the granularity of provisioned RKs allows, that is, it is finer or equal to an SPC. When the provisioned RKs contain a number of destination SPCs including the affected SPC, then (SUA) SG should not send any indication to the corresponding remote M3UA peer. However, in case all SPCs of an RK change their state to one common state, the SG shall inform remote peers accordingly. If needed, the SG shall populate the message with NA, and RC based on MTP-PCSTATE request received and provisioned M3UA RKs.

For simplifications reasons, and in order to avoid signaling traffic disturbances and perform adequate network management in case SUA SGs act as an ASP/IPSP at M3UA level, it is suggested that M3UA RKs provisioned in the SUA SG have SPC level of granularity or finer, that is, the routing key (RK) should consists of one destination SPC+optional service indicator (SI).

TABLE 2

| MTP-PCSTATE request | Type of Remote M3UA peer | M3UA Role of SG | M3UA Message sent to indicate the status of a hosted SPC | Invoked M3UA procedure |
| --- | --- | --- | --- | --- |
| Accessible | ASP | SGP | DAVA | SSNM |
|  | SGP | ASP | ASPAC | ASPTM |
|  | IPSP | IPSP | ASPAC | ASPTM |
| Inaccessible | ASP | SGP | DUNA | SSNM |
|  | SGP | ASP | ASPIA | ASPTM |
|  | IPSP | IPSP | ASPIA | ASPTM |

A detailed description of the messages mentioned in table 2 is given in RFC 4666.

Congestion Control

SGs shall provide protection against node and network congestions. Application level mechanisms are not considered here, while standard SS7 and SIGTRAN congestion control procedures will be enhanced to provide congestion control in multiple SGs scenario.

Each component of SIGTRAN network has to perform certain congestion management in order to secure overall congestion control for the entire Network. Congestion control in SIGTRAN network can consist of the following parts Own Congestion Control in ASPs that results in indications of congestion status changes
  to SGs, which on their turn relay congestion status to concerned peers
  to other ASPs/IPSPs
Own Congestion Control of SGs that may result in indications of a new congestion status to remote peers as well as
to ASPs/IPSPs
   Remote Congestion Status Management in ASPs which controls the amount of outgoing traffic depending on remote congestion status Remote Congestion Status Management in SGs is not mandatory, unless SGs run their own local applications, or outgoing traffic limitation is needed on SGs in addition to ASPs.

Congestion Management in SIGTRAN SGs and ASPs can employ the following functions and procedures
   Standard SCCP, Congestion Control as defined by ITU-T
   Congestion Management in MTP3 and M3UA
   MTP3 Network Flow Control, and Transfer Controlled Procedures;
   M3UA Signaling Traffic Flow Control and M3UA Transfer Controlled Procedure
   SCTP based congestion avoidance, like
   Association sending buffer Congestion and Send Message failure due to congestions of send buffers
   Congestion abatement SUA layer can use SCTP indications of send buffer congestions like SCCP does use indications of MTP-STATUS primitive.

The following concepts of SCCP and MTP congestion control functions can be reused in ASPs and SGs
   CL—congestion level
   RL—Restriction Level
   RSL—restriction sublevel
   RLm—transport related restriction level
   RSLm—transport related restriction sublevel level
   OCL—Own congestion level
   Congestion Control for ANSI SS7 Networks ANSI does not have congestion management at SCCP level: no SSC message is defined by the standard. Therefore, due to differences in ANSI and ITU-T standards, SGs and ASPs can support own nodal congestion management if standard functionality is enhanced with special handling. These enhancements have to consider own nodal congestions of ASPs and SGs in the following procedures
   ANSI MTP procedures related to
   Signaling Link Congestion and Signaling Link Discard Level
   Link Set Congestion
   Destination Congestion and its indication to User Parts
   M3UA Signaling Traffic Flow Control and M3UA Transfer Controlled Procedure These enhancements shall result in sending of TFC and SCON messages by means of response method at MTP3/M3UA layer, based on the information about own nodal congestion (or hosted SPC congestion) provided by the upper layer (SCCP).

In ANSI networks SGs and ASPs can support two different methods of congestion management shown externally to peer nodes SCON at SUA layer, and TFC/SCON at MTP3/M3UA layer. Moreover, in order to support own nodal congestion management, congestion related procedures in ANSI MTP3 and ANSI specific procedures of M3UA have to be enhanced.

Subsequentially, possible implementations of congestion control in SGs and ASPs within ITU-T and ANSI networks are sketched.
   ITU-T, TTC, MPT Networks
   Congestion Control on ASPs
   SUA ASPs can re-use standard SCCP Congestion control methods.
   Remote Congestion Status Management in SUA ASPs/IPSP shall follow SCCP standard procedures for
   MTP Restriction Level and Sublevel Updating,
   the ASP/IPSP shall receive and use SCONs that represent N-PCSTATE primitive containing MTP-STATUS information; this is the case of SCON without SSN parameter included in it.
   Remote SCCP Congestion Level Updating
   The ASP shall receive and use SCONs that represent SSC messages; it is the case of SCON having SSN parameter included in it; it represents N-STATE primitive.
   Restriction Level and Sublevel Updating
   Local Broadcast of Restriction Level
   The type of network (national/international) is known by RK provisioning and corresponding handling of national or international standard applies.
   Local Congestion Status Management in SUA ASPs/IPSPs shall follow standard SCCP procedures for
   Own SUA Congestion Level Measurement
   where node specific architecture dependent SCCP methods of "Own SCCP Congestion Level Measurement" should be possible to use.
   Sending of SCON Management Messages
   the ASP/IPSP shall send and use SCONs that represent SSC messages; it is the case of SCON having SSN=1 parameter included in it.
   Since SUA RFC allows use of SCON in SUA IPSPs/ASPs, it may be used in SUA IPSPs, for flow control purposes as SSC is used in standard SCCP. Then IPSPs can provide own nodal congestion control. The same applies to SUA ASPs with respect to sending SCON messages.

It is noteworthy that Affected SPC is a mandatory parameter in SCON. Therefore, if we follow the RFC, the IPSP has to introduce a dummy SPC, which shall be interpreted as an indication that own nodal congestion is experienced in the IPSP originating the SCON message.

Traffic handling in SUA ASPs/IPSPs it shall be possible to define default and maximum importance values for SUA messages via application parameters similar to standard SCCP. Actions at traffic originator and receiver shall follow the standard SCCP with the following exceptions
   Message importance shall be included in SUA traffic related messages when SUA standard allows for it (e.g. CODT cannot include Importance IE, while CLDT can, in contrast with UDT of SCCP)
   No segmentation applies in ASP/IPSP
   Actions at an intermediate node do not apply to SUA ASPs/IPSPs
   Traffic Limitation in SUA ASPs/IPSPs shall follow "Outgoing Traffic Limitation Criteria" and "Incoming Traffic Limitation Criteria" which are normally followed in SCCP networks.
   Congestion Control on SGs
   SGs can manage congestion status for
   Remote SCCP
   SUA ASes (SUA destinations)
   Local SG nodal congestion The SG can support "Remote Congestion Status Management" for all locally provisioned SCCP SEPs exactly as in standard SCCP networks and nodes. It is needed to indicate remote congestions to local users in SG, if any, and discard/reduce outgoing traffic. When there are no local applications in the SG, this function can be disabled. It can also be used to discard outgoing SCCP traffic originated in the ASPs. Therefore, "Remote Congestion Status Management" shall be a configuration option in SGs.

Additionally, the SG will distribute congestion status of remote SPCs and SCCP peers to SUA ASPs (ASPs). Received SSC messages will be broadcast to all ASPs serving a DPC of a received SSC message. MTP indications of congestions shall be broadcast to all ASPs serving the concerned destination, that is, a DPC of a TFC message, if any. If MTP-indication of congestion does not provide a concerned destination, the SG broadcasts an SCON to all ASes serving SPCs of a same network.

Traffic Handling

Traffic handling in SGs shall follow SCCP principles when it comes to congestion control. It shall be possible to define default and maximum importance values for SUA (and SCCP) messages. Actions at traffic originator and receiver shall follow SCCP with the following exceptions:

Message importance shall be included in SUA traffic related messages when SUA standard allows for it (e.g. CODT cannot include Importance IE, while CLDT can, in contrast with UDT of SCCP).

SCCP segmentation does not make sense SG for traffic towards ASPs (incoming traffic)

When message importance is not included in a received SCCP/SUA message the SG will assign an importance value using the default importance values. Importance value of the first segment of the reassembled message shall be used in SUA message at relay.

Traffic Limitation

Traffic limitation in SGs can follow "Outgoing Traffic Limitation Criteria" and "Incoming Traffic Limitation Criteria" of SCCP. An own nodal congestion level is used for incoming traffic limitation, while congestion levels of remote destinations are used for outgoing traffic limitation. Additionally, SCTP layer can discard messages when they are sent over a congested association.

In some cases SGs shall be able to distinguish between two types of SUA destinations and apply different logic. It should be possible that for one group of SUA destinations outgoing traffic limitation is not activated in SG, and at the same time, it should be possible that outgoing traffic limitation is activated for other SUA destinations.

In order to fulfill the above-mentioned requirements on traffic limitation, the SUA layer at SGs may have a different set of congestion control configuration parameters than the SCCP layer at SGs. Depending on the operator preferences SGs can employ incoming traffic limitation for traffic originated at "SUA destinations" (it can be a configuration option, but it shall be a different parameter than in SCCP, since SCCP parameters can have different or contradicting values). At the same time SGs should preferably not perform outgoing traffic limitation for "SUA destinations". Again it should be a configuration option, and different parameters shall be used than in SCCP layer.

Congestion Control on SGs, Congestion Management of SUA Destinations

The congestion status of SUA destinations, that is, SUA DPCs (SDPCs) and—SUA hosted DPCs (SHDPCs), is determined by the congestion status of the AS that serves corresponding SPCs. The SG will associate congestion control parameters CL, RLm, RSLm, RL, and RSL with every AS.

CL of SUA AS are calculated based on SCON messages received from the SUA ASPs serving the AS.

RLm and RSLm associated with an AS shall be calculated based on SCONs without SSNs and SCTP indications of association congestion towards ASPs that serve the AS.

Each AS has a congestion level (CL) associated with it. The value range of the CLs is from 0 to 8, where 0 means no congestion and 8 indicates most congested condition. Updating CL of an AS shall follow standard SCCP procedure "Remote SCCP Congestion Level updating". Received SCON message from an ASP which serves an AS can be treated like an SSC message:

When SG receives an SCON with SSN=1 from an ASP that serves an AS, the CLs of the AS is updated if new value received is greater than the current CL value. Otherwise, current CLs value remains unchanged.

SGs decrement CL value using an administrable decay timer Tcon. This timer is started or restarted (if active) when a new CL received in SCON is not lower than the current CL value. When Tcon timer expires, the CL of AS is decremented. When CLs value becomes zero, the Tcon timer is cancelled.

Indication of association congestion is used to update the RLm and RSLm of the AS. An SCON that contains an SSN=/1, or does not contain an SSN is treated like an indication of SCTP association congestion, and is used to update the RLm and RSLm.

RL and RSL of an AS are updated based on CL and RLm and RSLm using methods similar to SCCP.

Any change in the restriction level of a SUA Hosted SPC is reported to local allowed SCCP subsystems using the N-PC-STATE primitive that includes the restriction level value.

Response Method

At reception of the first message for a SUA AS in congestion state (RL>0), a SSC (or SCON message in case of SUA relay) message is generated to the originator of the incoming message. It can be an SCCP or SUA destination SPC. In case of SUA Relay SCON message should be broadcast to all ASPs serving originating AS. SGs will populate the congestion level parameter of SSC/SCON message with the RL value.

The SG re-sends SSC/SCON messages on receiving an administrable number of subsequent messages to SUA destination in congestion state, similar to standard SCCP.

When Own Congestion Calculation at SGs is activated, it is preferred that SGs consider OCL in combination with AS congestion level. For example AS congestion level can be taken as maximum value between OCL and CL calculated based on SCON messages received and experienced SCTP congestions. This combined CL is then used in response method applied due to congestions of SUA destinations.

Due to the fact that congestion abatement in SCCP is based exclusively on timers, consistent use of congestion levels in SSCs/SCONs across all ASPs and SGs is not necessary. Therefore, response method for SUA AS congestions can also be implemented separately and independently from response method for own nodal congestion of the SG.

Congestion Control on SGs, Local Congestion Status Management

The SG will measure "Own Congestion Level" (OCL) similarly to "Own SCCP Congestion Level measurement" procedure.

Response Method

If Own SCCP Congestion Level measurement is active in SG, the SG sends SSC/SCON management messages including the value of OCLs. This shall reduce the amount of received incoming and outgoing traffic through the SG.

When being locally congested (OCL>0), at reception of the first message (for local users, SCCP destinations, or SUA destinations) the SG sends an SSC (or SCON) to the originator of the incoming message (Signaling Point having NI-OPC of the incoming message). It can be an SCCP or SUA destination SPC. The affected SPC included in the SSC/SCON shall contain the destination SPC of the original message.

The SG shall include no SSN in SCON message, in order to reduce possible interference of SG congestions and congestions of remote SCCP peers. SG congestion is treated like an MTP link set congestion at an STP. OCL of the SG shall be mapped to MTP-like congestion level, as follows 1 to 0; 2 or 3 to 1; 4 or 5 to 2; and 6 or 7 to 3. The new value is included in the SCON message.

The SG will include SSN value of 1 in SSC messages sent to remote SCCP peers and the OCL value as congestion level.

The SG re-sends the SSC/SCON message on receiving P (administrable parameter) subsequent messages when being in congestion state (OCL>0). In case the originator of the received message is a SUA destination, the SG sends SCONs to all ASPs of the originating AS.

Traffic Handling

It shall be possible to define default and maximum importance values for SUA (and SCCP) messages. Actions at traffic originator and receiver shall follow SCCP methods with the following exceptions Message importance shall be included in SUA traffic related messages when SUA standard allows for it (e.g. CODT cannot include Importance IE, while CLDT can, in contrast with UDT of SCCP).

No segmentation applies in SG for traffic towards ASPs

When message importance is not included in a received SCCP/SUA message the SG shall assign an importance value based on the default importance values. Importance value of the first segment of the reassembled message shall be used in SUA message at relay.

Traffic Limitation

Traffic limitation in SGs shall follow "Outgoing Traffic Limitation Criteria" and "Incoming Traffic Limitation Criteria" of standard SCCP.

SGs preferably shall not discard received messages and incoming traffic limitation function should normally be disabled by configuration parameter for both SUA and SCCP traffic.

ANSI Networks

Congestion Control on ASPs

SUA ASPs/IPSPs follow the functionality described for ITU-T, TTC, MPT networks above. Thus, ASPs/IPSPs manage Local and remote congestion status.

Congestion Control on SGs

SGs follow the functionality described for ITU-T, TTC, MPT networks above. However, instead of sending SSC messages to external SCCP peers, they request to MTP3/M3UA sending of TFC/SCON to remote MTP/M3UA peers with the affected SPC that contains the hosted SUA SPC, of congested SUA ASes.

Put in other words MTP3/M3UA upper boundary is extended with a new primitive "N-PCSTATE-request". This primitive will transfer an Affected SPC and MTP congestion status of the SPC to MTP3/M3UA from its user, e.g. SCCP/SUA. The MTP congestion status of the SPC is created from the congestion level of a hosted SPC (or SUA Destination) dividing it by two and taking the integer part: Thus, 1 yields 0; 2 or 3 yields 1; 4 or 5 yields 2; and 6 or 7 yields 3.

The MTP/M3UA layer may treat this indication like a link congestion indication, and mark the hosted SPC accordingly. Therefore, at receive of a message to a hosted SPC, procedure similar to "Signaling Link Congestion" applies when message priority of a transfer message is lower than the congestion status of the "virtual signaling link" to the SPC hosted at SCCP, and a TFC/SCON indicating the current congestion status of the "virtual signaling link" and the affected destination is sent to the originator of the message.

Congestion Abatement

For congestion abatement two configurations can be used, one relies on SCCP/SUA layer procedures, while the other relies on MTP "Destination Congestion" procedure.

Config. 1. SCCP/SUA layer manages local congestion status and congestion status of hosted SPCs (SUA Destinations). When the restriction level of a hosted SPC changes, the SCCP/SUA layer uses N-PCSTATE-request use case and indicates a new value of congestion status for the hosted SPC.

Config. 2. SCCP/SUA layer uses N-PCSTATE-request use case only when an SSC has to be sent. Then MTP layer in SG does employ "Destination Congestion" procedure for hosted SPCs and decrements congestion state after T16 expiration. Although RCT message is not sent to SCCP/SUA, T16 timer is started when RCT should be sent to hosted SPC.

In case SSC contained congestion level of 1, N-PCSTATE-request use case would not be applied, when Alt. 2 is used, since in that case MTP congestion status would be 0.

Config. 1 above is preferred, since it provides up-to-date status to MTP/M3UA; it avoids oscillation of congestion status seen externally, and eliminates less prioritized incoming traffic at congested Application Servers, which otherwise (Config. 2) could be sent.

The concept of a hosted address enables legacy protocols in a SIGTRAN SG to deliver traffic to a user protocol layer, with a reduced impact on legacy procedures. A multiple SGs scenario allows for more flexible, open, and simplified architecture of interworking with legacy networks. A multiple SGs scenario enables true system scalability, where system scalability is not limited by communication between SGs. Redundant SGs secure robustness of signaling interworking between legacy and SIGTRAN networks. An enhanced congestion control for nodes owning hosted addresses improves network protection against network and nodes congestions.

An MTP level, in traffic management procedures, the hosted point code (HPC) is treated as Remote Signaling Point. MTP level has to distinguish HPC from DPCs, MTP has to deliver to local SCCP all messages destined to a HPC used by SCCP/SUA.

The SDPC on an SCCP level represents SCCP signaling point in an SG (residing in SUA network). SDPC can be used in Single SUA SG scenario. In that case the SDPC from legacy nodes perspective looks as MTP SEP (available via a standard SUA SG). On MTP level SDPC is treated as any other Own SP.

The SHDPC at an SCCP level of a SUA SG represents SCCP destination signaling point residing in SUA network. SHDPC applies to "multiple SUA SGs as STPs" scenario; SHDPC can be used in scenario where external SS7 SEPs have access to SUA application servers via multiple SUA SGs, and use MTP quasi-associated mode. Then SUA SG behaves as an STP on SS7 links, and looks like an STP from external nodes viewpoint. SCCP has to distinguish SHDPC and SDPC because of different management procedures related to single and multiple SG scenarios. On MTP level SHDPC is presented as HPC.

In the following, details of NW management interworking in SGs and ASPs are described with respect to an illustrative embodiment.

SCCP-MTP3/M3UA Interworking at SG

This section sketches new and impacted use cases expected by SCCP/SUA solution from MTP3/M3UA Service.

In the following sections describing SUA, it is assumed that

SDPCs are defined as Own SPCs in MTP/M3UA layer at the SG

SHDPCs are defined as hosted SPCs in MTP/M3UA layer at the SG

Connection/Disconnection of SS7 SPCs to MTP/M3UA at the SG

SCCP at the SG will connect all remote signaling points of the alication servers to the MTP/M3UA Service, if these SPCs should be accessible via this SG. SCCP at SG will use "Connection to the MTP/M3UA Service" use case. This is done similar to remote SPCs using associated or quasi-associated mode, and which communicate with SDPCs or SHD-PCs in the application servers.

As soon as the SCCP layer at SG has connected a remote SPC to the MTP/M3UA and received a positive answer from MTP/M3UA, the SCCP starts to receive management indications from MTP/M3UA with that SPC as Affected SPC in primitives MTP-PAUSE, MTP-RESUME, MTP-STATUS standard indications, and indications for SHDPCs.

the SCCP can send traffic and SNM messages to that SPC, and the OPC in the routing label of those messages can be either an SDPC or SHDPC.

SCCP at the SG will disconnect from the MTP/M3UA service remote signaling points using upper primitives of MTP3 (M3UA) layer.

Connection/Disconnection of SHDPCs to MTP/M3UA at the SG

SCCP at the SG will connect an SHDPC to the MTP/M3UA service as soon as it is provisioned in SCCP/SUA layer at the SG. SCCP at SG will use the use case "Connection to the MTP/M3UA Service" enhanced with additional data indicating that the SPC to be connected is an SHDPC.

As soon as the SCCP layer at SG has connected successfully an SHDPC to the MTP/M3UA, the SCCP starts receiving management indications from MTP/M3UA for that SPC: enhanced MTP-PAUSE, MTP-RESUME, MTP-STATUS indications with additional parameter Concerned SPC that points to an SHDPC.

the SCCP starts receiving traffic and SNM messages to that SHDPC, and the OPC in the routing label of those messages can be one of the remote SPCs, to which the SCCP has connected earlier.

SCCP at the SG will disconnect SHDPCs from the MTP/M3UA Service using use case "Disconnection from the MTP/M3UA Service", for convenience purposes the use case can be enhanced with a flag indicating that the user disconnects a Hosted SPC.

Summary of MTP/M3UA Use Cases

Here a preliminary list of MTP/M3UA Service use cases that nail down functionality used for SNM configuration 3 is provided.

In order to improve traffic handling characteristics, one may consider adding flags indicating SHDPC and pointers of SUA AS to MTP-Transfer and possibly to other service use cases.

Network Management

The following sections consider SCCP/SUA NW management procedures. Management of SS7 entities as well as management of SUA entities is considered here. Application servers components perform their own NW management procedures.

In figures of subsequent sections and respective figures, the term "blade" designates nodes running at least one SUA ASP and the term "SPX" designates a SUA SG running at least one SGP.

Management of SS7 Entities

In the following subsections management of SS7 entities follows configuration 3 introduced above. The main goal is that ASPs have the same view on status of remote entities as long as they have the same connectivity to SGs.

MTP3/M3UA Link between SG's

When an SCCP relation between the SGs is required to support mated SRPs function at the SG, SCCP at SGs follows SCCP standard handling.

Some solutions may introduce an SCCP signaling relation between SGs which requires a dedicated (proprietary) handling of SSP/SSA messages. These are listed below in this subsection for completeness reasons.

MTP3/M3UA link between SG's will be configured between two SG's for quasi-associated mode only. Each SG needs to have configured SPC of mated SG. Link will be used over SCCP MGMT messages (SSP and SSA) will be sent in the following meaning:

SSP (Affected SPC, SSN=1)→Mated SG has received MTP-STATUS ind (User Part Unavailable) from its MTP3 layer SSP (Affected SPC, SSN=x)→Mated SG has received SSP (Affected SPC, SSN=x) from NE SSA (Affected SPC, SSN=1)→Mated SG has received SSA (Affected SPC, SSN=1) from NE SSA (Affected SPC, SSN=x)→Mated SG has received SSA (Affected SPC, SSN=x) from NE

TABLE 3

| # | Use Case Name | Old/New | New data/Comment |
|---|---|---|---|
| 1. | Connection to the MTP/M3UA Service | New use case | New information "Hosted SPC" should be provided by the MTP/M3UA Users in connection request |
| 2. | Disconnection from the MTP/M3UA Service | New use case | New information "Hosted SPC" should be provided by the MTP/M3UA Users in disconnection request |
| 3. | MTP-STATUS indication, User Part Unavailable | New use case | New information "concerned destination-Hosted SPC" should be provided towards MTP/M3UA Users |
| 4. | MTP-STATUS indication, Network/Remote congestion | New use case | New information "concerned destination-Hosted SPC" should be provided towards MTP/M3UA Users |
| 5. | MTP-PCstate-request | New use case | This use case should cover: request to change SHDPC status to "accessible" request to change SHDPC status to "inaccessible" request to change SHDPC status to "congested" (ANSI only, since there is no SSC in ANSI SCCP) |

SG, which receives these MGMT messages from a mated SG, should interpret them as stated above (check if OPC of MTP routing label is SPC of mated SG). Otherwise SG will interpret them as in SCCP or SUA standard.

Remote Signaling Point Status Management

MTP3/M3UA layer at SGs will detect changes of connectivity to SS7 Signaling Points. When status of an SS7 SPC changes the MTP3/M3UA layer at SG informs SCCP layer via the primitives MTP-PAUSE, MTP-RESUME, and MTP-STATUS. They trigger the following corresponding procedures in SCCP at SG Signaling point inaccessible (prohibited)
Signaling point accessible (allowed)
Signaling point congested SCCP at SG interworks these procedures with SUA, which notifies ASPs about SPC status change.

Remote Signaling Point Prohibited

MTP-PAUSE without Concerned SPC at the SG, SDPC Case

SCCP layer at the SG keeps up-to-date the status of remote signaling points provisioned at SCCP level, based on indications from MTP3/M3UA, which do not contain Concerned SPC.

When there is no concerned SPC in the MTP-PAUSE indication, the SCCP at the SG executes SNM procedures. Additionally SCCP/SUA layer uses local broadcast procedure to broadcast SPC status to SUA ASPs servicing SDPCs, that is, Own Signaling Points of the SG that have the same NI and market variant with the Affected SP. Local broadcast to the ASPs/ASPs is needed for the standard SUA SG scenario, where remote SS7 signaling points are connected via one SG. The SG uses DUNA message without SSN at local broadcast of SPC state.

The SCCP/SUA at the SG will use the locally stored remote signaling point status to answer signaling point audits from ASPs. When Affected SP in DAUD is inaccessible, the SCCP/SUA at the SG answers DAUD with a DUNA to the auditing ASP, similar to the case of broadcast of "Signaling point inaccessible" info.

MTP-PAUSE with Concerned SPC at the SG, SHDPC Case

When MTP-PAUSE primitive in addition to Affected SPC includes "Concerned SPC", Signaling point inaccessible (prohibited) procedure at the SG consists of broadcast of "Signaling point inaccessible" info to the concerned SUA AS only. The SCCP-User primitive N-PCstate is indicated via DUNA message that includes Affected Point Code, but no SSN.

At broadcast the SG selects SUA peers (ASPs) based on the "Concerned Destination" provided in the MTP-PAUSE.

Please note that, in contrast with the existing SCCP procedures, no local broadcast of remote SCCP status unavailable is initiated by the procedure.

Please note that as an optimization one may consider an alternative option, where "MTP-PAUSE indication" with Concerned SPC is omitted and SCCP/SUA relies on MTP-PAUSE indication without Concerned SPC to broadcasts SPC status to all concerned ASes, that is, to ASes that serve SDPCs and in addition SHDPCs of the same NI and market variant.

Overview of Application Servers Actions at "Signaling Point Inaccessible"

Figure 12:
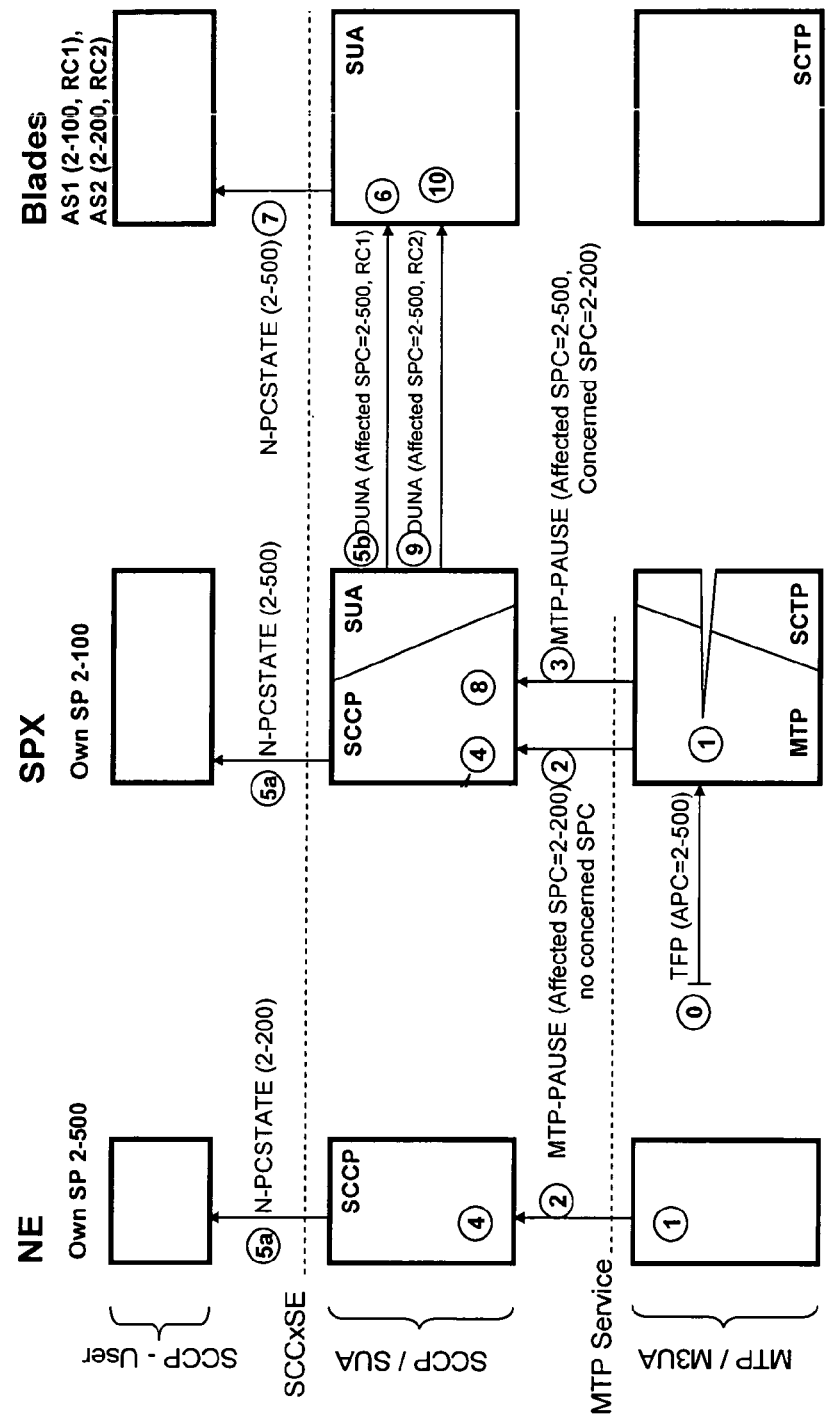
FIG. 12 is a schematic diagram illustrating the performing of a network management procedure using a signaling gateway.

FIG. 12 shows the main steps that the SG and ASPs may take in case of "Signaling Point inaccessible" event detected at MTP/M3UA layer in the SG.

The flow of events and messages is as follows. The steps are indicated with reference signs placed in circles in this and in the following figures.

(0) A TFP (Affected SPC=2-500) is received on an MTP route, or any other event makes the route inaccessible. In case of M3UA it can be a DUNA or an INACTIVE message. (standard). 2-500 can become inaccessible for other reasons than TFP, like MTP restart in remote peer, etc.

(1) SPC 2-500 becomes inaccessible in MTP/M3UA, since there is no re-routing possibility available. (standard)

(2) The MTP/M3UA SEP function at the SG imparts an indication to local user parts to inform them that signaling traffic destined to SPC=2-500 cannot be sent, MTP-PAUSE (Affected SPC=2-500), (standard).

(3) The STP function in the SG broadcasts TFP messages to its adjacents and to Hosted SPCs in particular. Thus, MTP-PAUSE (Affected SPC=2-500, Concerned SPC=2-200) is indicated to SCCP, which hosts SPC 2-200. Broadcast is part of standard MTP/M3UA, mapping of TFP/DUNA to MTP-PAUSE for Hosted SPCs is a new function in MTP/M3UA.

(4) Based on MTP-PAUSE (Affected SPC=2-500), SCCP marks "prohibited" the status of failed SP, (standard). Other actions of standard are also performed here, like stop SST, mark remote SCCP and SSNs prohibited, etc.

(5) Like in standard SCCP performs local broadcast of "Signaling Point inaccessible" and "remote SCCP unavailable, reason unknown" (5a). In addition to local broadcast of standard, SCCP/SUA layer will indicate to all SDPCs of the same NI and market "Signaling Point inaccessible" status for Affected SP 2-500, that is, DUNA message is sent for all ASPs in ACTIVE state for the ASes that serve concerned SDPCs (5b). No SSN is included in DUNA messages.

(6) The ASP marks "unavailable" the route to SP 2-500 via the SG/SG that originated DUNA. Signaling traffic is transferred to an alternative route, if available, via the second SG, by means of a forced rerouting procedure. Additionally, the ASP will start a periodic audit procedure of the "unavailable" route (SG-DPC pair audit).

(7) If there is no re-routing possibility available in SUA ASP, SPC 2-500 becomes inaccessible in SUA. Then SUA ASP performs all steps of standard SCCP when a Signaling Point becomes inaccessible (prohibited), like stop audit (SST of standard) of remote SCCP, SSNs, etc. Like in standard SCCP, SUA performs local broadcast of "Signaling Point inaccessible" and "remote SCCP unavailable, reason unknown" (7), the same as (5a).

(8) As outcome of step 3 above the SCCP receives MTP-PAUSE (Affected SPC=2-500, Concerned SPC=2-200). Since Concerned SPC 2-200 is included, it means that there is a SHDPC provisioned at SUA/SCCP layer and connected to MTP/M3UA; SCCP simply delivers this indication to SUA in the SG without any further actions. Note that at step 2) above the SCCP/SUA software has stored the SPC status already.

(9) SUA at the SG broadcasts "Signaling Point inaccessible" status for Affected SP 2-500 to all ASPs serving the Concerned SPC, that is, DUNA message is sent to ASPs in ACTIVE state for the AS that serves concerned SHDPC. No SSN is included in DUNA messages.

(10) When DUNA indicating "Signaling Point inaccessible" is received, the ASP performs steps 6) and 7) above. SUA ASPs do not distinguish SDPCs from SHDPCs.

Note 1. Steps 2) and 4) to 7) relate to handling specific for SDPCs, which is suggested for the standard SUA SG case, where ASPs do not have access to the remote SP via another SUA SG. Steps 3) and 8) to 10) relate to handling specific for SHDPCs, which is suggested for the multiple SG scenarios, where ASPs have access to the remote SP via two SUA SGs.

Please note that as an optimization one may consider an alternative option, where step 3 is omitted and SCCP/SUA performs steps 8) and 9) based on step 2) above like in 5). Then after steps 2) and 4) are performed SCCP/SUA broadcasts SPC status as at step 5) above to all concerned ASes, that is, to ASes that serve SDPCs and in addition SHDPCs of the same NI and market variant.

Note 2. It is assumed that indication 3) cannot happen without indication 2), so that SPC status kept at the SG is up-to-date. This assumption is in line with MTP standard, and it shall be guaranteed by the MTP/M3UA support of Hosted SPCs for further use at periodic audit of the "unavailable" route (SG-DPC pair audit) from the ASPs.

Actions at the ASPs when an AS Becomes INACTIVE

When an AS served by an ASP becomes INACTIVE for an SG due to any reason, at the ASP all routes used by that AS via the SG become unavailable.

This may happen for instance due to SCTP association failure or INACTIVE Ack received from the SG.

When the last available route to a particular SS7 destination becomes unavailable the destination SPC is marked prohibited (inaccessible), and local users are informed as described above.

Remote Signaling Point Allowed

Configuration 3

This case is very similar to the "Remote Signaling Point Prohibited" case described above.

MTP-RESUME Without Concerned SPC at the SG, SDPC Case

When there is no Concerned SPC in the MTP-RESUME indication, SNM procedures are executed as in standard. Additionally SCCP/SUA will use trigger of local broadcast procedure to indicate SPC accessibility to all SUA ASPs serving SDPCs, that is, Own Signaling Points of the SG that have the same NI and market variant with the affected SP. Local broadcast to the ASPs/ASPs is needed for the standard SUA SG scenario, where remote SS7 signaling points are connected via one SG. The SG uses DAVA message without SSN at local broadcast of SPC state.

In case MTP-RESUME is received with MTP Restart indication SCCP/SUA layer shall broadcasts SCCP available and SSN allowed indications for all SSNs at this SPC, after broadcast of "Signaling Point Accessible". This can be done using DAVA message, provided that remote SSNs are provisioned at the SG.

The SCCP/SUA at the SG will use the locally stored remote signaling point status to answer signaling point audits from ASPs. When Affected SP in DAUD is accessible at the SG, the SCCP/SUA at the SG answers the DAUD with a DAVA without SSN to the auditing ASP, similar to the case of broadcast of "Signaling Point accessible" info.

MTP-RESUME with Concerned SPC at the SG, SHDPC Case

When MTP-RESUME primitive includes "Concerned SPC" in addition to Affected SPC, signaling point accessible (allowed) procedure at the SG consists of broadcast of "Signaling point accessible" info to the concerned SUA AS only. The SCCP-User primitive N-PCstate is indicated via DAVA message that includes Affected Point Code, but no SSN.

At broadcast the SG selects SUA peers (ASPs) based on the "Concerned Destination" provided in the MTP-RESUME.

Please note that, in contrast with the existing SCCP procedures, no broadcast of remote SCCP status available is initiated at the SG by the procedure, nor is any subsystem test procedure initiated locally from the SG. MTP-RESUME with MTP Restart indication will be treated as MTP-RESUME without MTP Restart indication. This applies e.g. when MTP-RESUME includes "Concerned SPC". MTP-Restart handling may not be applicable for ANSI MTP.

Note that as an optimization, one may consider an alternative option, where "MTP-RESUME indication" with Concerned SPC is omitted and SCCP/SUA relies on MTP-RESUME indication without Concerned SPC to broadcasts SPC status to all concerned ASes, that is, to ASes that serve SDPCs and in addition SHDPCs of the same NI and market variant.

Overview of Application Servers Actions at "Signaling Point Accessible"

Figure 13:
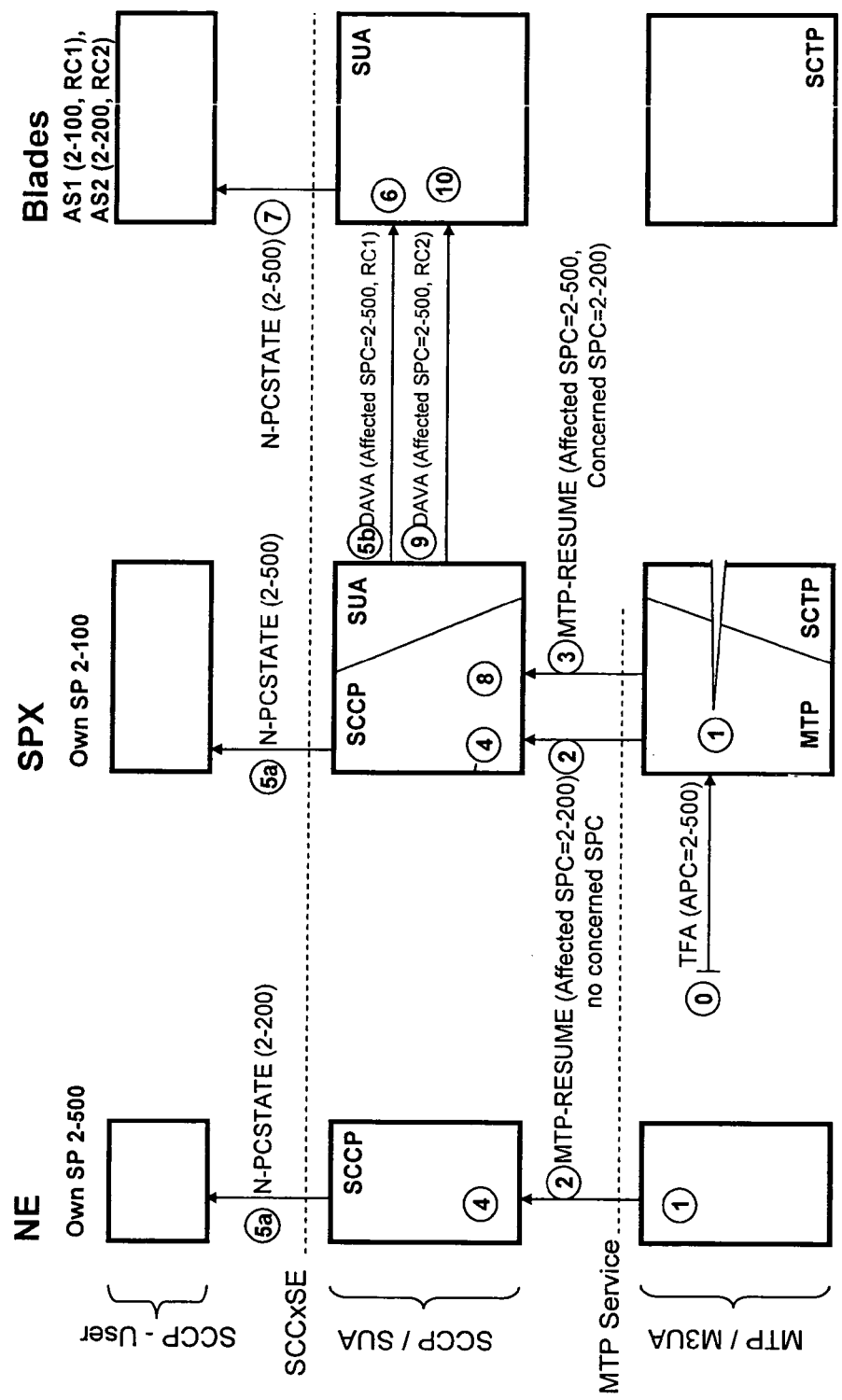
FIG. 13 is a schematic diagram illustrating the performing of a network management procedure using a signaling gateway.

FIG. 13 shows the main steps that the SG and ASPs may take in case "Signaling Point Accessible" event is detected at MTP/M3UA layer in the SG.

The flow of events and messages in FIG. 13 is as follows.

0) A TFA (Affected SPC=2-500) is received on an MTP route, or any other event makes the route accessible. In case of M3UA it can be a DAVA or an ACTIVE message. (standard) 2-500 can become accessible for other reasons than TFP, like MTP restart in remote peer, etc.

1) SPC 2-500 becomes accessible in MTP/M3UA. (standard)

2) The MTP/M3UA SEP function at the SG imparts an indication to local user parts to inform them that signaling traffic destined to SPC=2-500 can be sent, MTP-RESUME (Affected SPC=2-500), (standard). It may include MTP restart indication.

3) The STP function in the SG broadcasts TFA messages to its adjacents and to Hosted SPCs in particular. Thus, MTP-RESUME (Affected SPC=2-500, Concerned SPC=2-200) is indicated to SCCP, which hosts SPC 2-200. Broadcast is part of standard MTP/M3UA, mapping of TFA/DAVA to MTP-RESUME for Hosted SPCs is a new function in MTP/M3UA.

4) Based on MTP-RESUME (Affected SPC=2-500), SCCP marks "allowed" the status of the SP, (standard). Other actions of standard are also performed here, like mark remote SCCP and SSNs allowed, start SST to SST marked SSNs, etc. ASPs perform SSN test procedure like SCCP in standard 5) Like in standard SCCP performs local broadcast of "Signaling Point accessible" and "remote SCCP available" (5a). In addition to local broadcast of standard, SCCP/SUA layer will indicate to all SDPCs of the same NI and market the status of "Signaling Point Accessible" for Affected SP 2-500, that is, DAVA message is sent for all ASPs in ACTIVE state for the ASes that serve concerned SDPCs (5b). The RC in DAVA is populated according to the chosen AS.

6) The ASP marks "available" the route to SP 2-500 via the SG/SG that originated DAVA. If the remote SPC status was inaccessible it is changed to accessible. Otherwise, if an alternative route via the second SG is available, the ASPs perform controlled re-routing procedures.

Additionally, the ASP will start a periodic audit of remote SSNs marked for audit by provisioning (SST param. of standard).

Please note that MTP restart is not made explicitly visible to the ASPs.

7) If the remote SPC status changes from inaccessible to accessible, then the ASP stops periodic audit of the SPC 2-500, if any. Then SUA ASP performs all steps of standard SCCP when a Signaling Point becomes accessible (allowed), like audit of SSNs (SST of standard), etc. Like in standard SCCP, SUA performs local broadcast of "Signaling Point Accessible" and "remote SCCP available" (7), the same as (5a).

8) As outcome of step 3 above the SCCP receives MTP-RESUME (Affected SPC=2-500, Concerned SPC=2-200). Since Concerned SPC 2-200 is included, it means that there is a SHDPC provisioned at SUA/SCCP layer and connected to MTP/M3UA; SCCP simply delivers this indication to SUA in the SG without any further actions.

9) SUA at the SG broadcasts "Signaling Point Accessible" status for Affected SP 2-500 to all ASPs serving the Concerned SPC, that is, DAVA message is sent to ASPs in ACTIVE state for the AS that serves concerned SHDPC.

10) When DAVA indicating "Signaling Point Accessible" is received, the ASP performs steps 6) and 7) above. SUA ASPs do not distinguish SDPCs from SHDPCs.

Note 1 and Note 2 as mentioned above apply here as well.

Remote Signaling Point Congested

Actions at the SG

MTP-STATUS without Concerned SPC at the SG, SDPC Case

When there is no Concerned SPC in the MTP-STATUS indication, SNM procedures are executed as in standard. In particular, if "SCCP Congestion Control" function is available e.g. for ITU-T SCCP, RLm and RSLm are updated at the SG.

SSC to Own SPC of the SG, SDPC Case

This is applicable to an ITU-T SCCP layer. When SCCP layer at the SG receives an SSC message destined to the Own SPC of the SG, the SCCP layer executes SNM procedures of standard, in particular, CL and possibly RL and RSL are updated.

Local Broadcast of Congestion Status

Local Broadcast of Congestion Status can be an outcome of received MTP-STATUS or SSC, as in standard. If SCCP performs local broadcast to indicate SPC or SCCP congestion, SCCP/SUA uses it as a trigger to send SCON to all SUA ASPs serving SDPCs, that is, Own Signaling Points of the SG. Local broadcast to the ASPs/ASPs may be used for the standard SUA SG scenario, where remote SS7 signaling points are connected via one SG. Local Broadcast of Congestion Status is applicable for both ITU-T and ANSI SCCP layer.

If "SCCP Congestion Control" function is not available, the sent SCON message does not include the SSN, Congestion Level is populated according to the MTP-STATUS indication. (ITU-T and ANSI)

If "SCCP Congestion Control" function is available, the sent SCON message includes the SSN=1 and Congestion Level populated with the current RL of the Affected SPC. (ITU-T only)

Please note that cease of congestion status of remote SPC at the SG, and local broadcast of "Signaling Point Accessible" status should result in a DAVA message to the concerned ASPs, to which SCONs have been sent earlier. This adds unnecessary DAVA messages, but it does not harm. (ITU-T only)

The SCCP/SUA at the SG will use the locally stored remote Signaling Point status to answer Signaling Point audits from ASPs. When Affected SP in DAUD is Congested at the SG, the SCCP/SUA at the SG answers the DAUD first with a DAVA message and then with an SCON to the auditing ASP, similar to the case of broadcast of "Signaling Point accessible" info.

MTP-STATUS with Concerned SPC at the SG, SHDPC Case (ITU-T and ANSI)

Please note that an optimization option is possible, where "MTP-STATUS indication" with Concerned SPC is omitted and SCCP/SUA relies on MTP-STATUS indication without Concerned SPC to broadcasts the remote SCCP Congestion Status to all concerned ASes, that is, to ASes that serve SDPCs and in addition SHDPCs of the same NI and market variant of the Affected SPC. TC-MSC did not consider this option, and for that reason it is not recommended.

When MTP-STATUS primitive includes "Concerned SPC" in addition to Affected SPC, Signaling Point congested procedure at the SG comprises a broadcast of "Signaling Point congested" info to the concerned SUA AS. The SCCP-User primitive N-PCstate is indicated via SCON message that includes Affected Point Code, but no SSN; congestion level is included as well.

At broadcast the SG selects SUA peers (ASPs) based on the "Concerned Destination" provided in the MTP-STATUS.

Please note that, in contrast with the existing SCCP procedures, no local broadcast of "Signaling Point congested" info is initiated at the SG. Status of the remote SPC locally stored at the SG is not altered.

After TC-MSC inspection it has been agreed that SCCP/SUA will trigger sending of SCON messages when response to MTP-TRANSFER request carries an indication of congestion of remote DPC, where MTP-TRANSFER was requested on behalf of an SHDPC, that is, the SHDPC was included OPC of the MTP RL (quasi-associated mode in SG). SCCP/SUA will send SCON messages to all ASPs in ACTIVE state that serve the AS of SHDPC. SCCP/SUA will use LCON parameter like in standard, so that SCON is sent on each n-th indication of congestion in MTP-TRANSFER response from MTP. SCON shall not carry an SSN in that case.

SSC to an SHDPC (ITU-T Only)

When the SSC received by the SG is destined to an SHDPC, that is, the DPC of the SSC equals the SHDPC, Signaling Point congested procedure at the SG consists of broadcast of "Signaling Point congested" info to the concerned SUA AS only. The SCCP-User primitive N-PCstate is indicated via SCON message that includes Affected Point Code and SSN=1; congestion level in SCON is taken from the SSC. RC is populated based on the chosen SUA AS.

At broadcast the SG selects SUA AS and its ASPs based on the DPC of the SSC message.

Please note that, in contrast with the existing SCCP procedures, no local broadcast of "Signaling Point congested" info is initiated at the SG by the procedure. Status of the remote SPC locally stored at the SG is not altered.

ASP Actions (ITU-T and ANSI)

SUA layer at the ASP will have the same Congestion Control mechanism for ITU-T and ANSI market variants. In case of ANSI market SCONs corresponding to SSC messages will not be received, so that there is no need to keep up-to-date the CL parameter, while RL and RSL may coincide with RLm and RSLm respectively.

Figure 14:
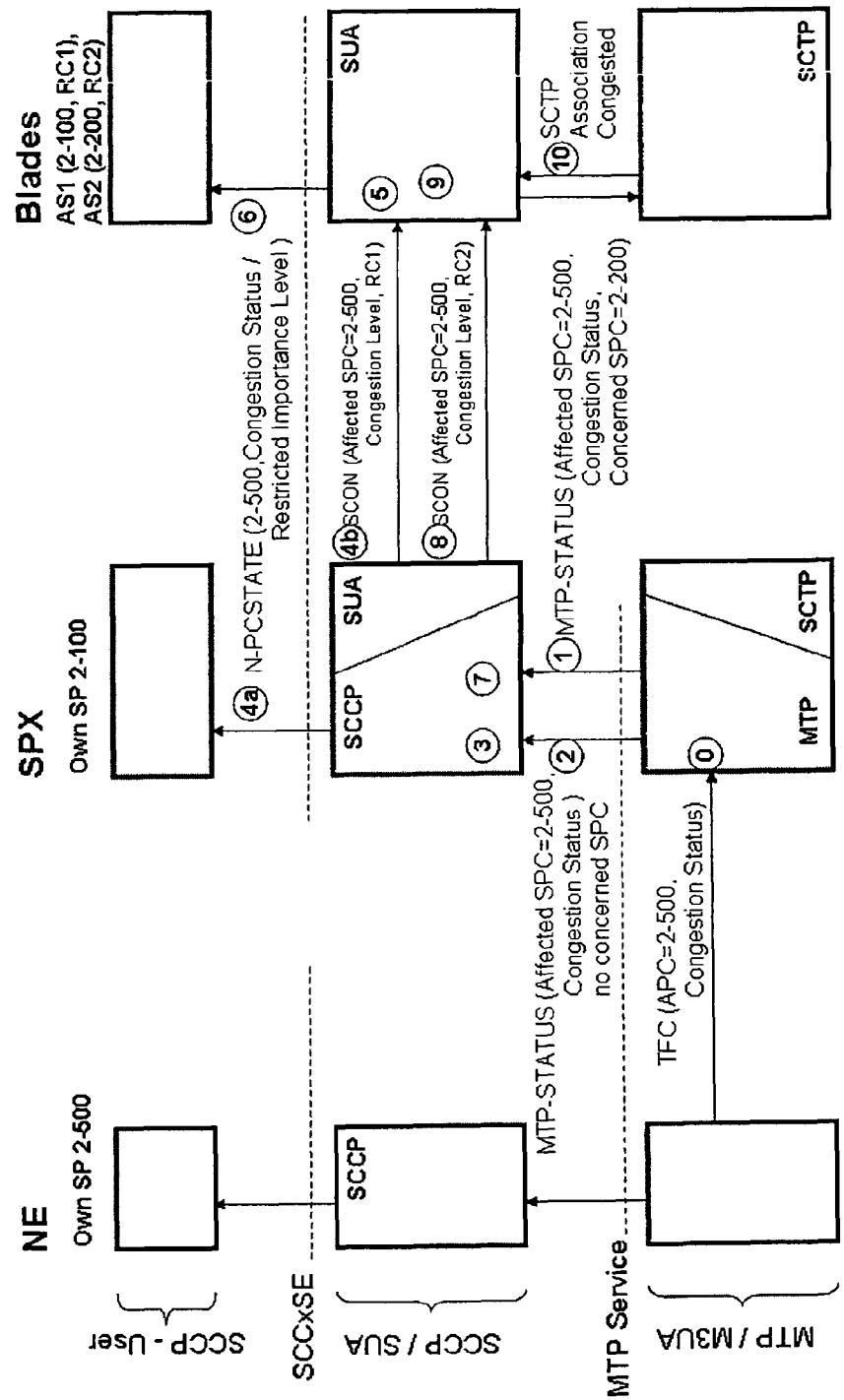
FIG. 14 is a schematic diagram illustrating the performing of a congestion management procedure using a signaling gateway.

Steps 5), 6) and 9), 10) in FIG. 14 explain ASP actions in case of "Signaling Point Congestion" indications via SCON, and in case of SCTP association congestion indication.

Overview of Application Servers Actions at MTP-STATUS Indication

FIG. 14 shows main steps that the SG and ASPs may take in case of "Signaling Point Congested" indication due to local or remote response to congestion at MTP/M3UA level.

The flow of events and messages is as follows.

0) A TFC (Affected SPC=2-500, Congestion Status) is received on an MTP route, or a message is sent on a congested link. In case of M3UA it can be a SCON received or congestion of SCTP association. Thus, due to remote or local response the MTP-STATUS primitive is going to be indicated to the SCCP layer at the SG. 2-500 can become congested for other reasons than TFC, such as local MTP link congestion.

1) In case of remote response, if DPC in the TFC message is a Hosted SPC, or in case of local response, if OPC in the MTP routing label of the original message is a Hosted SPC, MTP-STATUS primitive with "Concerned SPC" that equals the Hosted SPC is indicated to the SCCP layer at the SG.

2) Otherwise, like in standard, an MTP-STATUS primitive without "Concerned SPC" is indicated to the SCCP layer at the SG.

3) When MTP-STATUS primitive without "Concerned SPC" is received, the SCCP layer at the SG acts as in standard.

4) As outcome of previous step the SCCP initiates local broadcast of "Signaling Point Congested" info, if "SCCP Congestion Control" function is not available, or it is available and Restriction Level of the remote SPC has changed due to received MTP-STATUS primitive or due to timer expiration (4a).

As part of local broadcast of "Signaling Point Congested" info, the SCCP/SUA layer will indicate to all SDPCs of the same NI and market the status of "Signaling Point Congested" for Affected SP 2-500, that is, SCON message is sent for all ASPs in ACTIVE state for the ASes that serve concerned SDPCs (4b). The RC in SCON is populated according to the chosen AS. No SSN is included in SCON.

5) When ASP receives SCON it behaves like SCCP in standard. The ASP treats SCON as standard SCCP treats MTP-STATUS indicating MTP congestion. ASP behaviour depends on whether "SCCP Congestion Control" function is available at the ASP or not.

6) Like at step 4a above, as outcome of previous step SUA initiates local broadcast of "Signaling Point Congested" info, if "SCCP Congestion Control" function is not available, or it is available and Restriction Level of the remote SPC has changed due to received MTP-STATUS primitive or due to timer expiration (4a).

7) As outcome of step 1) above the SCCP receives MTP-STATUS (Affected SPC=2-500, Congestion Status, Concerned SPC=2-200). SCCP simply delivers this indication to SUA in the SG without any further actions.

8) SUA at the SG broadcasts "Signaling Point Congested" status for Affected SP 2-500 to all ASPs serving the Concerned SPC, that is, SCON message without SSN is sent to ASPs in ACTIVE state for the AS that serves concerned SHDPC, Congestion Level is included in SCON.

9) When SCON indicating "Signaling Point Congestion" is received, the ASP performs steps 6) and 7) above. SUA ASPs do not distinguish SDPCs from SHDPCs.

10) When an "SCTP Association Congested" is received in response to an outgoing message sent to DPC 2-500 (the figure does not show the original message), SUA layer at the ASP threats this indication as an SCON indicating "Signaling Point Congestion" for the DPC 2-500 of the original message. Thus, the ASP performs steps 6) and 7) above.

Overview of Application Servers Actions at an SSC Received for SDPCs

This subsection is applicable to e.g. ITU-T market variants.

Figure 15:
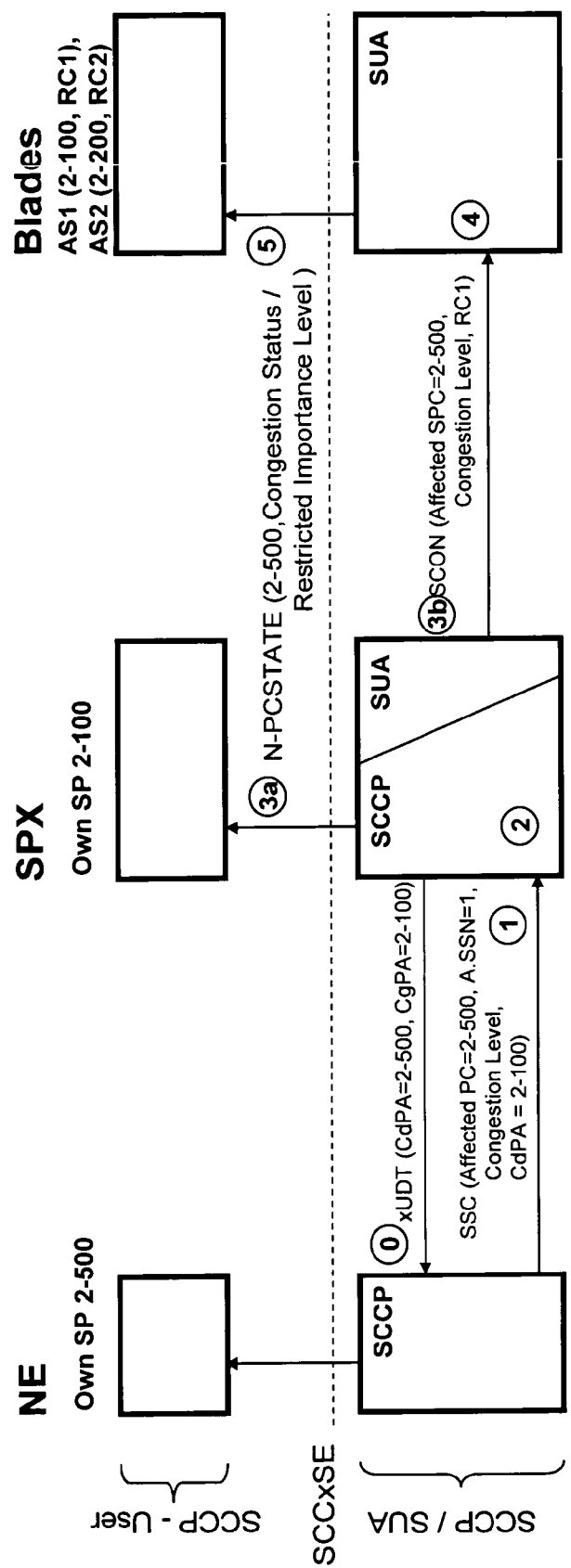
FIG. 15 is a schematic diagram illustrating the performing of a congestion management procedure using a signaling gateway.

FIG. 15 shows main steps that the SG and ASPs may take in case of an SSC indicating congestion at remote SCCP SEP is received for the Own SPC of the SG.

The flow of events and messages is as follows.

0) An UDT message is sent from the CgPA 2-100 to NE with SPC 2-500, which is experiencing SCCP congestion.

1) The NE answers with an SSC (Affected SPC=2-500, Affected SSN=1, Congestion Level, CdPA=2-100).

2) SCCP receives the SSC and acts as in standard. For instance, the CL and possibly the RL and RSL are updated.

3) If RL is changed, SCCP layer performs a local broadcast of remote SCCP congestion status, and N-PCSTATE indication is given to SCCP users at the SG (3a).

Local broadcast of remote SCCP congestion status at the SG triggers broadcast of congestion status for Affected SP 2-500, and SSN 1 to all SDPCs of the same NI and market, that is, SCON message is sent for all ASPs in ACTIVE state for the ASes that serve concerned SDPCs (3b).

If the state of the remote SCCP was congested, when xUDT to 2-500 was being relayed via the SG prior to step 0) above, the SCCP layer at the SG would then send an indication of remote SCCP congestion status to the originator of the xUDT message as a local response, and steps 3a) and 3b) would be executed bypassing steps 0) and 1).

The RC in SCON is populated according to the chosen AS. SSN 1 is included in SCON along with Restricted Importance Level put in Congestion Level parameter. (3b)

4) SUA ASP receives the SCON with SSN 1 and treats it as SCCP treats SSC messages in standard. Like at step 3a above, SUA initiates local broadcast of "Signaling Point Congested" info, if "SCCP Congestion Control" function is not available. Otherwise, if "SCCP Congestion Control" function is available, and zhr restriction level of the remote SPC has changed due to received SCON or due to timer expiration, SUA also initiates local broadcast of "Signaling Point Congested" info.

5) N-PCSTATE (Affected SP=2-500, Congestion Status/Restricted Importance Level) is indicated to local SSNs at the ASP.

Figure 16:
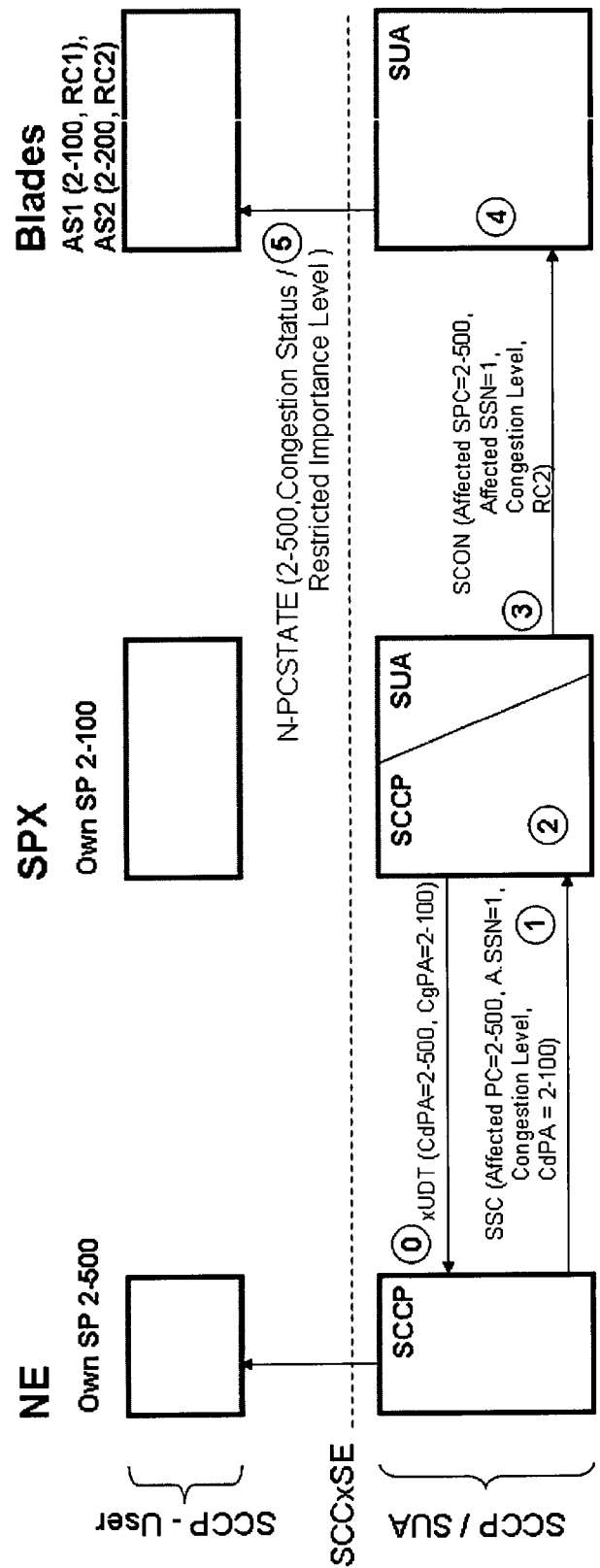
FIG. 16 is a schematic diagram illustrating the performing of a congestion management procedure using a signaling gateway.

FIG. 16 shows main steps that the SG and ASPs may take in case of an SSC indicating congestion at remote SCCP SEP is received for the SHDPC at the SG.

The flow of events and messages is as follows.

0) An UDT message is sent from the CgPA 2-200 to NE with SPC 2-500, which is experiencing SCCP congestion.

1) The NE answers with an SSC (Affected SPC=2-500, Affected SSN=1, Congestion Level, CdPA=2-100).

2) SCCP receives the SSC for the SHDPC and transfers it transparently to SUA layer at the SG.

3) SUA broadcasts remote SCCP congestion status for Affected SP 2-500, and SSN 1 to the SHDPC included in the received SSC message. SCON message is sent for all ASPs in ACTIVE state for the AS that serves the SHDPC (3b). The RC in SCON is populated according to the chosen AS. SSN 1 is included in SCON along with Restricted Importance Level put in Congestion Level parameter.

4) SUA ASP receives the SCON with SSN 1 and treats it as SCCP treats SSC messages in standard. SUA initiates local broadcast of "Signaling Point Congested" info, if "SCCP Congestion Control" function is not available. Otherwise, if "SCCP Congestion Control" function is available, and Restriction Level of the remote SPC has changed due to received SCON or due to timer expiration, SUA also initiates local broadcast of "Signaling Point Congested" info.

5) N-PCSTATE (Affected SP=2-500, Congestion Status/Restricted Importance Level) is indicated to local SSNs at the ASP.

Remote SCCP Status Management
Remote SCCP Unavailable
Configuration 3
Actions at the SG
MTP-STATUS without Concerned SPC at the SG, SDPC Case In case the SG receives a user port unavailable (UPU), e.g. destination user part unavailable (DUPU) message at. MTP (M3UA) level destined to the Own SPC of the SG and indicating remote SCCP unavailability, then MTP/M3UA service gives MTP-STATUS indication without Concerned SPC to the SCCP layer. In that case SCCP at the SG follows the standard procedures implemented for Remote SCCP status management.

In addition, the SCCP at the SG will broadcast this information to concerned SUA ASes, that is, the ASes that serve the all Own SPCs of the SG that have the same NI and market variant with the affected signaling point (SP). Thus, the SG sends DUPU messages to all ASPs that serve the SDPCs of the same NI and market variant with the affected SP.

MTP-STATUS with Concerned SPC at the SG, SHDPC Case

When MTP/M3UA receives an UPU/DUPU message relating to an unavailable SCCP at remote SPC, and DPC in routing label is a hosted SPC defined at MtP3/M3UA level, then MTP/M3UA layer gives an MTP-STATUS indication to SCCP management and includes the DPC of the MTP routing label in the "Concerned SP" parameter in MTP-STATUS.

If SCCP management receives "Concerned SP" parameter in MTP-STATUS indication, then the SCCP relays this indication as a DUPU message to the AS that serves the "Concerned SP", that is, the SHDPC. DUPU message includes Affected Point Code and User/Cause according to the MTP-STATUS indication. The RC is included based on the selected SUA AS. User/Cause is populated based on the status included in MTP-STATUS indication following the principle of standard where MTP-STATUS corresponding to UPU is mapped to N-PCSTATE primitive.

ASP Actions

At reception of the DUPU message the SUA layer at the ASP will act as SCCP acts on reception of the MTP-STATUS indicating remote SCCP unavailability. Instead of SST message it will send the DAUD message to the dedicated SG. More details on audit are given further below.

Overview of Application Servers Actions at MTP-STATUS Indication

Figure 17:
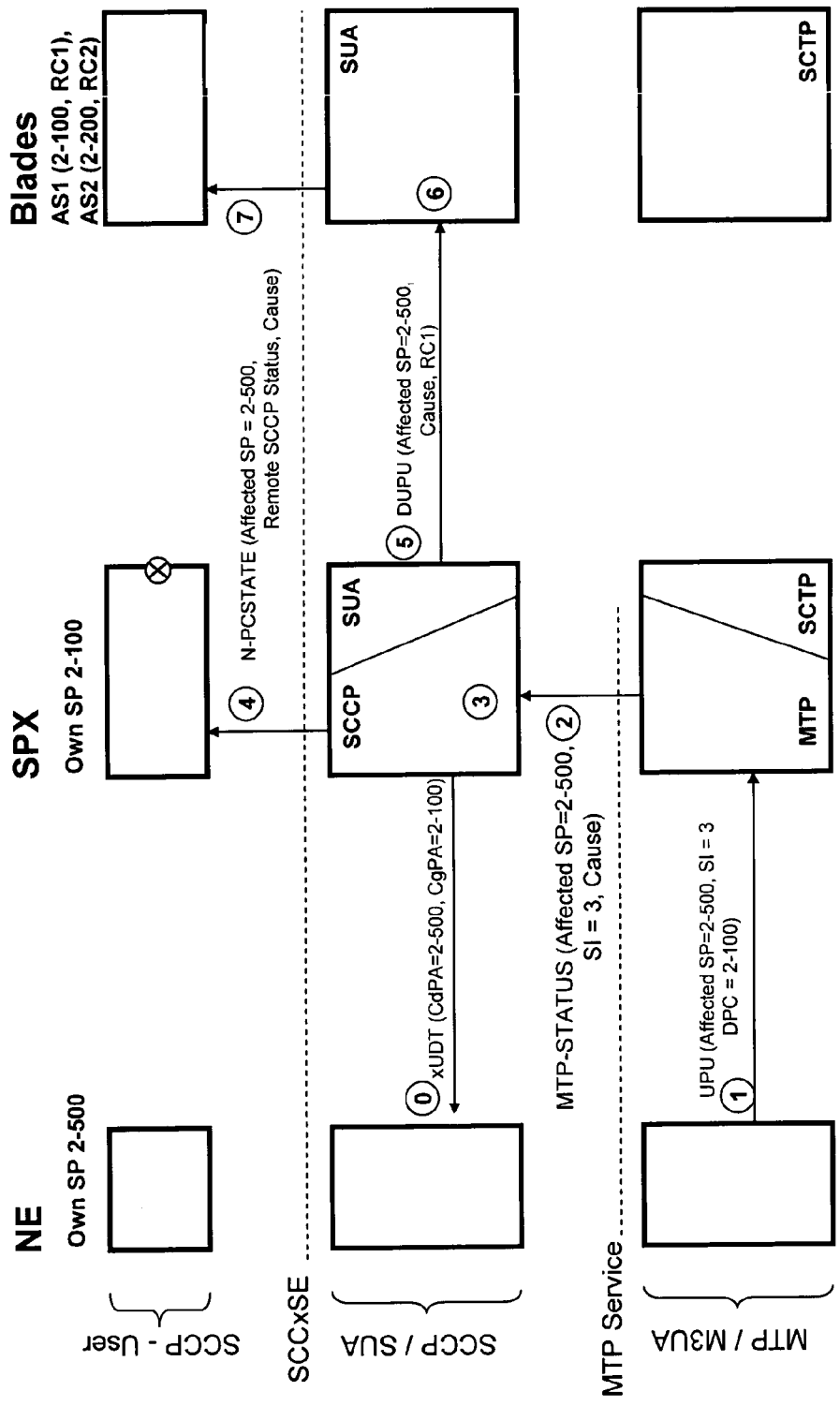
FIG. 17 is a schematic diagram illustrating the performing of a network management procedure using a signaling gateway.

FIG. 17 shows main steps that the SG and ASPs may take in case of "Remote SCCP unavailable" indication without "Concerned SP" parameter.

The flow of events and messages is as follows.

0) A traffic message is sent to the remote NE, say xUDT (CdPA=2-500, CgPA=2-100).

1) MTP/M3UA at 2-500 receives a user message for SCCP, which is unavailable. The message is answered with the UPU/DUPU message.

2) UPU/DUPU is indicated via MTP-STATUS to the SCCP at the SG. MTP/M3UA does not include the "Concerned SP" parameter in MTP-STATUS since UPU/DUPU was destined to the Own SPC of the SG.

3) At MTP-STATUS indication of Remote SCCP unavailability with no "Concerned SP" the SCCP acts as in standard, for instance the SG starts an SST procedure towards the remote SCCP.

4) As in standard a local broadcast is initiated according to the MTP-STATUS information, that is, the SCCP gives N-PCSTATE indications to SCCP users.

5) In addition to local broadcast of standard, SCCP/SUA will broadcast "ReMote SCCP unavailable" status to all SUA ASes serving own SPCs of the SG (SDPCs) that have the same NI and market variant with the Affected SP. Thus, DUPU message is sent to all concerned ASPs in ACTIVE. The RC in DUPU is populated according to the AS the DUPU is sent to. DUPU includes the SI value of 3.

6) When DUPU is received, SUA ASP acts as SCCP in standard when MTP-STATUS indicates "Remote SCCP unavailable". Instead of SST the ASP will start periodic audit of the remote SCCP via a dedicated SG/SG. Details on audit are given below.

7) As in standard SCCP, like at step 4) above SUA indicates "Remote SCCP unavailable" to its users via the N-PCSTATE indication primitive.

Figure 18:
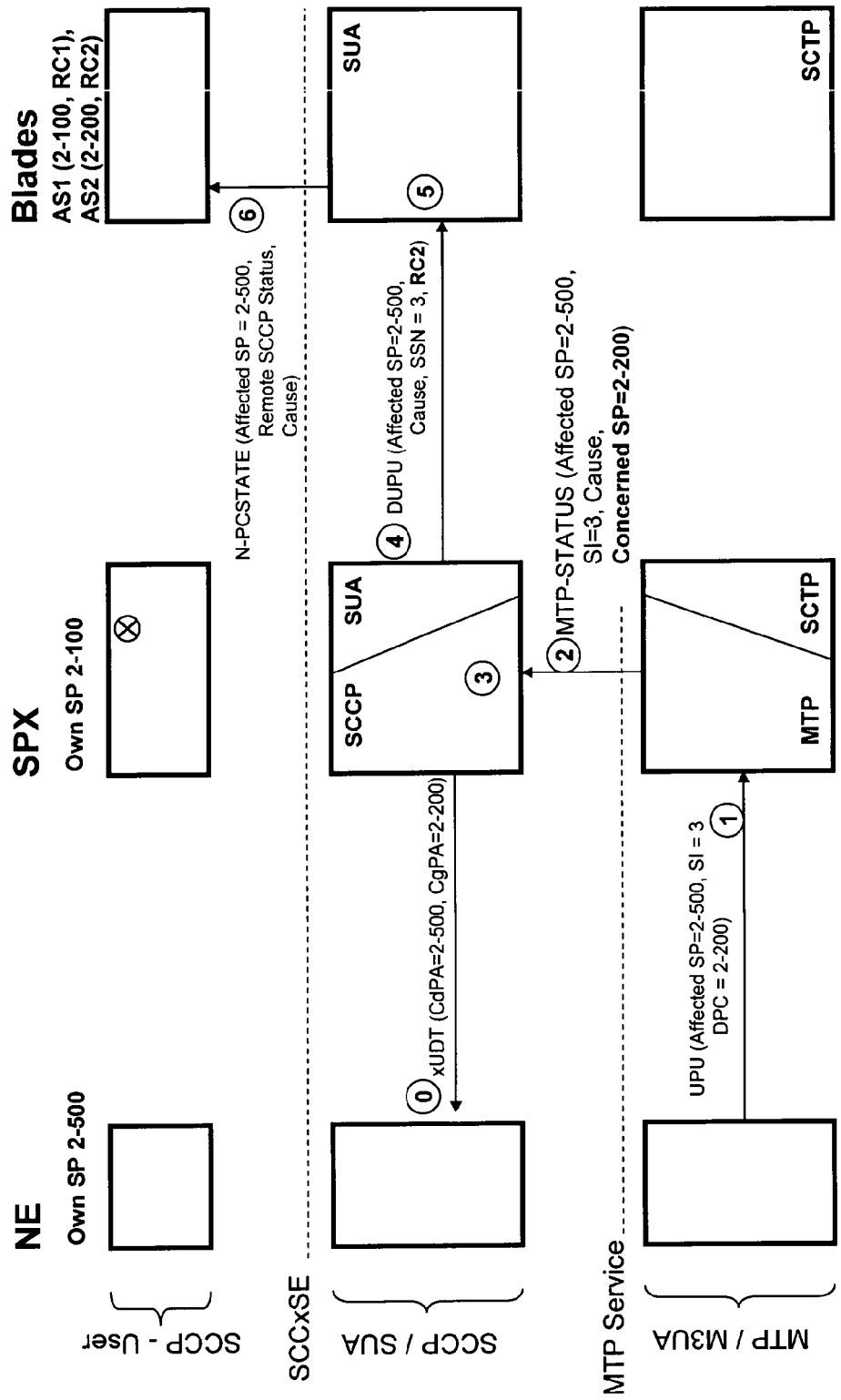
FIG. 18 is a schematic diagram illustrating the performing of a network management procedure using a signaling gateway.

FIG. 18 shows main steps that the SG and ASPs may take in case of "Remote SCCP unavailable" indication with "Concerned SP" parameter.

The flow of events and messages is as follows.

0) A traffic message is sent to the remote NE, say xUDT (CdPA=2-500, CgPA=2-200).

1) MTP/M3UA at 2-500 receives a user message for SCCP, which is unavailable. The message is answered with the UPU/DUPU message.

2) UPU/DUPU is indicated via MTP-STATUS to the SCCP at the SG. MTP/M3UA does include the "Concerned SP" parameter in MTP-STATUS since UPU/DUPU was destined to the Hosted SPC defined at MTP/M3UA layer.

3) At MTP-STATUS indication of Remote SCCP unavailability the SCCP checks whether "Concerned SP" is included, if so the next step is performed. Otherwise actions explained above in FIG. 17 apply.

4) The SCCP simply relays the indication as a DUPU message to the AS that serves the SHDPC indicated in the "Concerned SP" parameter. Thus, DUPU message is sent to all concerned ASPs in ACTIVE serving the SHDPC. The RC in DUPU is populated according to the chosen AS.

5) When DUPU is received, SUA ASP acts as SCCP in standard when MTP-STATUS indicates "Remote SCCP unavailable". Instead of SST the ASP will start periodic audit of the remote SCCP via a dedicated SG/SG.

6) As in standard SCCP, like at step 4) in FIG. 17 above, SUA indicates "Remote SCCP unavailable" to its users via the N-PCSTATE indication primitive.

Remote SCCP Available

Configuration 3

Actions at the SG

Local Broadcast of Remote SCCP Availability Information at the SG

Local Broadcast of Remote SCCP Availability Information at the SG can be due to an SSA received for Own SPC of the SG or due to T(stat.info) timer expiration.

In case SCCP at the SG receives an SSA message destined to the Own SPC of the SG and indicating remote SCCP availability, then SCCP at the SG follows the standard procedures implemented for Remote SCCP status management.

When the SCCP performs local broadcast of remote SCCP availability information to local users, the SCCP/SUA at the SG will broadcast this info to concerned SUA ASes, that is, the ASes that serve all Own SPCs of the SG that have the same NI and market variant with the affected SP. Thus, the SG sends DAVA messages to all ASPs that serve the SDPCs of the same NI and market variant with the affected SP. It is noteworthy that the DAVA message is broadcast to all SDPCs, and not only to the DPC of the SSA.

SCCP/SUA at the SG shall use locally stored remote SCCP status in case of an audit from an AS (ASP) that serves SDPCs.

The SCCP/SUA at the SG may not use locally stored remote SCCP status in case of an audit from an AS (ASP) that serves SHDPC.

SSA with SSN=1 Destined to SHDPC at the SG

When SCCP receives an SSA message indicating remote SCCP availability, and DPC in MTP routing label is a SHDPC, then the SCCP relays this indication as a DAVA message to the AS that serves the SHDPC. DAVA message includes Affected Point Code, Affected SSN=1. The RC is included based on the selected SUA AS.

After sending the SSA to concerned ASPs, SCCP/SUA at the SG stops the test inhibiting timer related to the remote SCCP, and deletes the corresponding record. Further below, more details on remote SCCP/SSN audit from the ASPs are given.

ASP Actions

At reception of the DAVA message indicating remote SCCP availability the SUA layer at the ASP will act as SCCP acts on reception of the SSA message indicating remote SCCP availability.

Overview of Application Servers Actions at an Incoming SSA with SSN=1

Figure 19:
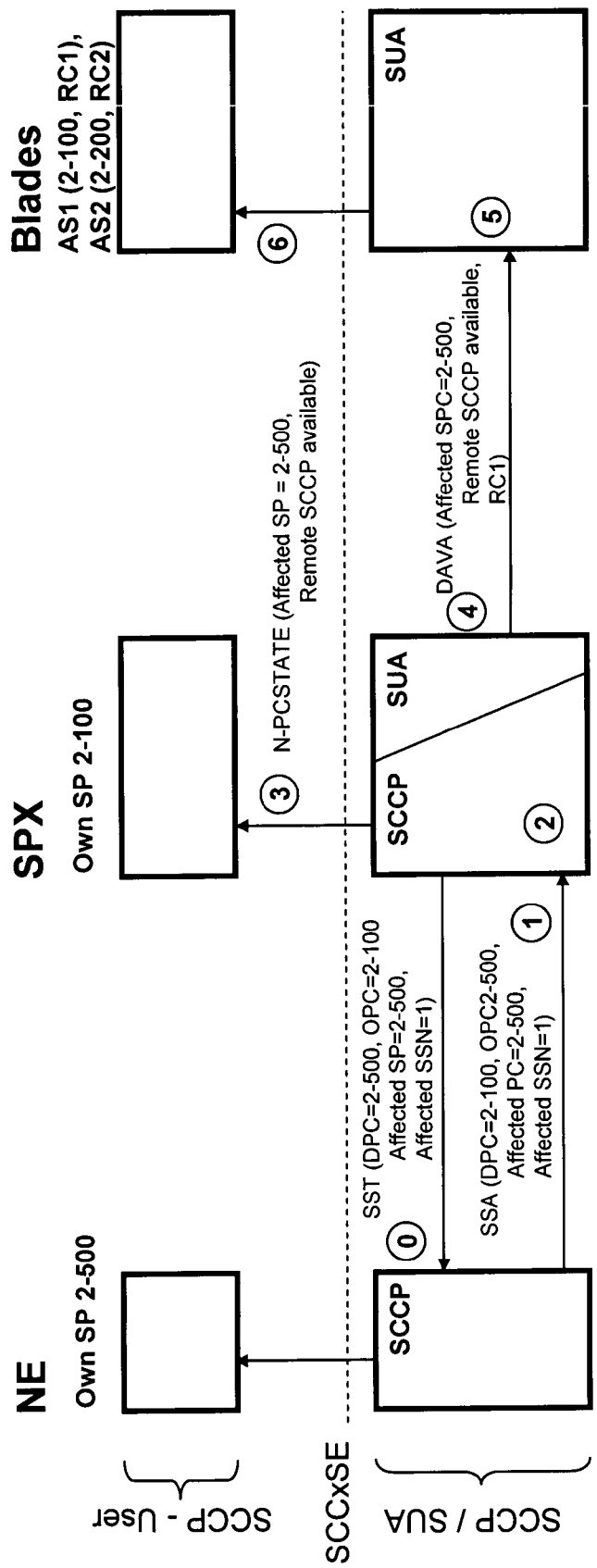
FIG. 19 is a schematic diagram illustrating the performing of a network management procedure using a signaling gateway.

FIG. 19 shows main steps that the SG and ASPs may take in case of "Remote SCCP Available" destined to the Own SP of the SG.

The flow of events and messages is as follows.

0) An SST message testing remote SCCP is sent to the remote NE, SST (DPC=2-500, OPC=2-100, Affected SSN=1, Affected SPC=2-500).

1) Remote SCCP answers with SSA (DPC=2-100, OPC2-500, Affected PC=2-500, Affected SSN=1).

2) When SSA indicating remote SCCP allowed and destined to the Own SPC of the SG is received at the SG, the SCCP at the SG behaves like in standard. When the T(stat-.info) corresponding to a remote SCCP expires at the SG, the SCCP behaves like in case of an SSA. (e.g. the fact that DPC of the SSA is checked against Own SPCs of the SG differs from the standard.)

3) In particular local broadcast of "Remote SCCP Available" status to SCCP Users is performed. Thus, N-PCSTATE indication is given to LSSes at the SG.

4) In addition to local broadcast of standard, SCCP/SUA will broadcast "Remote SCCP Available" status to all SUA ASes serving own SPCs of the SG (SDPCs) that have the same NI and market variant with the Affected SP. Thus, DAVA message with SSN=1 is sent to all concerned ASPs in ACTIVE. The RC in DAVA is populated according to the AS the DAVA is sent to.

5) When DAVA is received, SUA ASP acts as SCCP in standard when an incoming SSA indicates "Remote SCCP Available". The ASP will start periodic audit of the remote SSNs via a dedicated SG/SG, if required by local configuration. Further below, more details on route audit are given.

6) Similar to standard SCCP, like at step 3) above, SUA indicates "Remote SCCP Available" to its users via the N-PCSTATE indication primitive.

Figure 20:
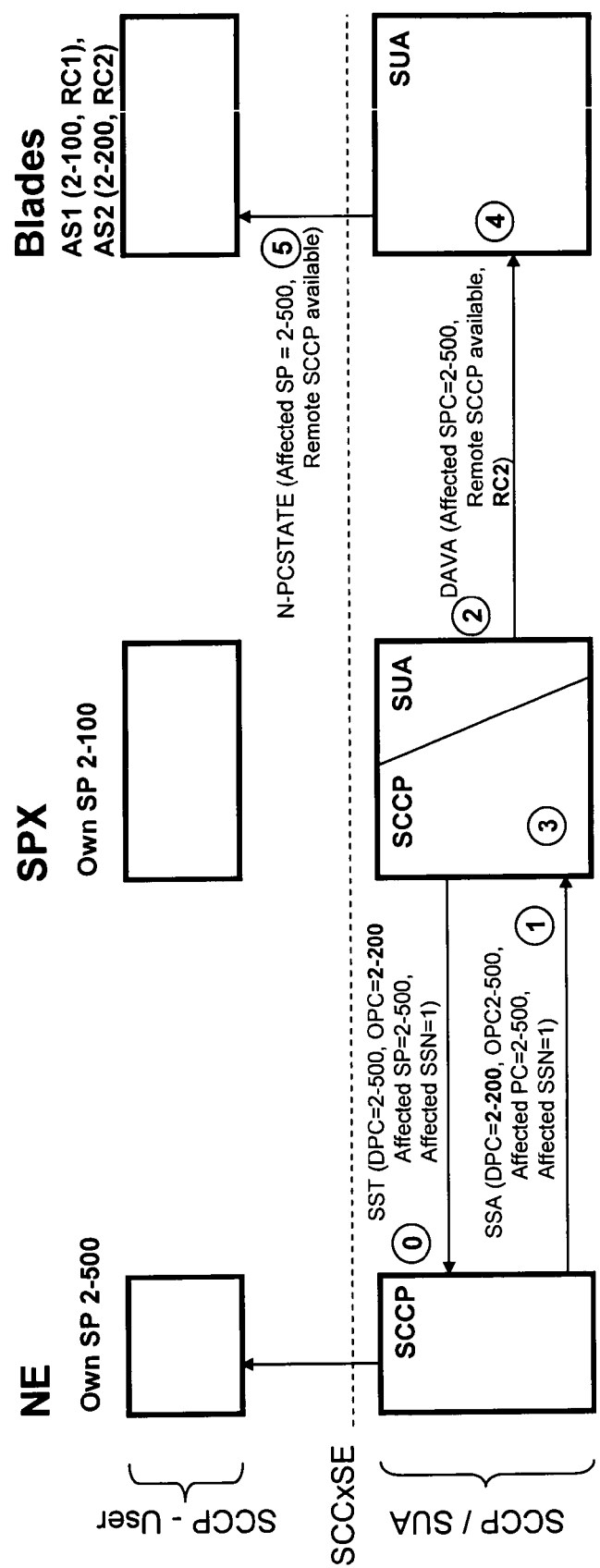
FIG. 20 is a schematic diagram illustrating the performing of a network management procedure using a signaling gateway.

FIG. 20 shows main steps that the SG and ASPs may take in case of "Remote SCCP Available" message is destined to a SHDPC.

The flow of events and messages is as follows.

0) An SST message testing remote SCCP is sent to the remote NE, SST (DPC=2-500, OPC=2-200, Affected SSN=1, Affected SPC=2-500) on behalf of the SHDPC 2-200.

1) Remote SCCP answers with SSA (DPC=2-200, OPC2-500, Affected PC=2-500, Affected SSN=1) to SHDPC 2-200.

2) When SSA is received at the SG, the destination of the SSA is checked. If it is a SHDPC, then SCCP/SUA will broadcast "Remote SCCP Available" status to the SUA AS that serves the SHDPC to which the SSA message was sent. Thus, DAVA message with SSN=1 is sent to all concerned ASPs in ACTIVE that serve the SHDPC 2-200. The RC in DAVA is populated according to the AS.

3) Then the SCCP/SUA stops the SST inhibiting timer corresponding to the remote SCCP, if any.

4) When DAVA is received at SUA ASP, SUA ASP acts as SCCP in standard when an incoming SSA indicates "Remote SCCP Available". Instead of SST the ASP will start periodic audit of the remote SSNs via a dedicated SG/SG, if required by local configuration. Refer to the sections further below for more details on audit.

5) Similar to standard SCCP, like at step 3) in FIG. 17 above, SUA indicates "Remote SCCP Available" to its users via the N-PCSTATE indication primitive.

Remote SSN Status Management

Remote SSN Prohibited

Configuration 3

Actions at the SG

SSP Message Destined to the Own SP of the SG

In case SCCP at the SG receives an SSP message destined to an Own SPC of the SG and indicating remote SSN prohibited, then SCCP at the SG follows the standard procedures implemented for Remote SSN status management. In particular, the SSN is marked prohibited, and an SST procedure is started. This can happen in response to an SST or a traffic message. The SG performs also broadcast to concerned remote SSNs.

In order to follow standard procedures for SSN status management the SG has to have provisioned all managed remote SSNs.

No local broadcast of remote SSN state is performed at the SG.

SCCP/SUA at the SG shall use locally stored SSN status in case of an audit from an AS (ASP) that serves SDPCs, and answer it with a DUNA message with the prohibited SSN included. The SG does not maintain the status of the SSNs that are peers of the SHDPCs, unless they are peers of SDPCs.

Thus, the SCCP/SUA at the SG may not use locally stored remote SSN status in case of an audit from an AS (ASP) that serves SHDPC. Refer to the sections further below for more details on audit of remote SS7 entities.

If a SUA CL or CO message is received from an AS that serves an Own SPC of the SG, that is, an SDPC, and the remote SSN is prohibited, then the SCCP/SUA layer at the SG answers with a DUNA message with the SSN included to the originating SUA AS-ASP. The included RC corresponds to the AS serving the SDPC. Therefore, there is no need to implement a broadcast of "remote SSN prohibited" to concerned SUA destinations similar to standard. It would require additional O&M to mark SDPCs as concerned, and change SDPC broadcast status for particular SSNs. This is similar to the AXE telephone exchange standard by Ericsson.

SSP Message Destined to the SHDPC at the SG

In case SCCP at the SG receives an SSP message destined to a SHDPC at the SG, and it is indicating remote SSN prohibited, then SCCP at the SG broadcasts the remote SSN prohibited info to all ASPs in ACTIVE state that serve the SHDPC AS. Thus, SCCP/SUA sends DUNA messages with included SSN and RC corresponding to the AS.

No other actions are performed at the SG in relation to that SSP. This SSP is not used to update the locally kept remote SSN state.

If a SUA CL or CO message is received from an AS that serves an SHDPC at the SG, then the SCCP/SUA layer at the SG sends the traffic message further to the destination using MTP/M3UA service. It is sent irrespective to the status of the remote SSN locally stored at the SG, prohibited or allowed.

ASP Actions

At reception of the DUNA message indicating prohibited remote SSN the SUA layer at the ASP will act as SCCP acts on reception of the SSP message indicating prohibited remote SSN. An audit may be started. At audit the ASP sends DAUD message, instead of the SST, on behalf of the local AS that received the DUNA message.

Overview of Application Servers Actions at an Incoming SSP with SSN>=2

Figure 21:
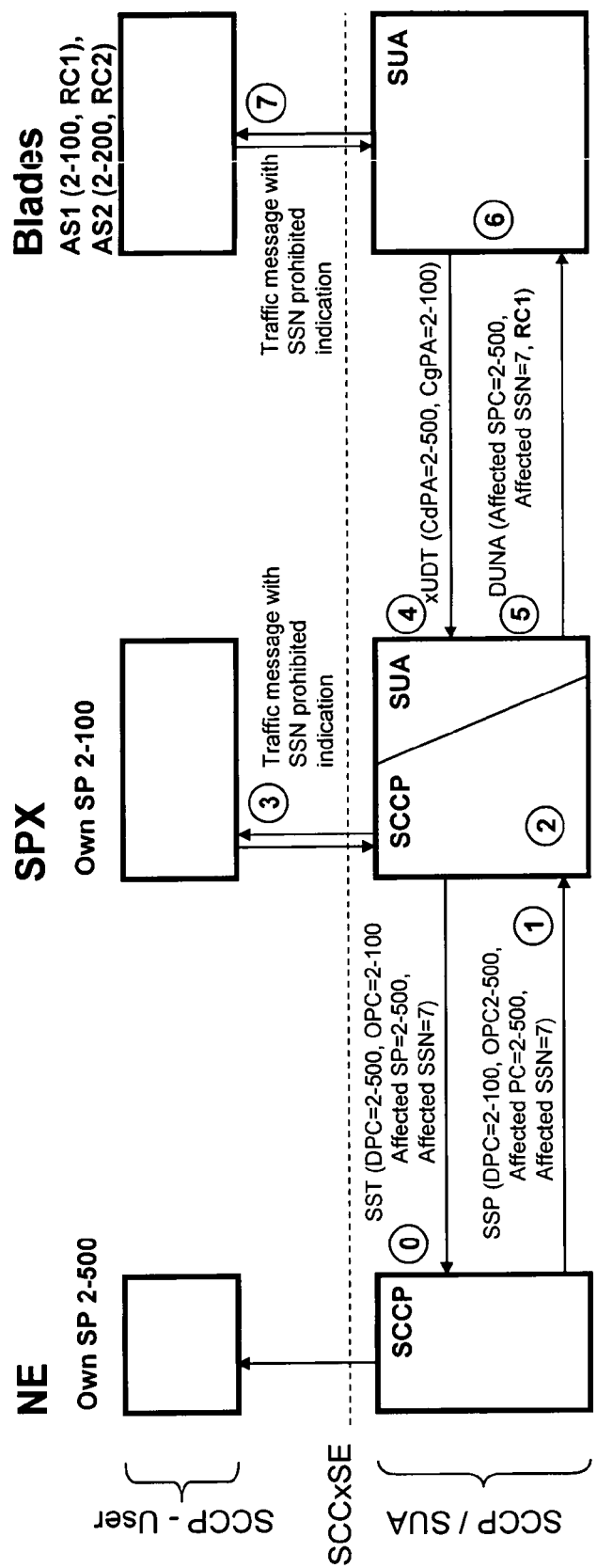
FIG. 21 is a schematic diagram illustrating the performing of a network management procedure using a signaling gateway.

FIG. 21 shows main steps that the SG and ASPs may take in case of "Remote SSN Prohibited" destined to an Own SP of the SG.

The flow of events and messages is as follows.

0) An SST message is sent to the remote SCCP on behalf of the Own SPC of the SG (or SDPC), it is testing the prohibited remote SSN. It may be also a traffic message sent to the remote NE, say xUDT (CdPA=2-500, CgPA=2-100). (standard)

1) In case remote SSN is out of service, the remote SCCP answers with an SSP message to the originator of the SST or CO/CL traffic message.

2) When the SSP is received at the SG the SCCP layer checks whether the SSP is destined to the Own SPC of the SG, if so, it updates the status of the remote SSN and starts SST procedure, if there is no "test in progress". Among others, the DPC check is non-standard. At this step the SCCP/SUA will broadcast "Remote SSN prohibited" to concerned subsystems, including subsystems residing in SUA network at AS serving the SDPC that equals the DPC of the MTP routing label in the SSP message.

3) When a CO/CL traffic message destined to the prohibited remote SSN is received at SCCP from local application LSS, the SCCP answers as in standard with traffic messages such as connection refusal or return on error to indicate to LSS that destination SSN is prohibited.

4) A CO/CL traffic message destined to the prohibited remote SSN is received at the SG from an SUA ASP and AS(2-100, RC1).

5) Then in response the SCCP/SUA broadcasts "remote SSN prohibited" info to the SUA AS that generated the CO/CL traffic message. Thus, a DUNA message with an SSN=7, and Affected SP 2-500 is sent to all concerned ASPs in ACTIVE state that serve the AS (2-100, RC1), which originated the traffic message. The RC in DUNA is populated according to the AS.

6) When DUNA is received, SUA ASP acts similar to SCCP in standard when an incoming SSP indicates "Remote SSN prohibited" status. Instead of SST the ASP will start periodic audit of the remote SCCP via a dedicated SG/SG.

7) Similar to standard SCCP, SUA does not perform local broadcast of the "Remote SSN prohibited" info to its local users. Instead, traffic messages such as connection refusal or return on error are used to indicate to the user originating traffic to the prohibited SSN, that the destination SSN is prohibited.

Figure 22:
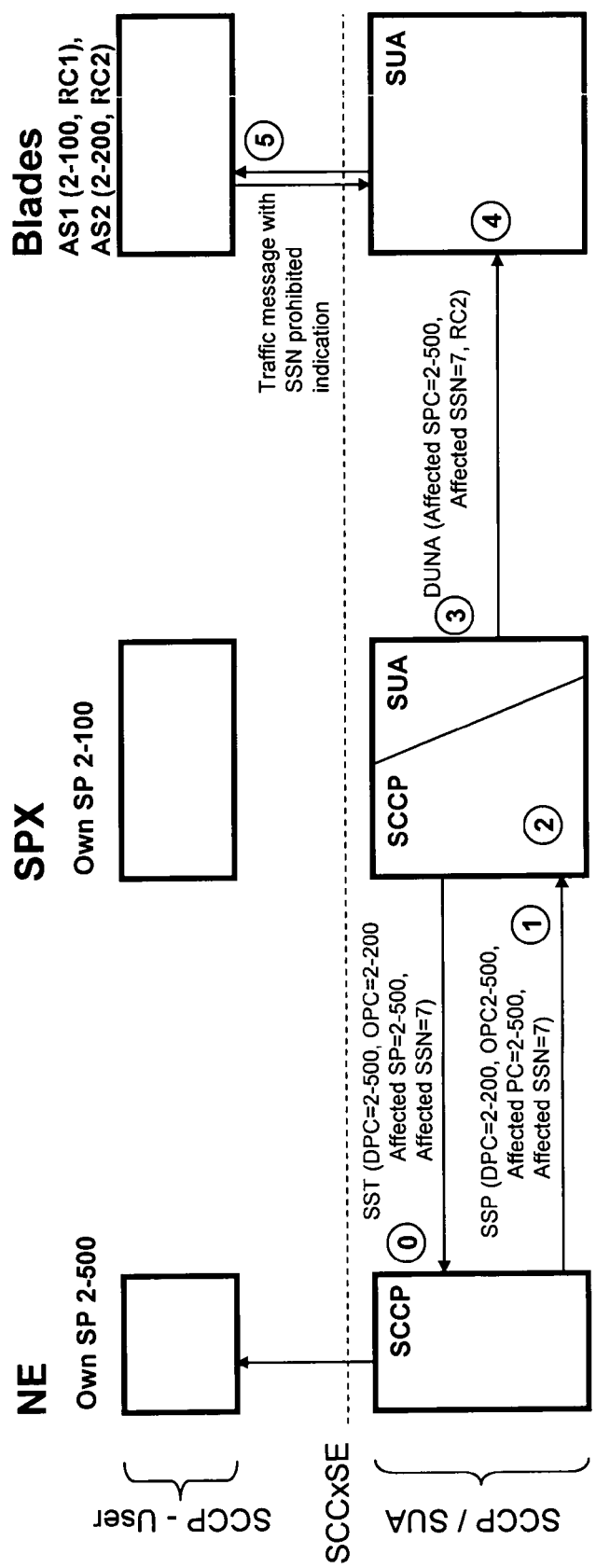
FIG. 22 is a schematic diagram illustrating the performing of a network management procedure using a signaling gateway.

FIG. 22 shows main steps that the SG and ASPs may take in case of "Remote SSN Prohibited" destined to an SHDPC at the SG.

The flow of events and messages is as follows.

0) An SST message is sent to the remote SCCP on behalf of the SHDPC 2-200 of the SG, it is testing the prohibited remote SSN. It may be also a traffic message sent to the remote NE, say xUDT (CdPA=2-500, CgPA=2-200).

1) In case remote SSN is out of service, the remote SCCP answers with an SSP message to the originator of the SST or CO/CL traffic message.

2) When the SSP is received at the SG the SCCP layer checks whether the SSP is destined to the Own SPC of the SG, if not, it checks the DPC against the provisioned SHDPCs, in case of match the SCCP/SUA broadcasts "remote SSN prohibited" info to the SUA AS that serves the SHDPC 2-200. No management procedure in SCCP at the SG is performed at this stage.

3) Thus, a DUNA message with an SSN=7, and Affected SP 2-500 is sent to all concerned ASPs in ACTIVE state that serve the AS (2-200, RC2). The RC in DUNA is populated according to the AS.

4) When DUNA is received, SUA ASP acts similar to SCCP in standard when an incoming SSP indicates "Remote SSN prohibited" status. Instead of SST the ASP will start periodic audit of the remote SCCP via a dedicated SG/SG. Refer to the sections further below for more details on audit 5) Similar to standard SCCP, SUA does not perform local broadcast of the "Remote SSN prohibited" info to its local users. Instead, traffic messages such as connection refusal or return on error are used to indicate to the user originating traffic to the prohibited SSN, that the destination SSN is prohibited.

Remote SSN Allowed

Alternative 3

Actions at the SG

SSA Message Destined to the Own SP of the SG

In case SCCP at the SG receives an SSA message destined to an Own SPC of the SG and indicating remote SSN allowed, then SCCP at the SG follows the standard procedures implemented for Remote SSN status management. In particular, the SSN is marked allowed, and the corresponding "test in progress" is stopped, if any. SSA can happen in response to an SST or as a spontaneous message from the remote SCCP.

No local broadcast of remote SSN status is performed at the SG.

Broadcast of "Remote SSN Allowed" Status

Option 1: Similar to broadcast of standard, the SG forwards "remote SSN Allowed" by initiating a broadcast of "remote SSN Allowed" status to SDPCs marked as concerned about the affected Subsystem. This fits well the standard behavior of SCCP, where SCCP performs broadcast to SCCP destinations marked as concerned. It reduces the number DAVA messages to SUA destinations (SDPCs), however, it needs additional configuration.

Option 2: Although it is against the standard behavior, it can be suggested that SCCP/SUA broadcasts "Remote SSN Allowed" info to all ASes serving SDPCs of the same market and NI when an SSA is received.

SCCP/SUA at the SG may use locally stored SSN status in case of an audit from an AS (ASP) that serves SDPCs, and answer DAUD message with a DAVA that includes the (allowed) affected SSN and corresponding RC.

The SCCP/SUA at the SG may not use locally stored remote SSN status in case of an audit from an AS (ASP) that serves SHDPC. Refer to the sections below for more details on audit. of remote SS7 entities.

SSA Message Destined to the SHDPC at the SG

In case SCCP at the SG receives an SSA message destined to a SHDPC at the SG, and it is indicating remote SSN allowed, then SCCP at the SG broadcasts the remote SSN allowed info to all ASPs in ACTIVE state that serve the SHDPC AS. Thus, SCCP/SUA sends DAVA messages with included SSN and RC corresponding to the AS.

After sending the SSA to concerned ASPs, SCCP/SUA at the SG stops the test inhibiting timer related to the remote SSN, and deletes the corresponding record, if there are any. Refer to the sections further below for more details on remote SSN audit from the ASPs.

ASP Actions

At reception of the DAVA message indicating allowed remote SSN the SUA layer at the ASP will act as SCCP acts on reception of the SSA message indicating allowed remote SSN. The audit is stopped, if any.

No local broadcast of remote SSN status is performed at the SUA ASP.

Overview of Application Servers Actions at an Incoming SSA with SSN>=2

Figure 23:
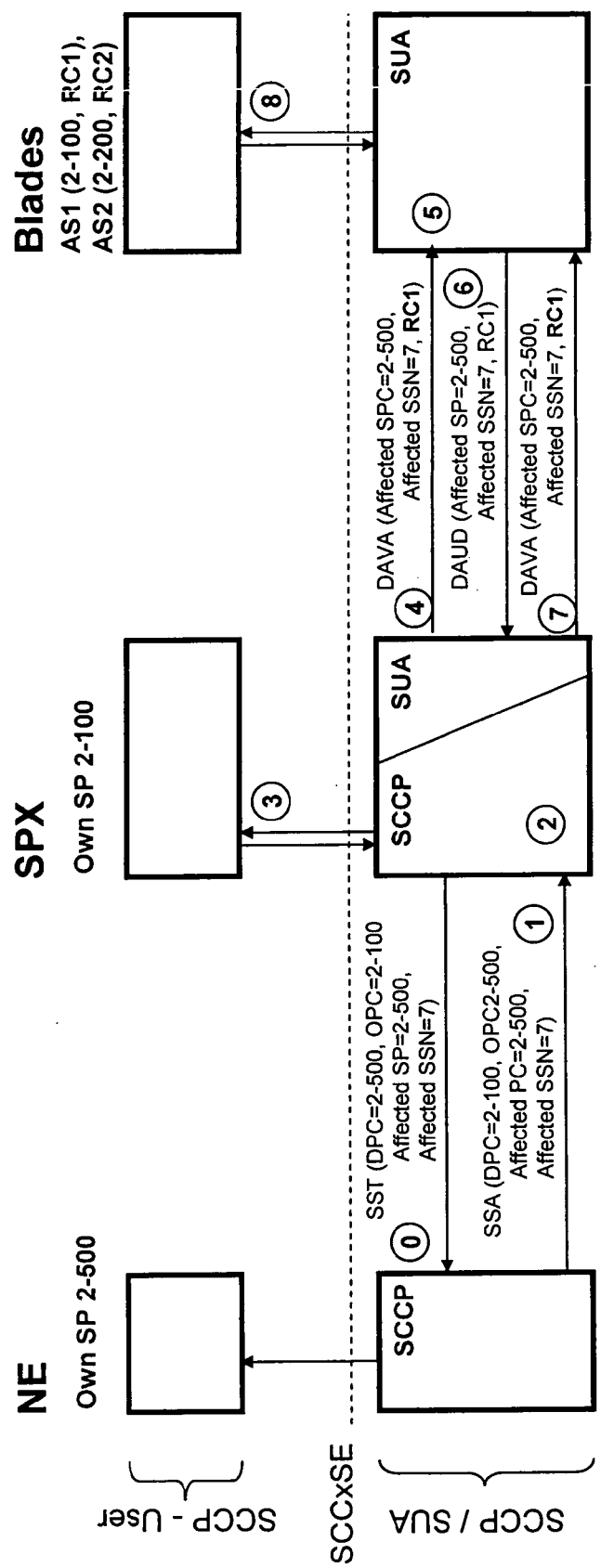
FIG. 23 is a schematic diagram illustrating the performing of a network management procedure using a signaling gateway.

FIG. 23 shows main steps that the SG and ASPs may take in case of "Remote SSN Allowed" destined to an Own SP of the SG.

The flow of events and messages is as follows.

0) An SST message is sent to the remote SCCP on behalf of the Own SPC of the SG (or SDPC), it is testing the prohibited remote SSN.

1) The remote SCCP answers with an SSA message to the originator of the SST.

2) When the SSA is received at the SG the SCCP layer checks whether the SSA is destined to the Own SPC of the SG, if so, it updates the status of the remote SSN and stops SST procedure, if there is an ongoing "test in progress". (almost standard, except for the DPC check)

3) When a CO/CL traffic message destined to the allowed remote SSN is received at SCCP from local application LSS, it gets through successfully (it is not shown on SCCP interface in FIG. 23). A traffic message with a successful answer is exchanged.

4) SCCP/SUA at the SG broadcasts a DAVA message to concerned ASPs in active state. Thus, a DAVA message with an SSN=7, and Affected SP 2-500 is sent to the ASPs that service the SDPC included in the MTP routing label of the SSA message. The RC in DAVA is populated according to the AS (2-100, RC1).

5) When DAVA is received, SUA ASP acts similar to SCCP in standard when an incoming SSA indicates "Remote SSN Allowed" status.

6) If DAVA, from step 4) above does not reach the ASP, then due to periodic audit of the prohibited remote SSN, the ASP sends a DAUD for affected SSN 7 at 2-500 on behalf of the AS (2-100, RC1) servicing an own SPC of the SG.

7) If the SSN is allowed, SCCP/SUA at the SG answers with a DAVA message to the auditing ASP-AS. Thus, a DAVA message with an SSN=7, and Affected SP 2-500 is sent to the ASP that originated DAUD. The RC in DAVA is populated according to the AS (2-100, RC1). Then step 5) is performed.

8) SUA at the ASP does not perform local broadcast of the "Remote SSN Allowed" info to its local users, when DAVA is received. Applications themselves restart sending traffic, which is successfully sent, if the destination SSN status is allowed. A traffic message with a successful answer is exchanged.

Figure 24:
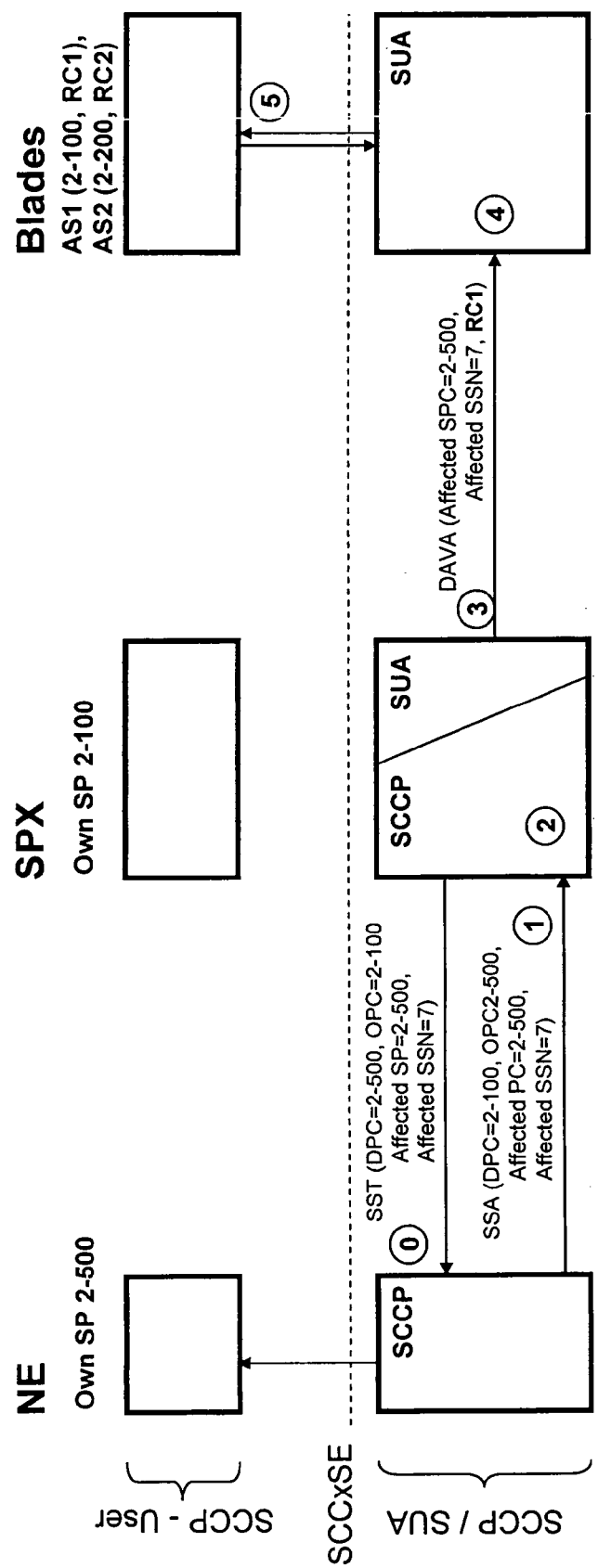
FIG. 24 is a schematic diagram illustrating the performing of a network management procedure using a signaling gateway.

FIG. 24 shows main steps that the SG and ASPs may take in case of "Remote SSN Prohibited" destined to an SHDPC at the SG.

The flow of events and messages is as follows.

0) An SST message is sent to the remote SCCP on behalf of the SHDPC 2-200 of the SG, it is testing the prohibited remote SSN.

1) In case remote SSN is in service, the remote SCCP answers with an SSA message to the originator of the SST.

2) When the SSA is received at the SG the SCCP layer checks whether the SSA is destined to the Own SPC of the SG, if not, it checks the DPC against the provisioned SHDPCs, in case of match the SCCP/SUA broadcasts "remote SSN Allowed" info to the SUA AS that serves the SHDPC 2-200.

3) Thus, a DAVA message with SSN=7, and Affected SP 2-500 is sent to all concerned ASPs in ACTIVE state that serve the AS (2-200, RC2). The RC in DAVA is populated according to the AS.

SCCP/SUA at the SG stops the test inhibiting timer related to the remote SSN, if any, and deletes corresponding resources. Refer to the sections below for more details on remote SSN audit from the SGs and ASPs.

4) When DAVA is received, SUA ASP acts similar to SCCP in standard when an incoming SSA indicates "Remote SSN Allowed" status. Periodic audit of the remote SSN is stopped, if it is in progress.

5) SUA does not perform local broadcast of the "Remote SSN Allowed" info to its local users. Applications themselves restart sending traffic. The traffic is successfully sent, if the destination SSN status is allowed. In step 5, a traffic message with a successful answer is exchanged.

Subsystem Status Test

Configuration 3

Actions at the SG

Subsystem Test on Behalf of Own SPs of the SG

SCCP at the SG will follow the standard procedures of Subsystem and remote SCCP test, if they relate to the Own SP of the SG, that is, if the corresponding trigger primitive/message does address an Own SP of the SG:

When MTP-STATUS indication primitive without "Concerned SP" is received with "UPU, reason unknown" or "UPU, inaccessible" information for the SCCP at the remote Signaling Point, a subsystem status test is initiated to verify the status of SCCP (SSN=1).

The Subsystem status test is also initiated when an MTP-STATUS indication primitive without "Concerned SP" is received with "UPU, unequipped" information, and the AXE parameter for UPU message treatment, is set to start the SST procedure.

When an SSP message destined to an Own SP of the SG is received for a remote Subsystem provisioned at the SG.

When MTP-RESUME indication primitive without "Concerned SP" is received and the subsystem status test procedure is enabled for the Subsystems marked for test by provisioning.

When an SSA message destined to an Own SP of the SG is received for SSN=1 and the subsystem status test procedure is enabled for the subsystems marked for test by provisioning.

When the status of the tested SCCP changes to allowed, the local broadcast of remote SCCP available is performed. It results in DAVA sent to SDPCs as described in section 0 above.

When the status of the tested remote SSN changes to allowed, the SCCP/SUA broadcasts "remote SSN allowed" info to SDPCs as described in section 0 above.

When a DAUD message related to an Affected SP and SSN is received from an AS servicing an SDPC, the SCCP answers it with DUNA or DAVA according to the local state of the remote SSN/SCCP at the SG. The SG determines whether DAUD is sent from an AS serving an SDPC based on the RC included in DAUD. NI and Market variant of the affected SP are also derived from the RC. When the ASP audits the remote SCCP, the SSN in DAUD equals 1, the SG includes SSN=1 in response DAVA/DUNA message.

Subsystem Test on Behalf of SHDPCs of the SG

The SCCP at the SG does not start subsystem test on behalf of SHDPCs by its own.

When a DAUD message related to an Affected SP and SSN is received from an AS servicing an SHDPC, the SCCP
  checks if there is an "inhibiting test in progress" timer running that inhibits received DAUD messages to the Affected SP and SSN from that particular AS.
  If there is no "inhibiting test in progress", the SCCP/SUA translates the DAUD to an SST and sends it to the Affected SP and SSN, and starts an "inhibiting test in progress" timer associated with the Affected SP, Affected SSN, and Concerned AS (the originator of the DAUD).

If the RC in DAUD points to an AS that serves several SHDPCs, then based on one DAUD the SCCP/SUA sends as many SSTs as there are SHDPCs served by the AS; each SST corresponds to one of the SHDPCs, this SHDPC is included as OPC in the MTP routing label of the sent SST message.

If there is an "inhibiting test in progress" associated with the received DAUD, the SCCP/SUA discards the DAUD message without any further action.

The "inhibiting test in progress" timers can be indexed (identified) by the triplet (RC, SPC, SSN) included in DAUD, where the SPC is the Affected SP and SSN is the affected SSN form DAUD.

The SCCP/SUA at the SG populates the SST message as follows the affected SP and SSN are taken from the DAUD message, NI and market variant are derived from the RC included in the DAUD DPC in SST equals the affected SP, OPC in SST equals the DPC of the RK that corresponds to the RC included in the DAUD, if the RK contains one DPC only.

If there is more than one DPC in the RK, then the SST message is given to MTP/M3UA with the MTP routing label that SCCP has stored for the corresponding DPC at connection of the DPC to the MTP service.

When an SSA destined to an SHDPC is received in response to the SST, the SCCP/SUA broadcasts corresponding info to the concerned AS servicing the SHDPC, and stops the associated "inhibiting test in progress" timer and releases corresponding resources.

The "inhibiting test in progress" timer in SCCP/SUA may be provisioned shorter than the T(stat.info) timer driving audits at ASPs (ASPs), to avoid inhibiting two DAUDs in sequence from the same AS that are separated by an interval longer than T(stat.info). However, this is not necessary, and the same value is acceptable.

The "inhibiting test in progress" timer may always be set to the same value, which does not depend on the duration of the ongoing audit procedure.

Please note that this handling does not require any special configuration of DPCs residing in SS7 network. SS7 DPC configuration in SCCP/SUA at SG may be as in standard. There is no need to provision at the SG the remote SS7 SSNs that communicate with SHDPCs only.

Actions at the ASPs

At audit the ASPs actions do not depend on whether the AS performing the audit is servicing a SHDPC or SDPC.

ASPs start periodic audit based on the same triggers as SCCP in standard, that is, DUNA, DUPU and DAVA messages that correspond according to SUA RFC to the triggers listed in subsection "Subsystem Test on behalf of Own SPs of the SG" of this section, see above. ASPs follow standard Subsystem Test procedures.

Among others, differences to standard SST are that instead of the SST message the DAUD message is sent, it includes the Affected SP, Affected SSN, and the RC.

instead of triggers of standard, ASPs receive DUNA, DUPU, and DAVA, that can contain the Affected SP, and optionally the Affected SSN, and the RC. If the RC is not included the default RC is taken, to select the NI and market variant (ASPs need to be able to select the default RC for the case when there is no RC included in the message in order to stay SUA standard compliant).

In order to avoid parallel audit of the same remote SSN/SCCP from two SGs, in multiple SUA SGs scenario, all ASPs that have signaling relations with a remote destination may perform periodic audit of the SSN/SCCP via one and the same dedicated SUA SG. For that reason a simple mechanism for selection of the same SG for SSN/SCCP audit is needed at ASPs, it can be a configuration flag, or an automatic method. The automated way is preferred to select always the same SG for audit, for instance, the ASPs may always take the route via the SGP with the smallest IP address. In result of that mechanism, for each SS7 DPC provisioned at the ASPs one route to that DPC is marked for audit, which may be called "Audit Route" to DPC. When the audit route to a DPC is available the ASP shall use this route for audit of remote SSNs/SCCP at the DPC. Audit Route for a particular destination shall point to the same SG/SG on all ASPs.

When the "audit route" to the destination where the audited SS7 entity resides is unavailable, the ASP uses another route via the second SG, if such route exists and is available.

Overview of Application Servers Actions at Subsystem Audit

Figure 25:
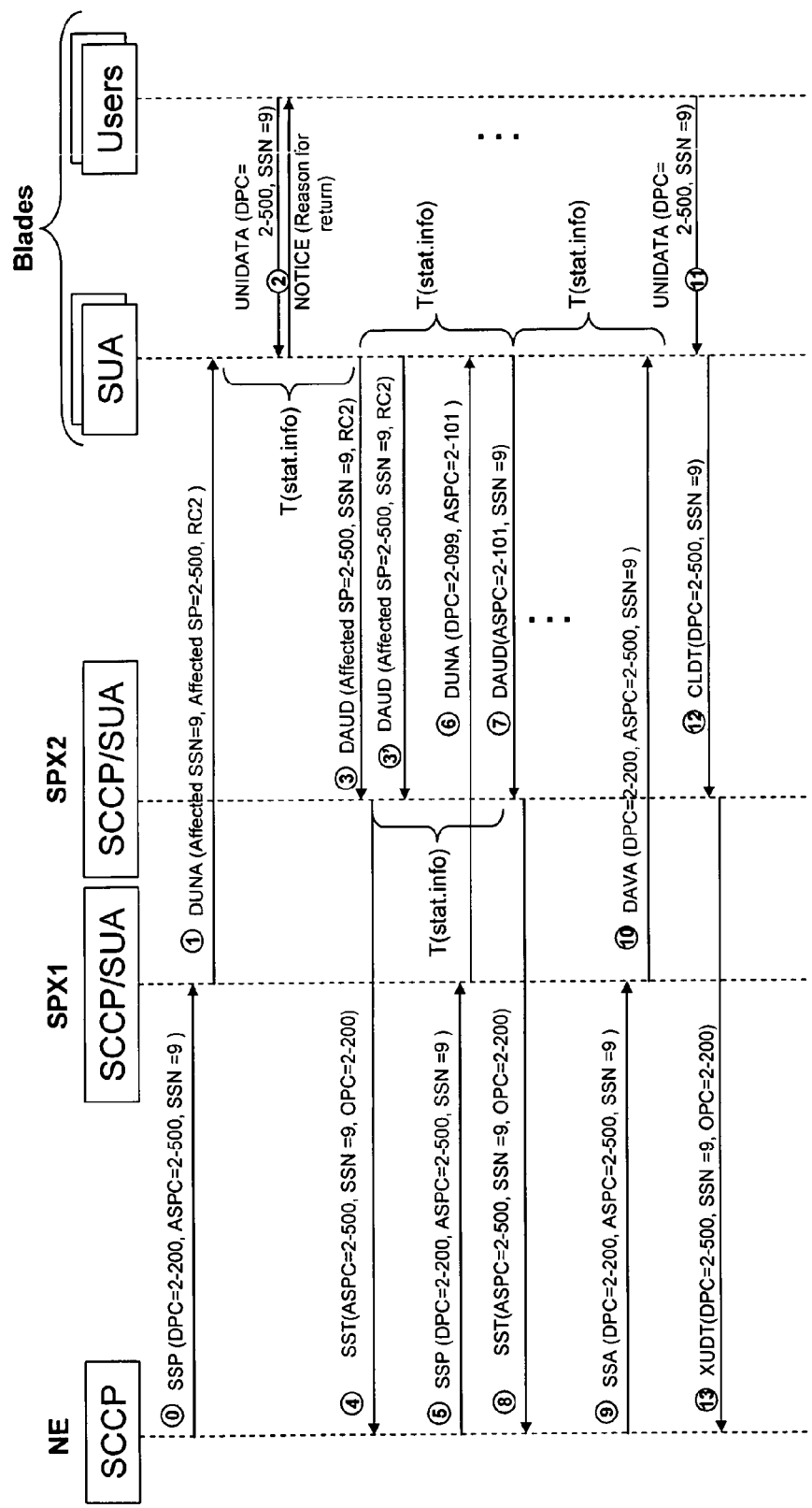
FIG. 25 is a flow diagram illustrating the performing of a auditing procedure towards a SS7 network node.

FIG. 25 shows main steps in case of Subsystem audit on behalf of SHDPCs of the SG.

The flow of events and messages is as follows, it was explained above in the NW view section.

0) The SG1 receives an SSP from an SCCP peer indicating that the remote SSN 9 at the SPC 2-500 is prohibited 1) Since the SSP message is destined to a SHDPC 2-200, SG1 transfers the SSP as a DUNA to SUA ASPs serving the SHSPC 2-200. No other actions are taken in the SG. Each ASP that receives the DUNA message performs SSN prohibited procedure: it marks the SSN as prohibited, starts periodic audit of the SSN.

2) If users at the ASPs send traffic, e.g. N-UNIDATA, to the prohibited remote SSN, SUA at the ASPs notifies local users with N-NOTICE primitive, in case return on error option was requested.

3) DAUD is sent to one dedicated SG, SG2, provided the "audit route" to 2-500 via SG2 is available.

4) If DAUD is originated from an AS serving an SDPC the SG2 answers with DUNA/DAVA to the ASP that originated DAUD, it is done based on the local status of the SSN/SCCP at the SG (it is not shown in FIG. 25).

Otherwise, if DAUD is originated from an AS serving an SHDPC, the SG2 relays the DAUD as an SST message to the SPC 2-500, records the DAUD and starts an "inhibiting test in progress" timer associated with the affected SPC 2-500, affected SSN 9, and the AS that originated DAUD. For the duration of the timer the SG2 does not relay DAUD messages to the affected SPC for that SSN from the AS. The OPC in the MTP routing label of the SST contains an SHDPC that corresponds to the AS. If the AS serves more than one SHDPC, the SUA/SCCP sends one SST per served SHDPC.

3') Another ASP audits the same SSN normally via the same SG. SG2 does not relay DAUD when inhibiting test in progress timer is running.

5) The NE answers the SST with an SSP sent to SG1.

6) SG1 relays the SSP as DUNA to ASPs like in 1).

7) At T(stat.info) expiration at the ASP, it sends next DAUD as in step 3) and restarts T(stat.info).

8) Since inhibiting test in progress timer, e.g. T(stat.info), at SG1 has expired and the record corresponding to the old SST has been deleted, the SG2 repeats the same step as 4) above. This sequence of events and messages continues until the NE answers with an SSA.

9) NE receives an SST for an allowed SSN 9, it answers with an SSA to the originator of the SST, that is, to SPC 2-200.

10) SG1 receives the SSA. The SSA is relayed as DAVA to all ASPs serving the SUA hosted SPC 2-200. If there is any SST record associated with the affected SSN 9, the associated inhibiting test in progress timer T(stat.info) is stopped and the record is deleted. The ASPs receive DAVA, stop the ongoing audit ("test in progress" of standard SCCP).

11) Applications continue with traffic.

12) SUA relays traffic to the SG.

13) SGs relay traffic further remote SSN 9.

Audit of SS7 Entities at ASPs

Configuration 3

Reference is made to the section above for a description of subsystem audit. Here audit of routes to remote signaling points is considered.

Actions at the ASP

When SUA at the ASP receives a DUNA message without an Affected SSN from an SG, the ASP follows the procedures described in section "Remote Signaling Prohibited" above. The route to the Affected SP via the SG that originated DUNA message is marked as unavailable. In addition, the ASP starts the procedure of periodic audit of the route via the SG that originated DUNA to the remote signaling point.

If there is no other route available to the Affected SP, the Affected SP is marked prohibited (inaccessible) and a local broadcast of N-PCSTATE is initiated.

Thus each unavailable route is tested on behalf of the AS that communicates with the corresponding signaling point.

When an AS at an ASP is INACTIVE, the ASP does not audit on behalf of the AS, that is, it does not audit routes to any destinations that communicate with the AS.

When an AS becomes ACTIVE in an ASP for an SG (SGP), all routes via the SG that are used by the AS are assumed unavailable, and the ASP starts periodic audit of all routes via the SG for that AS.

Periodic Audit of Routes (Route Status Test)

Periodic audit of a route to a signaling point is similar to subsystem test.

The route status test associated to a route is commenced by starting a status information timer, T(stat.info), and marking the route as "test in progress". No further actions are taken until the timer expires.

Upon expiration of the timer T(stat.info), a destination audit (DAUD) message is sent to the SG that the route is connected to, and the timer is upgraded.

SUA at the ASP populates the DAUD message as follows
the affected SP is the DPC of the route (the NI and market variant are known),
please note that no SSN is included in DAUD message
the ASP derives the RC included in the DAUD from the Affected SP (NI and market variant are assumed), since there can be only one AS at the ASP that communicates to the Affected SP. This can be applied if the RK has SPC granularity.

The cycle continues until the test is terminated by another SUA management function at that ASP, for example, reception of a DAVA message. Termination of the audit causes the timer and the test progress mark to be cancelled.

When SUA at the ASP receives a DAVA message without an Affected SSN, the ASP stops the ongoing periodic route audit (Route Status Test). The route is marked as available. If the Affected SP is prohibited (inaccessible), it is marked as allowed (accessible), the remote SCCP is marked as allowed, and a local broadcast of N-PCSTATE is performed. Otherwise, if the Affected SP is allowed (accessible), and there are other routes available to the SP, the ASP performs controlled re-routing procedure; if the remote SCCP is unavailable its audit is continued.

Overview of Application Servers Actions at Route Audit

Figure 26:
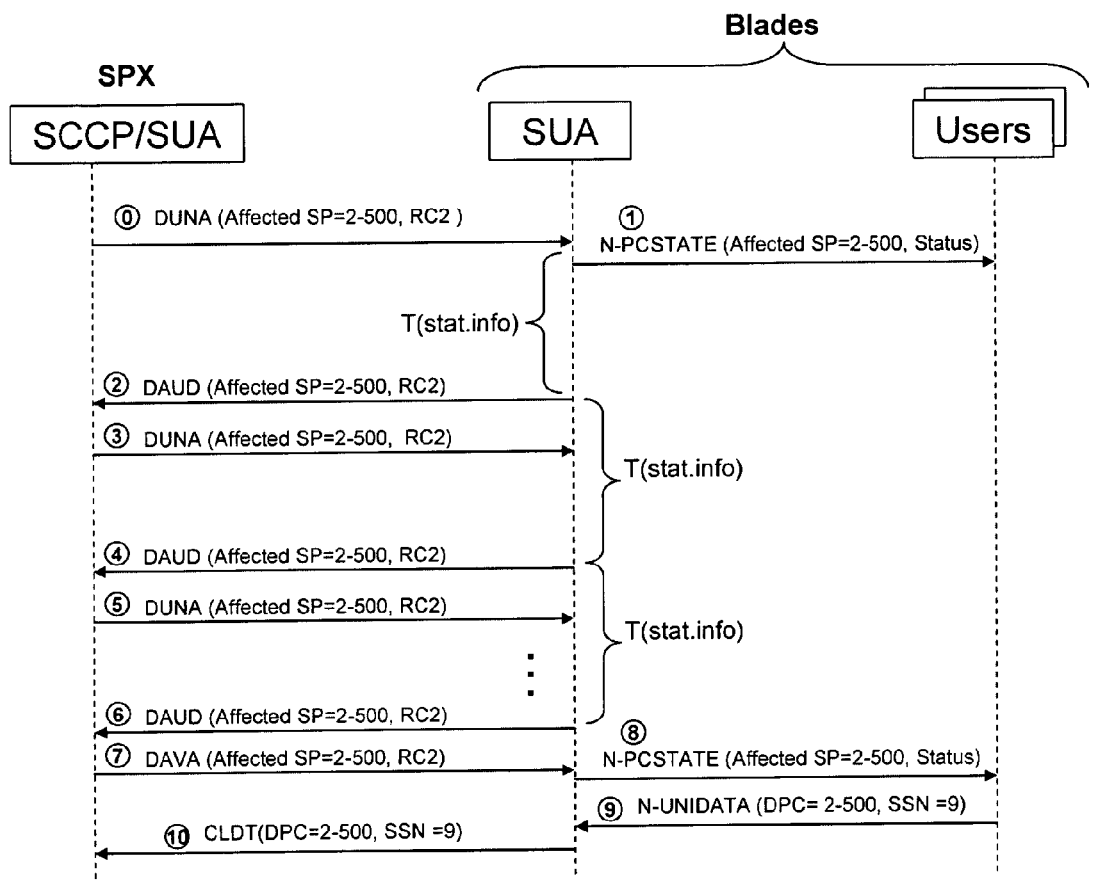
FIG. 26 is a flow diagram illustrating the sending of network management messages between an application server process and a signaling gateway.

FIG. 26 shows main steps in case of Route Audit.

The flow of events and messages is as follows.

0) A DUNA message without SSN is received at the ASP. DUNA indicates unavailability of the route to Affected SP via the SG. The route is marked unavailable, and route status test procedure started.

1) If there are no other available routes to the Affected SP at the ASP, the ASP marks the signaling point prohibited (inaccessible), and informs local users accordingly via N-PC-STATE primitive.

2) When T(stat.info) expires, the ASP sends DAUD without SSN over the route to the SG/SG.

3) Since the Affected SP at the SG is still prohibited (inaccessible), the SG answers with a DUNA to the DAUD originating ASP-AS. The RC in DUNA points to the AS that originated DAUD.

The SG acts the same for ASes serving SDPCs and SHDPCs, the answer to DAUD always caries the local status of the Affected SP at SG (DUNA/DAVA).

4)-6) These steps repeat in sequence actions of steps 2) and 3) above

7) The Affected SP at the SG is now allowed (accessible), the SG answers with a DAVA to the ASP-AS that originated DAUD. The RC in DAVA points to the AS that originated DAUD.

The SG acts the same for ASes serving SDPCs and SHDPCs, the answer to DAUD always caries the local status of the Affected SP at SG.

When DAVA is received at the ASP the corresponding route is marked as available.

8) If Affected SP status at the ASP is prohibited it is changed to allowed and N-PCSTATE primitive indicates that to local users.

9)-10) Applications start sending traffic.

SCCP Congestion Management

More details are given in section "remote signaling point congested" above.

Management of SUA Entities

Signaling Point Status Management

Since SUA in application servers may support SPC level of RK granularity, status of SSNs residing in SUA network (ASPs) is determined by SPC state only.

SUA Signaling Point Prohibited

The status of the signaling points residing in SUA network is indicated to remote peers depending on the type of the SUA signaling points. In the following only SG actions are considered.

SHDPC Prohibited (Inaccessible)

When AS serving an SHDPC changes its state from ACTIVE (or PENDING) to INACTIVE, then SCCP/SUA at the SG performs the following steps
 a. the SHDPC is marked "prohibited" (inaccessible);
 b. MTP-PCSTATE request primitive is used to indicate to MTP/M3UA layer that SHDPC is inaccessible;
 c. all SSNs provisioned at that SHDPC are marked "prohibited";

If SCCP/SUA receives a traffic message to a prohibited SHDPC, that is, it receives an MTP-TRANSFER indication primitive with a non-management message and DPC in the MTP routing label equals a prohibited SHDPC, then SCCP/SUA uses response method and answers to MTP/M3UA on each 8th message with MTP-PCSTATE request primitive indicating that SHDPC is inaccessible.

At MTP-PCSTATE request primitive invocation the MTP/M3UA informs all adjacents about unavailability of the routes to the SHDPC via the SG. It is done using TFP, DUNA, ASPIA messages.

MTP/M3UA may consider SHDPC as available as soon as SCCP/SUA layer connects successfully the SHDPC to MTP/M3UA layer (using standard connect use case enhanced with hosted SPC flag).

SDPC Prohibited (Inaccessible)

When AS serving an SDPC changes its state from ACTIVE (or PENDING) to INACTIVE, then SCCP/SUA at the SG performs the following steps
 a. the SDPC is marked "prohibited" (inaccessible);
 b. all SSNs provisioned at that SDPC are marked "prohibited";
 c. SCCP/SUA broadcast "SSN prohibited" status to all SCCP SEPs provisioned at SCCP level, and marked as concerned for the affected SSN. Due to response method, this step is optional.

Figure 27:
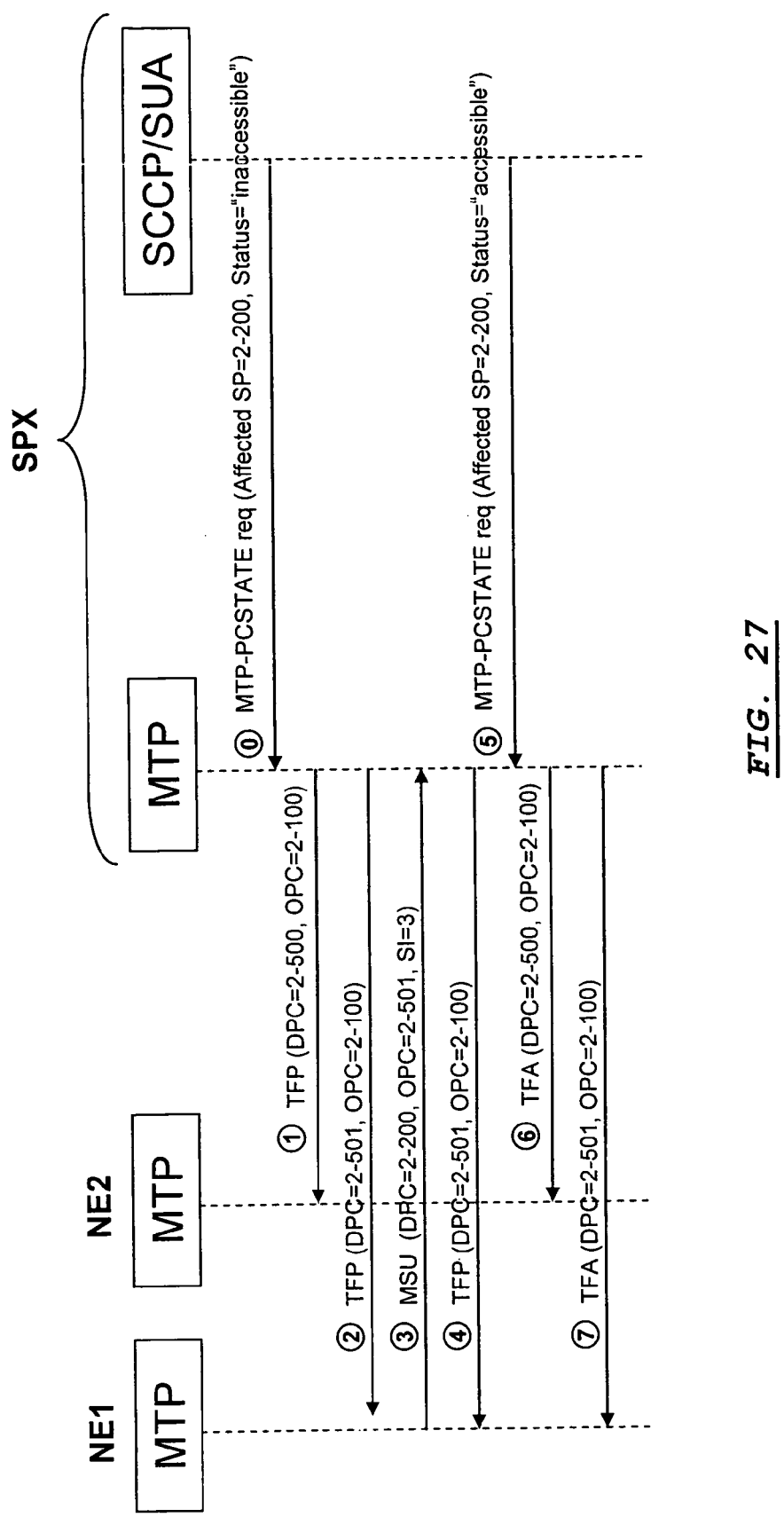
FIG. 27 is a flow diagram illustrating the sending of network management messages between an SS7 network node and a signaling gateway.

Remote peers are informed about unavailability of the SUA destination using response method as follows. If SCCP/SUA receives a traffic message to a prohibited SDPC, that is, it receives an MTP-TRANSFER indication primitive with a non-management message and DPC in the MTP routing label equals a prohibited SDPC and SSN in the CdPA is not an LSS at the SG, then
 a. SCCP/SUA checks if the SSN in the CdPA is provisioned at SDPC, if so the SCCP/SUA answers to the peer SS7 SPC with an SSP;
 b. The message is handled according traffic handling rules, e.g. return on error is invoked, or connection refusal is triggered, with the appropriate reason;

FIG. 27 shows the main steps that the SG may take in case of "SHDPC Prohibited", it emphasizes response method at MTP level. The steps are designated by encircled reference symbols and comprise the transmission of the messages indicated in the Fig. in the direction of the corresponding arrow. The same applies for subsequent figures.

Figure 28:
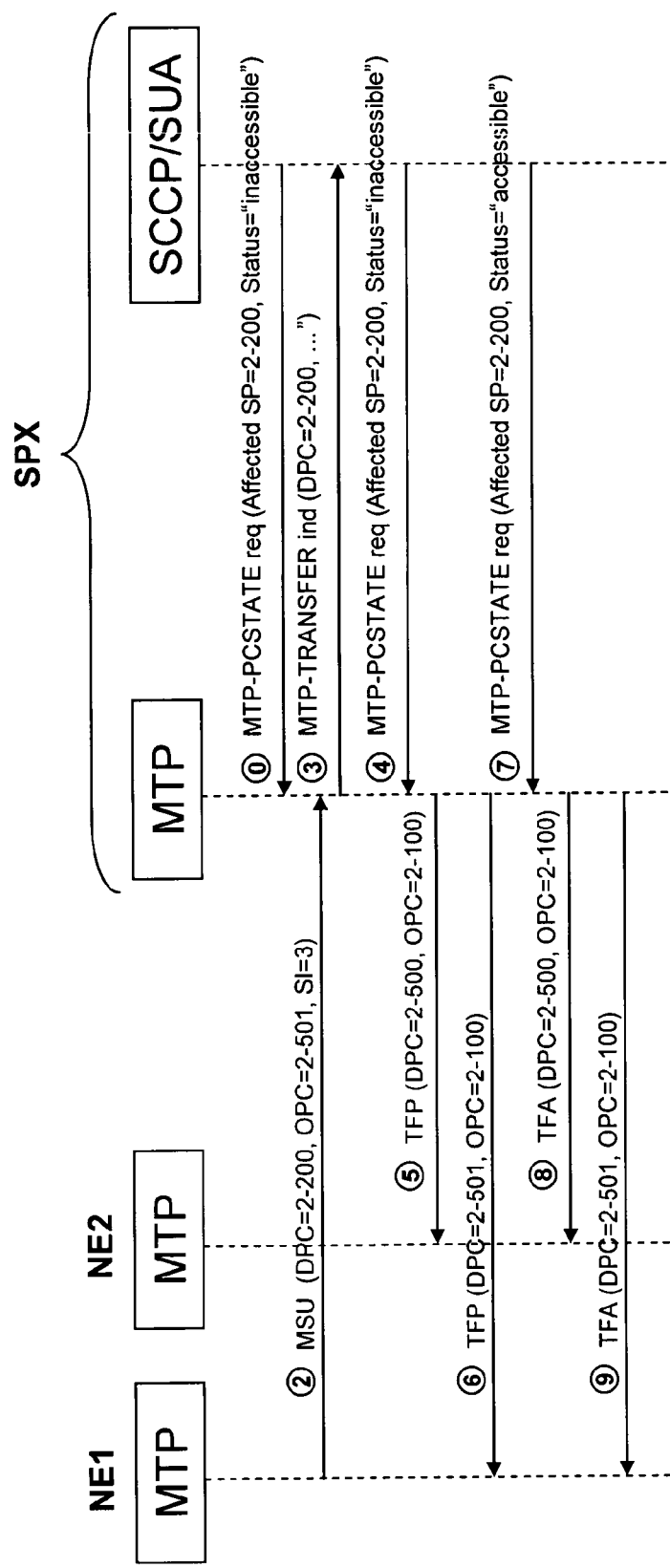
FIG. 28 is a flow diagram illustrating the sending of network management messages between an SS7 network node and a signaling gateway.

FIG. 28 shows the main steps the SG and ASPs may take in case of "SDPC Prohibited", it emphasizes response method at SCCP/SUA level.

Figure 29:
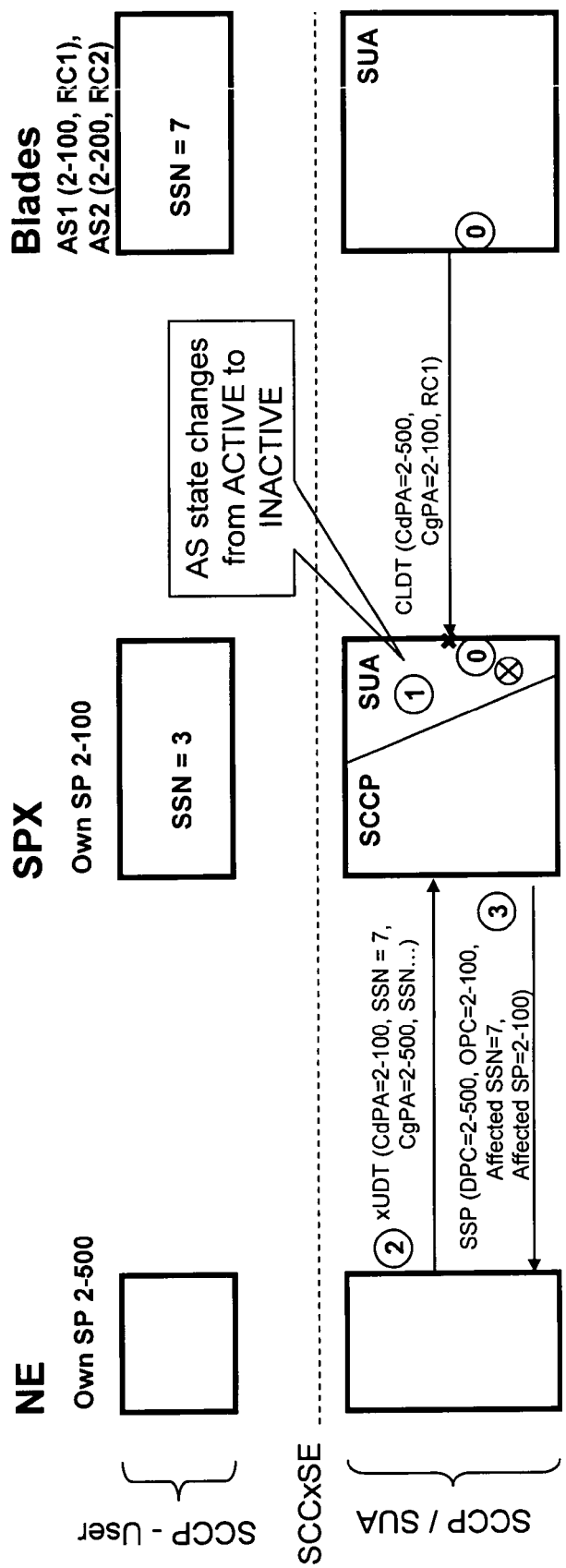
FIG. 29 is a schematic diagram illustrating the sending of messages in case an SCTP association fails.

FIG. 29 shows the main steps that the SG and ASPs may take in case of "SDPC Prohibited".

0) The SCTP association between an SG and an ASP fails.

1) The state of the ASP for all its ASes changes to INACTIVE. For an AS it is the last ASP that was in the ACTIVE state, so the AS state at the SG changes to INACTIVE (PENDING). When the AS state becomes INACTIVE, the ASP marks "prohibited" all SDPCs that the AS serves.

2) A traffic message is received for SSN 7 at the SDPC 2-100.

3) Since the destination SSN is not a local SSN 3 and it is provisioned at SDPC 2-100, the SCCP/SUA at the SG checks status of SSN 7. Since SSN status is prohibited, the SG answers to the external NE 2-500 with an SSP for SSN 7.

4) External NE is expected to stop traffic and start Subsystem test procedure, not shown in FIG. 29.

IP Destination Prohibited (Inaccessible) in IPSP

When AS serving an IP address changes its state from ACTIVE (or PENDING) to INACTIVE, then SUA at the IPSP performs local broadcast of IP Destination inaccessible status. N-IPSTATE indication primitive is used for local broadcast of IP Destination inaccessible status.

If SUA receives a traffic message to a prohibited IP Destination from local users, then SCCP/SUA uses response method and answers to LSS with N-IPSTATE primitive indicating that IP destination is inaccessible.

SUA Signaling Point Allowed

SHDPC Allowed (Accessible)

When AS serving an SHDPC changes its state from INACTIVE to ACTIVE, then SCCP/SUA at the SG performs the following steps
 a. the SHDPC is marked "Allowed" (accessible)
 b. MTP-PCSTATE request primitive is used to indicate to MTP/M3UA layer that SHDPC is accessible
 c. all SSNs provisioned at that SHDPC are marked "allowed"

At MTP-PCSTATE request primitive invocation the MTP/M3UA informs all adjacents about availability of the routes to the SHDPC via the SG. It is done using TFA, DAVA, ASPAC messages.

In case of an incoming SST for an allowed SSN at SHDPC, the SCCP/SUA answers with an SSA. If SSN=1, and the affected SHDPC is allowed, the SCCP/SUA answers with an SSA for SSN=1.

Figure 30:
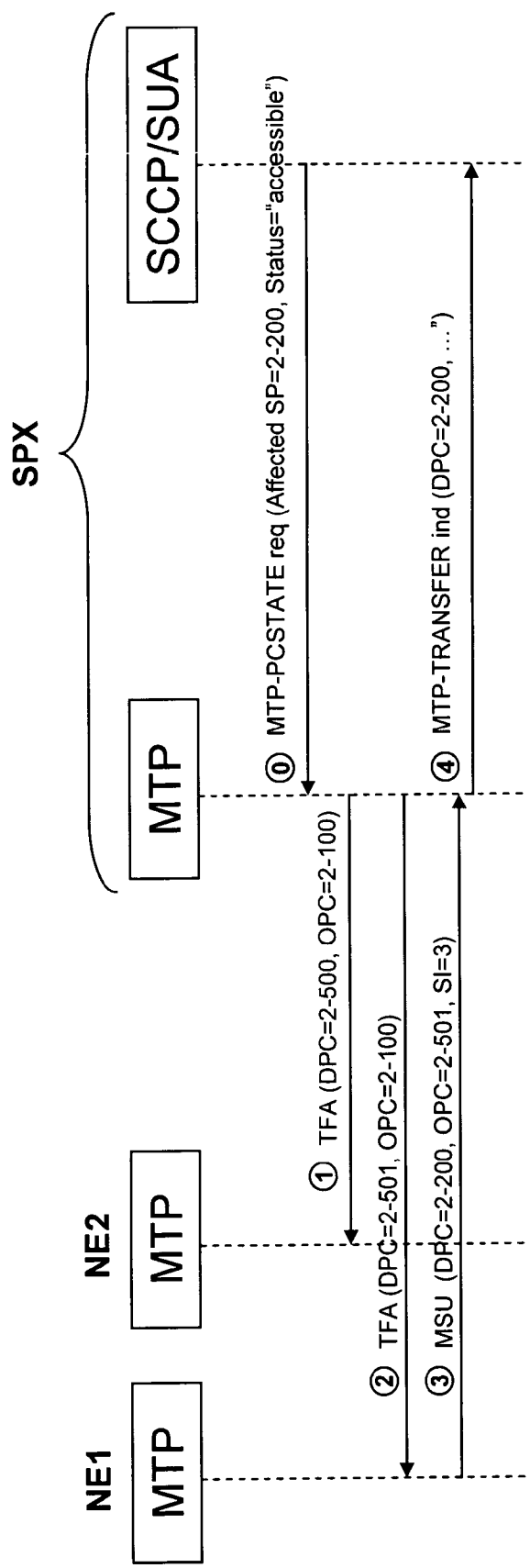
FIG. 30 is a flow diagram illustrating the broadcasting of a transfer allowed message.

FIG. 30 shows main steps that the SG may take in case of "SHDPC Allowed".

SDPC Allowed (Accessible)

When AS serving an SDPC changes its state from INACTIVE to ACTIVE, then SCCP/SUA at the SG performs the following steps
 a. the SDPC is marked "allowed" (accessible)
 b. all SSNs provisioned at that SDPC are marked "allowed"
 c. SCCP/SUA broadcast "SSN allowed" status to all SCCP SEPs of the same market and the same NI provisioned at SCCP level. Due to expected ongoing subsystem test procedure from remote NEs, this is not mandatory, but highly recommended step.

In case of an incoming SST for an allowed SSN at SDPC, the SCCP/SUA answers with an SSA. If SSN=1, the SCCP/SUA always answers the SST with an SSA for SSN=1.

Figure 31:
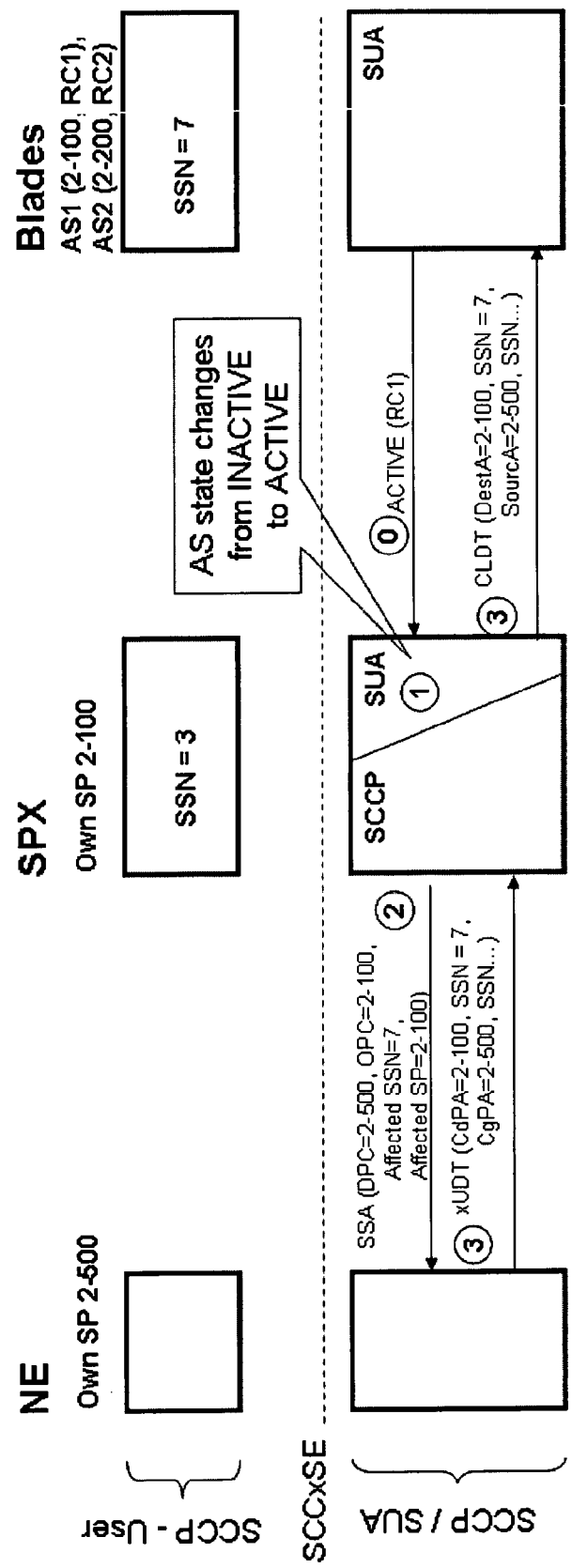
FIG. 31 is a schematic diagram illustrating the sending of a subsystem allowed message.

FIG. 31 shows main steps that the SG may take in case of "SDPC Allowed".

IP Destination Allowed (Accessible) in IPSP

When AS serving an IP address changes its state from INACTIVE to ACTIVE, then SUA at the IPSP performs local broadcast of IP Destination accessible status. N-IPSTATE indication primitive is used for local broadcast of IP Destination accessible status.

SUA Signaling Point Congested

Actions at the ASPs/IPSPs

Local Congestion Status Management

SUA ASPs/IPSPs reuse SCCP Congestion control algorithms of standard for Own Nodal Congestion control with the same meaning of parameters and O&M as in ITU-T SCCP. ASPs/IPSPs can use a new set of Congestion Control parameters or re-use the old set of SCCP parameters.

The local congestion status management at SUA ASPs/IPSPs re-uses standard procedures as follows.

Own SUA Congestion Level Measurement can use both existing SCCP methods of "Own SCCP Congestion Level Measurement", but "requests to operation and maintenance (OMS)" is the preferred method. It is a configuration option as in standard.

An SCON message will be sent including the value of OCL if "Own SUA/SCCP Congestion Level measurement is active".

At reception of first traffic message in congestion state (OCLs>0) from an SG, an SCON message will be generated to the SG from which the message was received.

The SCON is populated as follows
 RC of the incoming message is included in SCON
 ASP case Affected SP is populated with an Own SP of the ASP based on the RC and OPC in the MTP routing label of the incoming message, If SPC is present in destination address parameter of the incoming message it can be reused as Affected SP, etc.

IPSP Case

Affected SP is populated with a dummy value

SSN=1

Congestion Level equals OCL

Sending of an SCON message is repeated when a number of messages P (administrable parameter) are received in congestion state.

Incoming traffic handling in SUA ASPs/IPSPs follows design. Default and maximum importance values for SUA messages are defined by application parameters and used similar to standard. The following actions are performed If Message Priority parameter is included in the incoming message it is mapped to Importance parameter as in standard (0 to 0, 1 to 2, 2 to 4, 3 to 6)

in case incoming message does not contain Importance or Message Priority, the ASP/IPSP assigns the default value to the message for routing purposes.

Incoming Traffic Limitation is performed based on message Importance

Remote AS Congestion Control in IPSP

Reference is made to the subsection "AS Congestion Control" in ""Actions at the SG (SUA SG)" section below for a description of Remote AS congestion status management. AS congestion status management is the same in IPSPs and SGs.

When congestion status changes for a remote AS at IPSP, the IPSP performs "Local Broadcast of Restriction Level" to local subsystems that indicated support of IP addresses at attachment to the Service.

Any change in the RL of a remote AS is reported to local subsystems using the new N-IPSTATE primitive, including the new RL value. If the new RL and RSL value are equal to zero, the N-IPSTATE primitive reports "signaling point accessible", otherwise the N-IPSTATE primitive reports "signaling point congested".

Note that it is assumed here that there is one RK per signaling stack (ITU-T/ANSI) per remote IPSP. Thus, in the worst case there are two RKs at an IPSP that are served by a remote IPSP. Then there is no need to aggregate the state of IP destination based on states of multiple ASes served by the remote IPSP. Since users attach to each stack type (ANSI/ITU-T) separately, N-IPSTATE indication primitive will be given to users based on RK (ITU-T/ANSI) to which the user is attached.

For this reason, such information as NI, and market variant (market variant is needed within ITU-T stack only) may be transferred in additional proprietary parameters, when needed. Transfer of NI and market variant may be used for proprietary use cases "Connection Transfer" and "TC-BEGIN Transfer", when Source Address (CgPA) caries an SPC. Since these use cases are proprietary anyways, it may be acceptable to include proprietary parameters in the corresponding messages, for example NA that encodes NI value and market variant TTC, or ITU-T (SPNET parameter).

Outgoing Traffic Handling in SUA IPSPs follows design. Default and maximum importance values for SUA messages are defined by application parameters similar to standard. The following actions are performed If the importance value provided by the SCCP-user exceeds a predefined maximum for that message type, the importance value will be set to this maximum.

in case outgoing message does not contain Importance, the IPSP assigns the default value to the message for routing purposes Outgoing traffic limitation is performed based on message Importance.

Local Congestion Control at the SG (SUA SG)

Own SCCP Congestion Level Measurement is performed similar to standard, using the same set of parameters. The "CP load percentage from the APZ" method is preferred.

Sending of SSC Management Messages (ITU-T)

The SG sends an SSC message including the value of the OCL, if "Own SCCP Congestion Level measurement" is active at the SG.

At reception of first message in congestion state (OCL>0), the SG sends an SSC message in response. The SG reverts the MTP routing label of the original message. The SG populates the Affected SP in the SSC message with the NI-DPC from the MTP Routing Label of the original message. Affected SSN is set to 1.

Sending of SSC messages is repeated when a number of messages P (administrable parameter) are received having assigned importance lower or equal to the OCL.

Note that since Congestion Status in SCCP standard is decremented based on timers, SSC messages sent from different SGs due to Own SG congestion and due to AS congestion will not interfere. Remote peers may have an aggregated congestion status of the application servers SPCs.

However, in case a remote SCCP follows a proprietary SCCP congestion control mechanism for updating CL, SSCs sent due to local congestions of different SGs and of ASPs may interfere.

Sending of TFC/SCON Messages from MTP/M3UA (ANSI)

In order to avoid interference of "Local Congestion Control" and "AS Congestion Control" functions at SG, SCCP/SUA at SG may simultaneously consider OCL of SG and RL of the AS the incoming traffic is destined to.

For this reason an OCL of the SG in "AS Congestion Control" procedures may be considered, and SCCP alone at SG will not invoke MTP-PCSTATE request primitive in congestion status, while SCCP an SUA will cooperate and consider both OCL and AS RLs to trigger TFCs. Refer to "Actions at the SG (SUA SG) at SUA AS Congestion" subsection below for further details.

Consequently SG will not send TFCs for traffic destined to LSS at SG, unless DPC of the incoming traffic equals an SDPC.

Sending of SUA SCON Messages to SUA ASPs

The SG sends an SCON message including the value of the OCL, if "Own SCCP Congestion Level measurement" is active at the SG.

At reception of first message in congestion state (OCL>0) from an ASP, the SG sends SCON messages to all ASPs in ACTIVE state serving the originating AS. The SG includes in SCON the original RC. The SG populates the Affected SP in the SCON messages with the DPC of original message. Affected SSN is not included.

Sending of SCON messages is repeated when a number of messages P (administrable parameter) are received having assigned importance lower or equal to the OCL.

Handling of Incoming SCCP Traffic at SG (SG)

If needed, SCCP at the SG assigns Importance at reception of Incoming Messages.

Then "Incoming Traffic Limitation" procedure similar to standard SCCP is applied, if activated. It uses OCL to discard incoming SCCP traffic.

Handling of Incoming SUA Traffic at SG (SG)

If needed, SCCP at the SG assigns Importance at reception of Incoming SUA Messages.

Then "Incoming Traffic Limitation" procedure similar to standard SCCP is applied, if activated. It uses OCL to discard incoming SUA traffic.

Actions at the SG (SUA SG) at SUA AS Congestion

AS Congestion Control

The SG (SUA SG) has a set of congestion control parameters associated with each remote AS configured locally at IPSP. These parameters may be the same as those kept for SS7 destinations, namely RL
RSL
RLm
RSLm
CL RLm, RSLm and CL parameters are incremented similar to standard SCCP. RL and RSL are recalculated whenever RLm, or CL change their values.

An incoming SCON message is interpreted as an SSC message, if SSN is included in SCON, SSN should take value of 1, but any value must be accepted. If "Own SCCP/SUA Congestion Level calculation" (controlled by an AXE Parameter) is not available, then SCONs with included SSN parameter are discarded.

In another configuration, SCONs with SSN=1 may only be considered, whereas if the SSN has an other value than 1, the SCON is discarded.

The values of RLm, RSLm and CL parameters are decremented gradually in a time controlled manner similar to standard SCCP, based on provisioned decay timers.

Otherwise, if SSN is not included, incoming SCON is interpreted as an MTP-STATUS indication primitive.

The SG may only consider SCONs received from ACTIVE ASPs within an AS. The SCON applies to the AS congestion status as a whole. The SG does not keep individual congestion status per ASP.

If SCON contains the RC parameter, the SG identifies the concerned AS based on the RC value. If SCON does not contain the RC parameter, the default RC is assumed for the ASP (it can be the first AS connected to the ASP by command). Thus, we recommend that SG does not consider Affected SP parameter included in SCON.

Since, there may be no local applications at SG that communicate with ASPs, "Local Broadcast of Restriction Level" for AS RL is not performed. In future this might change.

Sending of SSC Management Messages (ITU-T)

The SG sends an SSC message including the maximum value of OCL at SG and RL of the destination AS, if "SUA Congestion Level measurement" or "Own SCCP Congestion Level measurement" is active at the SG. If "SUA Congestion Level measurement" is not active, then RL=0. If "Own SCCP Congestion Level measurement" is not active, then OCL=0.

The same procedure may be followed for SDPCs and SHDPCs in congestion state.

At reception of first message destined for an AS in congestion state, that is when max(OCL,RL)>0, the SG sends an SSC message in response to the signaling point extracted as NI-OPC from the MTP Routing Label. The SG populates the Affected SP in the SSC message with the NI-DPC from the MTP Routing Label of the original message. Affected SSN is set to 1. SCCP Congestion Level parameter in SSC is populated with max(OCL,RL).

Sending of SSC messages is repeated when a number of messages P (administrable parameter) are received for an AS in congestion state.

Request Change of SP Congestion Status to MTP/M3UA (ANSI)

If "SUA Congestion Level measurement" is active at the SG, the SG sends a TFC message including the value of MTP Congestion Level that corresponds to the RL of the destination AS. Additionally, if "Own SCCP Congestion Level measurement" is active at the SG, SCCP/SUA may consider OCL in the value of MTP Congestion Level.

Note that although MTP and M3UA standards allow for sending TFC and SCON messages for Own SPC, TC-mobile switching center (MSC) inspectors do not recommend that SCCP/SUA layer indicates congestion status for SDPCs, in addition to SHDPCs.

SCCP/SUA may keep MTP Congestion Level for each AS serving SHDPC in ANSI market, in addition to RL parameter. It may be denoted by CLm.

SCCP/SUA derives MTP Congestion Level of an SHDPC from the Restriction Level of the AS as follows:

TABLE 1

| AS Restriction Level | MTP Congestion Level |
|---|---|
| 0 | 0 |
| 1 | 0 |
| 2 | 1 |
| 3 | 1 |
| 4 | 2 |
| 5 | 2 |
| 6 | 3 |
| 7 | 3 |

Similar SCCP/SUA derives MTP Congestion Level of SG based on current OCL. A MTP Congestion Level of SG may be denoted by OCLm.

When max(CLm, OCLm) for an SHDPC is changed (incremented or decremented) at SCCP/SUA level due to change of RL of an AS, or OCL, the SCCP/SUA layer informs MTP/M3UA layer about new Congestion Level of Concerned SHDPC by invoking MTP-PCSTATE request primitive. Thus, MTP-PCSTATE request primitive indicates to MTP/M3UA layer congestion status for Hosted SPs and for that purpose OCL is also used; however, MTP-PCSTATE request primitive may not indicate a congestion status for Own SPs of the SG.

MTP-PCSTATE request primitive is repeated when a number of messages P (administrable parameter) are received with associated Importance lower than the restriction level of the AS in congestion state.

It is expected that MTP/M3UA will send TFC/SCON in response to messages received for congested SPs, if MTP priority of the message is lower than the congestion level of the congested SP at MTP/M3UA level.

Handling of AS Destined Traffic at SG (SG)

If needed, SCCP at the SG assigns Importance at reception of incoming messages.

If an incoming message is destined to an AS in congested state, the message undergoes "AS Traffic Limitation" procedure, which may be similar to the "Outgoing Traffic Limitation" procedure of standard SCCP. In "AS Traffic Limitation" procedure the SCCP/SUA uses RL and RSL kept per AS.

CL messages are reassembled before "AS Traffic Limitation" procedure is applied.

SUA SSN Status Management

SUA SSN Prohibited

Status of SSNs residing at SHDPC and SDPCs depends on AS status as outlined in Table 1.

SSN Prohibited (Inaccessible) at SHDPC

The SCCP/SUA at the SG does not broadcast status of SSNs residing at SHDPCs.

Refer to the Subsystem Test section below for further details. A SSP with SHDPCs as Affected SP may generally not be sent.

SSN Prohibited (Inaccessible) at SDPC

SSP messages are sent in response as described in the above section "SUA Signaling Point prohibited".

SUA SSN Allowed

SHDPC Allowed (Accessible)

When AS serving the SHDPC becomes ACTIVE all SSNs provisioned at the SHDPC are marked allowed.

Response to Subsystem Test is used to inform SCCP peers about availability of the SSNs as described in the Subsystem Test section below.

SDPC Allowed (Accessible)

SSA messages are broadcast to all SCCP peers of the same NI provisioned at SCCP level at the SG as described in the above section "SUA Signaling Point allowed".

Response to Subsystem Test is also used to inform SCCP peers about availability of the SSNs as described in section to 0 Subsystem Test section below.

Subsystem Status Test

Configuration 3

All SSNs served by SUA ASes are provisioned in SUA SG/SG at SCCP/SUA level. SCCP/SUA keeps up-to-date SSN status for all provisioned SSNs residing in SUA network at SDPCs and SHDPC.

Status of SSN depends on AS status as outlined in Table 1 above.

The SCCP/SUA at the SG may answer SSTs according to the following rules:

a. When Management function at SCCP/SUA receives SST with SSN=1, it always answers with SSA to the originator of the SST, it does not matter what is the DPC of the SST, as long as DPC equals the Affected SP in SST.

Note that in case MTP-TRANSFER indication is received for an inaccessible SHDPC, the SCCP/SUA answers with MTP-PCSTATE req, and does not examine the message further. Thus, in case SST comes to an inaccessible SHDPC, the SST is discarded, and it is not examined by SCCP Management function.

b. When SCCP/SUA receives an SST for an LSS at SG, it is answered as in standard with SSP/SSA depending on the status (In-Service/Out-of-Service) of the LSS.

c. When SCCP/SUA receives an SST destined to Own SPC of the SG for an SSN provisioned at SDPC, then SCCP/SUA answers according to the status of the SSN stored at SG.

d. When SCCP/SUA Management function receives an SST destined to SHDPC of the SG for an SSN provisioned at the SHDPC, then SCCP/SUA answers according to the status of the SSN stored at SG as follows. If the SSN is allowed, the SCCP/SUA answers with an SSA. Otherwise, when SSN is prohibited, then the SHDPC is inaccessible and the SCCP/SUA answers with an MTP-PCSTATE request primitive, where it indicates that the affected SHDPC is inaccessible. Thus, the SG may not send SSPs with SHDPC as Affected SPC.

e. If SST addresses SDPC, and Affected SSN is not an LSS at the SG, nor is it provisioned at the SDPC, then SCCP/SUA ignores the SST message.

f. If SST addresses SHDPC, and Affected SSN is not provisioned at the SHDPC, then SCCP/SUA ignores the SST message.

It should be clear that the above detailed description only describes specific embodiments of the invention, and that the invention may be implemented in other than the above-described ways. Various changes and modifications can be made to the embodiments without departing from the spirit and the scope of the invention. The present embodiments are to be considered in all respect as illustrative and non-restrictive, and all changes coming within the meaning and equivalence range of the appended claims are intended to be embraced therein.

The invention claimed is:

1. A method of operating a signaling gateway for routing signaling messages between a SS7 network and an IP-based network, the signaling gateway having a first signaling point code allocated as a network address, the method comprising:
   receiving from a network node of the SS7 network a message that comprises a destination point code as a destination address;
   at a lower protocol layer of an SS7 protocol stack of the signaling gateway, comparing said destination point code to a second signaling point code associated with a network node of the IP-based network;
   if said destination point code matches said second signaling point code:
      delivering the received message from the lower protocol layer to an upper protocol layer of the SS7 protocol stack of the signaling gateway;
      translating the received message into a corresponding message conforming to an user adaptation protocol of an upper user adaptation protocol layer of an IP protocol stack of the signaling gateway; and
      transmitting the resulting translated message towards said network node associated with said second signaling point code.

2. The method according to claim 1, wherein the lower protocol layer is a message transfer part 3 (MTP3) layer, the upper protocol layer is a signaling connection control part (SCCP) layer, and the upper user adaptation protocol layer of the IP protocol stack is a signaling connection control part user adaptation (SUA) layer.

3. The method according to claim 1, further comprising:
   performing a network management procedure for said second signaling point code comprising at least a sending of a network management message to an adjacent network node in the SS7 network that indicates an availability or unavailability of the network node associated with said second signaling point code in case that network node becomes available or unavailable, respectively, from said signaling gateway.

4. The method according to claim 3, wherein, in response to receiving a subsystem test message for a subsystem associated with said second signaling point code to test if the subsystem is available:
   in case the network node associated with the second signaling point code is available, the upper protocol layer sends a subsystem allowed message to the adjacent network node of the SS7 network, and
   in case the network node associated with the second signaling point code is unavailable, the lower protocol layer sends a transfer prohibited message to the adjacent network node of the SS7 network.

5. The method according to claim 1, wherein the lower protocol layer stores a state indicator associated with said second signaling point code, said state indicator indicating an availability or unavailability of said network node associated with said second signaling point code from said signaling gateway.

6. The method according to claim 5, further comprising:
   in response to said upper user adaptation protocol layer receiving an indication on a change of an availability state of said network node associated with said second signaling point code, indicating said change of the availability state to the upper protocol layer;

the upper protocol layer providing a request to the lower protocol layer to change the state of the state indicator in accordance with the indicated change of the availability state; and the lower protocol layer changing the state of the state indicator in accordance with the request provided by the upper protocol layer.

7. The method according to claim 1, wherein said signaling gateway further comprises a message transfer part 3 user adaptation (M3UA) layer storing a state indicator associated with said second signaling point code, said state indicator indicating an availability of said network node associated with said second signaling point code from said signaling gateway, the method further comprising:

in response to the M3UA layer receiving a request from the upper protocol layer to change the state of the state indicator, sending a message indicating the new state of the state indicator to another network node of the IP-based network comprising a M3UA layer, wherein a type of the message sent is determined by a type of the another network node of the IP-based network towards which the message is sent.

8. The method according to claim 1, further comprising performing a network management procedure for said second signaling point code comprising:

in response to receiving a subsystem prohibited message from another network node of the SS7 network addressed to said second signaling point code, sending a subsystem status test message to the another network node of the SS7 network with the second signaling point code as a source address, and sending a message indicating the unavailability of the SS7 subsystem to the network node associated with said second signaling point code.

9. The method according to claim 1, further comprising performing a network management procedure for said second signaling point code comprising:

in response to receiving a destination state audit message from said network node associated with the second signaling point code comprising an address of an affected subsystem to be audited, sending a subsystem status test message to a SS7 network node comprising the second signaling point code as a source address and said affected subsystem address.

10. The method according to claim 9, further comprising:

inhibiting the sending of a further subsystem status test message with the same affected subsystem address for a predetermined amount of time after sending said subsystem status test message.

11. The method according to claim 1, further comprising performing a signaling connection control part jSCCP) traffic limitation procedure for messages received by the signaling gateway from said network node associated with the second signaling point code in accordance with a local congestion level of the signaling gateway.

12. The method according to claim 1, further comprising:

storing a congestion level indicating a congestion status of the network node associated with the second signaling point code; and in response to receiving a message comprising congestion information from said network node associated with the second signaling point code, updating the stored congestion level in accordance with the received congestion information.

13. The method according to claim 12, wherein the stored congestion level is updated if a congestion level comprised in the received message is larger than the stored congestion level and wherein a predetermined amount of time after an updating of the stored congestion level, the stored congestion level is decreased by a predetermined value.

14. The method according to claim 12, further comprising:

storing at least one traffic restriction related parameter selected from a group comprising a restriction level, a restriction sublevel, a transport related restriction level, and a transport related restriction sublevel for said network node associated with the second signaling point code;

updating a stored transport related restriction level or sublevel in response to receiving an indication of a stream control transport protocol association congestion towards said network node or in response to receiving a signaling congestion message with a subsystem number of 0 or 1.

15. The method according to claim 12, further comprising:

in case the stored congestion level exceeds a predetermined threshold value, and in response to receiving a message originated at a remote network node and addressed to said second signaling point code, sending a congestion indicating message indicating the stored congestion level to a network address comprised as a source address in the received message, wherein the message being sent comprises the second signaling point code as an affected address associated with said congestion level, wherein a type of said congestion indicating message is determined based on a type of the remote network node towards which the congestion indicating message is sent.

16. The method according to claim 12, further comprising:

indicating a stored congestion level or restriction level of the network node associated with the second signaling point code to the upper protocol layer.

17. The method according to claim 1, further comprising:

measuring a local congestion level of the signaling gateway and storing the measured congestion level as an own congestion level;

in case the own congestion level is above a predetermined threshold value, sending a message indicating the own congestion level in response to receiving a message originated at a remote network node, wherein the message is sent to a network address comprised as a source address in the received message, and wherein the message being sent comprises the destination address of the received message as an affected address associated with the own congestion level.

18. The method according to claim 17, further comprising:

in response to receiving a message addressed to said second signaling point code, calculating a maximum value of the stored congestion level and the stored own congestion level and sending a message indicating the maximum value as a congestion level indication to a network node which originated the received message.

19. A signaling gateway for routing signaling messages between a SS7 network and an IP-based network, the signaling gateway having a first signaling point code allocated as a network address, comprising:

an interface for receiving a message from a network node of the SS7 network;

a processing unit implementing an SS7 protocol stack comprising a lower protocol layer and an upper protocol layer and an IP protocol stack comprising an upper user adaptation protocol layer, the processing unit configured to:
compare a destination point code comprised in the received message to a second signaling point code associated with a network node of the IP-based network, and
if the destination point code matches the second signaling point code, deliver the received message from the lower protocol layer to the upper protocol layer and translate the received message to a corresponding message conforming to an user adaptation protocol of said upper user adaptation protocol layer; and
an interface for sending the translated message to the network node of the IP-based network associated with said second signaling point code.

20. The signaling gateway according to claim 19, wherein the lower protocol layer is an message transfer part 3 (MTP3) layer, the upper protocol layer is an signaling connection control part (SCCP) layer and the upper user adaptation protocol layer is an signaling connection control part user adaptation (SUA) layer.

21. The signaling gateway according to claim 19, further comprising:
a network management unit performing a network management procedure with respect to said second signaling point code, said network management procedure comprising at least a sending of a network management message to an adjacent network node in the SS7 network that indicates an availability or unavailability of the network node associated with said second signaling point code in case that network node becomes available or unavailable, respectively, from said signaling gateway.

22. The signaling gateway according to claim 19, wherein said lower protocol layer is configured to store a state indicator indicating an availability state of the network node associated with the second signaling point code, and to change the state indicator in accordance with a request from said upper protocol layer.

23. The signaling gateway according to claim 22, wherein said SS7 protocol stack comprises an extended service access point between the lower protocol layer and the upper protocol layer for the second signaling point code, using which the upper protocol layer is able to change the availability state, a congestion status, or both of the second signaling point code.

24. The signaling gateway according to claim 19, further comprising:
a congestion management unit configured to indicate a congestion level of the network node associated with the second signaling point code to a remote network node by sending a message comprising a congestion level indicator to the remote network node.

25. The signaling gateway according to claim 19, wherein the processing unit is configured to store a congestion level of the network node associated with the second signaling point code, and to update said congestion level in response to receiving a signaling congestion message from said network node associated with the second signaling point code having a congestion level value larger than the value of the stored congestion level.

26. The signaling gateway according to claim 25, wherein the processing unit is further configured to measure a local congestion level of the signaling gateway, to store said local congestion level, and, in response to receiving a message from a remote network node, indicate the larger of the local congestion level and the congestion level associated with the network node associated with the second signaling point code to said remote network node.

27. The signaling gateway according to claim 19, further comprising:
a network management unit configured to route a message querying the state of a SS7 network node received from the network node associated with said second signaling point code to said SS7 network node, and to route a message indicating the state of a remote SS7 network node comprising the second signaling point code as a destination address towards the network note associated with the second signaling point code.

28. The signaling gateway according to claim 27, wherein said message querying the state of a SS7 network node is a destination state audit message, the network management unit being further configured to translate said destination state audit message into a corresponding subsystem status test message for sending the message towards the SS7 network node.

29. The signaling gateway according to claim 27, wherein the network management unit is configured to inhibit the routing of further messages querying the state of the same SS7 network node for a predetermined amount of time or until a response is received from said SS7 network node.

30. A system for routing messages between a SS7 network and an IP-based network, comprising:
at least two signaling gateways that each have:
a different first signaling point code allocated as a network address;
an interface for receiving a message from a network node of the SS7 network;
a processing unit implementing an SS7 protocol stack comprising a lower protocol layer and an upper protocol layer and an IP protocol stack comprising an upper user adaptation protocol layer, the processing unit configured to:
compare a destination point code comprised in the received message to a second signaling point code associated with a network node of the IP-based network, and
if the destination point code matches the second signaling point code, deliver the received message from the lower protocol layer to the upper protocol layer and translate the received message to a corresponding message conforming to a user adaptation protocol of said upper user adaptation protocol layer; and
wherein each signaling gateway is configured to route messages comprising the second signaling point code as a destination address to the same network node in the IP-based network associated with the second signaling point code.

31. A method of routing signaling messages between a SS7 network and an IP-based network communicating via at least two signaling gateways, each signaling gateway implementing an SS7 protocol stack comprising a lower protocol layer and an upper protocol layer, implementing an IP protocol stack comprising an upper user adaptation protocol layer, and configured to compare a destination point code comprised in a signaling message received from the SS7 network to a second signaling point code associated with a network node of the IP-based network and, if the destination point code matches the second signaling point code, to deliver the signaling message from the lower protocol layer to the upper protocol layer and translate the signaling message to a corresponding message conforming to said a user adaptation protocol of said upper user adaptation protocol layer, the method comprising:

routing a signaling message to a network node of the IP-based network via one of said at least two signaling gateways; and in case the route via the one signaling gateway becomes unavailable or congested, routing a signaling message to the same network node via another of said at least two signaling gateways.

32. A non-transitory electronically readable data carrier with stored electronically readable control information configured such that when using the data carrier in a computer system, the control information operates a signaling gateway for routing signaling messages between a SS7 network and an IP-based network, the signaling gateway having a first signaling point code allocated as a network address, and the control information operating the signaling gateway by:

receiving from a network node of the SS7 network a message that comprises a destination point code as a destination address;

at a lower protocol layer of an SS7 protocol stack of the signaling gateway, comparing said destination point code to a second signaling point code associated with a network node of the IP-based network;

if said destination point code matches said second signaling point code:

delivering the received message from the lower protocol layer to an upper protocol layer of the SS7 protocol stack of the signaling gateway;

translating the received message into a corresponding message conforming to an user adaptation protocol of an upper user adaptation protocol layer of an IP protocol stack of the signaling gateway; and transmitting the resulting translated message towards said network node associated with said second signaling point code.

* * * * *

UNITED STATES PATENT AND TRADEMARK OFFICE
CERTIFICATE OF CORRECTION

PATENT NO. : 8,867,530 B2  
APPLICATION NO. : 12/988731  
DATED : October 21, 2014  
INVENTOR(S) : Hlibiciuc et al.

Page 1 of 1

It is certified that error appears in the above-identified patent and that said Letters Patent is hereby corrected as shown below:

In the specification

In Column 11, Line 5, delete "(ASP) 201" and insert -- (ASP) --, therefor.

In Column 12, Line 64, delete "SG 510," and insert -- SG 501, --, therefor.

In Column 13, Line 35, delete "(SS7/egacy)" and insert -- (SS7/legacy) --, therefor.

In Column 18, Line 58, delete "hosted" and insert -- host --, therefor.

In Column 28, Line 64, delete "alication" and insert -- application --, therefor.

In Column 44, Line 50, delete "audit. of" and insert -- audit of --, therefor.

In the claims

In Column 59, Line 54, in Claim 11, delete "jSCCP)" and insert -- (SCCP) --, therefor.

In Column 63, Line 1, in Claim 31, delete "said a" and insert -- a --, therefor.

Signed and Sealed this  
Twenty-eighth Day of June, 2016

Michelle K. Lee  
*Director of the United States Patent and Trademark Office*